US008375244B2

(12) United States Patent
Bobak et al.

(10) Patent No.: US 8,375,244 B2
(45) Date of Patent: Feb. 12, 2013

(54) MANAGING PROCESSING OF A COMPUTING ENVIRONMENT DURING FAILURES OF THE ENVIRONMENT

(75) Inventors: Mythili K. Bobak, Lagrangeville, NY (US); Michael D. Swanson, Springfield, OR (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 11/965,872

(22) Filed: Dec. 28, 2007

(65) Prior Publication Data
US 2009/0172470 A1 Jul. 2, 2009

(51) Int. Cl.
*G06F 11/00* (2006.01)
(52) U.S. Cl. ............... 714/3; 714/47.3; 714/37; 709/224
(58) Field of Classification Search .................. 714/2, 3, 714/15, 17, 37, 47.1, 47.3; 709/220, 224
See application file for complete search history.

(56) References Cited

U.S. PATENT DOCUMENTS

| 5,023,873 A | 6/1991 | Stevenson et al. ............. 371/8.2 |
| 5,386,561 A | 1/1995 | Huynh et al. |
| 5,452,452 A | 9/1995 | Gaetner et al. |
| 5,481,694 A | 1/1996 | Chao et al. ..................... 395/439 |
| 5,537,542 A | 7/1996 | Eilert et al. |
| 5,604,863 A | 2/1997 | Allen et al. |
| 5,631,831 A | 5/1997 | Bird et al. |
| 5,652,908 A | 7/1997 | Douglas et al. |
| 5,734,837 A | 3/1998 | Flores et al. |
| 5,790,780 A | 8/1998 | Brichta et al. |
| 5,797,005 A | 8/1998 | Bahls et al. |
| 5,797,129 A | 8/1998 | Rohan |
| 5,826,080 A | 10/1998 | Dworzecki |
| 5,887,168 A | 3/1999 | Bahls et al. |
| 6,012,044 A | 1/2000 | Maggioncalda et al. |
| 6,012,152 A | 1/2000 | Douik et al. |
| 6,041,306 A | 3/2000 | Du et al. |
| 6,336,138 B1 | 1/2002 | Caswell et al. |
| 6,385,613 B1 | 5/2002 | Grewell et al. .................... 707/8 |
| 6,393,386 B1 | 5/2002 | Zager et al. |
| 6,393,485 B1 | 5/2002 | Chao et al. ..................... 709/231 |
| 6,408,277 B1 | 6/2002 | Nelken |
| 6,449,688 B1 | 9/2002 | Peters et al. .................. 711/112 |
| 6,480,944 B2 | 11/2002 | Bradshaw et al. |
| 6,625,751 B1 * | 9/2003 | Starovic et al. ................. 714/11 |
| 6,732,118 B2 * | 5/2004 | Hermann et al. ..................... 1/1 |
| 6,785,768 B2 | 8/2004 | Peters et al. .................. 711/112 |
| 6,862,696 B1 | 3/2005 | Voas et al. |

(Continued)

FOREIGN PATENT DOCUMENTS
WO    WO 99/10814    3/1999

OTHER PUBLICATIONS

"BPEL Project", http://www.eclipse.org/bpel/.

(Continued)

*Primary Examiner* — Joseph Schell
(74) *Attorney, Agent, or Firm* — Dennis Jung, Esq.; Blanche E. Schiller, Esq.; Heslin Rothenberg Farley & Mesiti P.C.

(57) ABSTRACT

Recovery processing is provided for management components of an Information Technology (IT) environment. The recovery processing recovers the components, as well as performs one or more tasks that were being performed by the components prior to recovery.

20 Claims, 23 Drawing Sheets

U.S. PATENT DOCUMENTS

| | | |
|---|---|---|
| 6,874,010 B1 | 3/2005 | Sargent |
| 6,934,247 B2 | 8/2005 | Bhattal et al. ............... 370/216 |
| 6,954,786 B1 | 10/2005 | Vered et al. |
| 6,983,321 B2 | 1/2006 | Trinon et al. |
| 6,983,362 B1 | 1/2006 | Kidder et al. |
| 7,032,186 B1 | 4/2006 | Gasser et al. |
| 7,047,337 B2 | 5/2006 | Armstrong et al. |
| 7,058,947 B1 | 6/2006 | Raja et al. |
| 7,111,297 B1 | 9/2006 | Sankaranarayan et al. |
| 7,197,749 B2 | 3/2007 | Thornton et al. |
| 7,243,267 B2 | 7/2007 | Klemm et al. |
| 7,313,573 B2 | 12/2007 | Leung et al. |
| 7,325,161 B1 | 1/2008 | Rakic et al. |
| 7,395,537 B1 | 7/2008 | Brown et al. |
| 7,409,356 B1 | 8/2008 | Geddes et al. |
| 7,437,611 B2 | 10/2008 | Agarwal et al. |
| 7,490,265 B2 | 2/2009 | Baskey et al. |
| 7,499,954 B2 * | 3/2009 | Cherkauer et al. ................. 1/1 |
| 7,509,529 B2 | 3/2009 | Colucci et al. |
| 7,529,981 B2 | 5/2009 | Childress et al. |
| 7,536,585 B1 | 5/2009 | Keeton et al. |
| 7,568,019 B1 | 7/2009 | Bhargava et al. |
| 7,587,483 B1 | 9/2009 | Florissi et al. |
| 7,610,512 B2 | 10/2009 | Gerber |
| 7,620,953 B1 | 11/2009 | Tene et al. |
| 7,627,728 B1 * | 12/2009 | Roeck et al. ............... 711/162 |
| 7,650,341 B1 | 1/2010 | Oratovsky et al. |
| 7,707,173 B2 | 4/2010 | Nanavati et al. |
| 7,730,363 B2 | 6/2010 | Takezawa et al. |
| 7,743,001 B1 | 6/2010 | Vermeulen et al. |
| 7,747,730 B1 | 6/2010 | Harlow |
| 7,752,310 B2 | 7/2010 | Kageyama |
| 7,774,457 B1 | 8/2010 | Talwar et al. |
| 7,774,458 B2 | 8/2010 | Trinon et al. |
| 7,818,421 B2 | 10/2010 | Machida |
| 7,865,582 B2 | 1/2011 | Santos et al. |
| 7,933,872 B2 | 4/2011 | Kulkarni et al. |
| 7,934,119 B2 | 4/2011 | Takamoto et al. |
| 7,937,706 B2 | 5/2011 | Casotto |
| 7,958,393 B2 | 6/2011 | Bobak et al. |
| 7,962,590 B1 | 6/2011 | Or et al. |
| 8,051,106 B2 | 11/2011 | Bird |
| 8,260,893 B1 | 9/2012 | Bandhole et al. |
| 2001/0056398 A1 | 12/2001 | Scheirer |
| 2001/0056554 A1 | 12/2001 | Chrabaszcz |
| 2002/0022952 A1 | 2/2002 | Zager et al. |
| 2002/0049749 A1 | 4/2002 | Helgeson et al. |
| 2002/0059512 A1 | 5/2002 | Desjardins |
| 2002/0069102 A1 | 6/2002 | Vellante et al. |
| 2002/0078130 A1 | 6/2002 | Thornton et al. |
| 2002/0078381 A1 | 6/2002 | Farley et al. |
| 2002/0091991 A1 | 7/2002 | Castro |
| 2002/0144184 A1 * | 10/2002 | Anvin et al. ............... 714/38 |
| 2002/0194045 A1 | 12/2002 | Shay et al. |
| 2002/0198727 A1 | 12/2002 | Ann et al. |
| 2003/0051186 A1 | 3/2003 | Boudnik et al. |
| 2003/0056013 A1 | 3/2003 | Laschkewitsch et al. |
| 2003/0078823 A1 | 4/2003 | Yoshioka et al. |
| 2003/0084100 A1 * | 5/2003 | Gahan et al. ............... 709/203 |
| 2003/0093672 A1 | 5/2003 | Cichowlas |
| 2003/0135384 A1 | 7/2003 | Nguyen |
| 2003/0139956 A1 | 7/2003 | Guenther et al. |
| 2003/0200482 A1 | 10/2003 | Sullivan |
| 2003/0212580 A1 | 11/2003 | Shen |
| 2003/0212685 A1 | 11/2003 | Rakotoarivelo et al. |
| 2003/0225602 A1 | 12/2003 | Hagmann et al. |
| 2003/0236677 A1 | 12/2003 | Casati et al. |
| 2004/0034553 A1 | 2/2004 | Cole et al. |
| 2004/0054690 A1 | 3/2004 | Hillerbrand et al. |
| 2004/0078373 A1 | 4/2004 | Ghoneimy et al. |
| 2004/0119752 A1 | 6/2004 | Beringer et al. |
| 2004/0143470 A1 | 7/2004 | Myrick et al. |
| 2004/0158777 A1 | 8/2004 | Bae et al. |
| 2004/0162741 A1 | 8/2004 | Flaxer et al. |
| 2004/0181476 A1 | 9/2004 | Smith et al. |
| 2004/0186905 A1 | 9/2004 | Young et al. |
| 2004/0193476 A1 | 9/2004 | Aerdts |
| 2004/0199768 A1 | 10/2004 | Nail |
| 2004/0210452 A1 | 10/2004 | Aboujaoude et al. |
| 2004/0243699 A1 | 12/2004 | Koclanes et al. |
| 2005/0015641 A1 | 1/2005 | Alur et al. |
| 2005/0033600 A1 | 2/2005 | Geddes et al. |
| 2005/0043977 A1 | 2/2005 | Ahern et al. |
| 2005/0049906 A1 | 3/2005 | Leymann et al. |
| 2005/0060662 A1 | 3/2005 | Soares et al. |
| 2005/0071470 A1 | 3/2005 | O'Brien et al. |
| 2005/0086091 A1 | 4/2005 | Trumbly et al. |
| 2005/0091351 A1 | 4/2005 | Badovinatz et al. |
| 2005/0096949 A1 | 5/2005 | Aiber et al. |
| 2005/0119905 A1 | 6/2005 | Wong et al. |
| 2005/0125768 A1 | 6/2005 | Wong et al. |
| 2005/0172306 A1 | 8/2005 | Agarwal et al. |
| 2005/0177406 A1 | 8/2005 | Facciorusso et al. |
| 2005/0198244 A1 | 9/2005 | Eilam et al. |
| 2005/0228852 A1 | 10/2005 | Santos et al. |
| 2005/0235248 A1 | 10/2005 | Victoria et al. |
| 2005/0262242 A1 | 11/2005 | Byers et al. |
| 2006/0004265 A1 | 1/2006 | Pulkkinen et al. |
| 2006/0010234 A1 | 1/2006 | Reedy et al. |
| 2006/0020866 A1 | 1/2006 | Lo et al. |
| 2006/0037022 A1 | 2/2006 | Byrd et al. |
| 2006/0041505 A1 | 2/2006 | Enyart |
| 2006/0064335 A1 | 3/2006 | Goldszmidt et al. |
| 2006/0074731 A1 | 4/2006 | Green et al. |
| 2006/0074736 A1 | 4/2006 | Shukla et al. |
| 2006/0074993 A1 * | 4/2006 | Pulamarasetti et al. ...... 707/200 |
| 2006/0106626 A1 | 5/2006 | Jeng et al. |
| 2006/0111921 A1 | 5/2006 | Chang et al. |
| 2006/0112383 A1 | 5/2006 | Chang et al. |
| 2006/0117221 A1 | 6/2006 | Fisher et al. |
| 2006/0123022 A1 | 6/2006 | Bird |
| 2006/0129562 A1 | 6/2006 | Pulamarasetti et al. |
| 2006/0149842 A1 | 7/2006 | Dawson et al. |
| 2006/0161444 A1 | 7/2006 | Lubrecht et al. |
| 2006/0161466 A1 | 7/2006 | Trinon et al. |
| 2006/0179136 A1 | 8/2006 | Loboz et al. |
| 2006/0190368 A1 | 8/2006 | Kesterman |
| 2006/0190583 A1 | 8/2006 | Whalen |
| 2006/0190775 A1 | 8/2006 | Aggarwal et al. |
| 2006/0218558 A1 | 9/2006 | Torii et al. |
| 2006/0224702 A1 | 10/2006 | Schmidt et al. |
| 2006/0245354 A1 | 11/2006 | Gao et al. |
| 2006/0245369 A1 | 11/2006 | Schimmelpfeng et al. |
| 2006/0248546 A1 | 11/2006 | Andreev et al. |
| 2006/0259526 A1 | 11/2006 | Booz et al. |
| 2006/0287875 A1 | 12/2006 | Reddy et al. |
| 2006/0293942 A1 | 12/2006 | Chaddha et al. |
| 2007/0011331 A1 | 1/2007 | Morimoto et al. |
| 2007/0027734 A1 | 2/2007 | Hughes |
| 2007/0038490 A1 | 2/2007 | Joodi |
| 2007/0038492 A1 | 2/2007 | Ryan et al. |
| 2007/0067296 A1 | 3/2007 | Malloy et al. |
| 2007/0079097 A1 | 4/2007 | Karnowski et al. |
| 2007/0100712 A1 | 5/2007 | Kilpatrick et al. |
| 2007/0112847 A1 | 5/2007 | Dublish et al. |
| 2007/0143166 A1 | 6/2007 | Leymann et al. |
| 2007/0150571 A1 | 6/2007 | Haga et al. |
| 2007/0165525 A1 | 7/2007 | Kageyama |
| 2007/0179826 A1 | 8/2007 | Cutlip et al. |
| 2007/0198678 A1 | 8/2007 | Dieberger et al. |
| 2007/0234408 A1 | 10/2007 | Burch et al. |
| 2007/0266029 A1 | 11/2007 | Baskey et al. |
| 2007/0271219 A1 | 11/2007 | Agarwal et al. |
| 2007/0276885 A1 | 11/2007 | Valiyaparambil et al. |
| 2007/0286219 A1 | 12/2007 | Knop et al. |
| 2007/0294406 A1 | 12/2007 | Suer et al. |
| 2007/0300204 A1 | 12/2007 | Andreev et al. |
| 2008/0005739 A1 | 1/2008 | Sadiq et al. |
| 2008/0016335 A1 | 1/2008 | Takahashi et al. |
| 2008/0052719 A1 | 2/2008 | Briscoe et al. |
| 2008/0063423 A1 | 3/2008 | Matoba |
| 2008/0140495 A1 | 6/2008 | Bhamidipaty et al. |
| 2008/0215909 A1 | 9/2008 | Bretschneider et al. |
| 2008/0294777 A1 | 11/2008 | Karve et al. |
| 2008/0295100 A1 | 11/2008 | Ainsworth |
| 2008/0317217 A1 | 12/2008 | Bernardini et al. |
| 2009/0037363 A1 | 2/2009 | Kozlov et al. |

| | | | |
|---|---|---|---|
| 2009/0077210 A1 | 3/2009 | Musman et al. | |
| 2009/0125751 A1 | 5/2009 | Dawson et al. | |
| 2009/0150456 A1 | 6/2009 | Balasubramanian et al. | |
| 2009/0150887 A1* | 6/2009 | Sanghvi et al. | 718/102 |
| 2009/0171703 A1 | 7/2009 | Bobak et al. | |
| 2009/0171704 A1 | 7/2009 | Bobak et al. | |
| 2009/0171705 A1 | 7/2009 | Bobak et al. | |
| 2009/0171706 A1 | 7/2009 | Bobak et al. | |
| 2009/0171707 A1 | 7/2009 | Bobak et al. | |
| 2009/0171708 A1 | 7/2009 | Bobak et al. | |
| 2009/0171730 A1 | 7/2009 | Bobak et al. | |
| 2009/0171731 A1 | 7/2009 | Bobak et al. | |
| 2009/0171732 A1 | 7/2009 | Bobak et al. | |
| 2009/0171733 A1 | 7/2009 | Bobak et al. | |
| 2009/0172149 A1 | 7/2009 | Bobak et al. | |
| 2009/0172460 A1 | 7/2009 | Bobak et al. | |
| 2009/0172461 A1 | 7/2009 | Bobak et al. | |
| 2009/0172668 A1 | 7/2009 | Bobak et al. | |
| 2009/0172669 A1 | 7/2009 | Bobak et al. | |
| 2009/0172670 A1 | 7/2009 | Bobak et al. | |
| 2009/0172671 A1 | 7/2009 | Bobak et al. | |
| 2009/0172674 A1 | 7/2009 | Bobak et al. | |
| 2009/0172682 A1 | 7/2009 | Bobak et al. | |
| 2009/0172687 A1 | 7/2009 | Bobak et al. | |
| 2009/0172688 A1 | 7/2009 | Bobak et al. | |
| 2009/0172689 A1 | 7/2009 | Bobak et al. | |
| 2009/0172769 A1 | 7/2009 | Bobak et al. | |
| 2009/0249337 A1 | 10/2009 | Vasilevsky et al. | |
| 2010/0280863 A1 | 11/2010 | Wilcock et al. | |
| 2011/0004564 A1 | 1/2011 | Rolia et al. | |

OTHER PUBLICATIONS

"Factor Analysis Using SAS Proc Factor", http://www.utexas.edu/cc/docs/stat53.html.
"Principal Components and Factor Analysis", http://statsoft.com/textbook/stfacan.html.
"WebSphere Intergration Developer", http://www-306.ibm.com/software/integration/wid/about/?S_CMP=rnav.
Bolie et al., "BPEL Cookbook: Best Practices for SOA-based Integration and Composite Applications Development", 2006, Packt Publishing, ISBN 1904811337; Chapter 1; 12 pages.
Juric, et al., Business Process Execution Language for Web Services—An Architect and Developer's Guide to Orchestrating Web Services Using BPEL4WS, Second Edition; 2006; Packt Publishing; ISBN 1904811817; Chapter 5; 28 pages.
Horstman et al., Core Java 2: vol. I—Fundamentals (7th Edition); Core Series; 2003; Sun Microsystems, Inc., ISBN 0131472025; pp. 324-327.
Perry, J. Steven, "Java Management Extension: 1st Edition," Jun. 15, 2002; O'Reilly & Associates, Inc.; ISBN 0596002459; Chapter 1 (pp. 1-32) and Chapter 7 (pp. 207-222).
Weerawarana et al., "Web Services Platform Architecture: SOAP, WSDL, WS-Policy, WS-Addressing, WS-BPEL, WS-Reliable Messaging, and More," 2005; Pearson Education, Inc.; ISBN 0131488740; Chapter 14 (pp. 313-340).
Van Bon, Jan, "Foundations of IT Service Management Based on ITIL," Sep. 2005; Van Haren Publishing; ISBN 9077212582; Chapter 6 (pp. 69-85).
Kreger et al., "JAVA and JMX—Building Manageable Systems," Jan. 2003; ISBN 0672324083; pp. 54-64.
Evans, James, "Optimization Algorithms for Networks and Graphs, Second Edition", 1992, CCR, ISBN 0824786025, Chapters 1-3 (pp. 1-76) and Chapter 11 (pp. 390-413).
Jolliffe, Ian T., "Principal Component Analysis", 2002, Pringer, ISBN 0387954422, Chapters 1-4 (pp. 1-77), Chapters 6-7 (pp. 111-166) and Chapters 12-14 (pp. 299-405).
Lau, Hang T., "A Java Library of Graph Algorithms and Optimization Discrete Mathematics and Its Applications," 2006, Chapman & Hall, ISBN 1584887184, Chapter 2.2 (pp. 39-43).
Horstmann, Cay S. et al., Core Java 2—vol. II—Advanced Features (7th Edition), Sun Microsystems Press, 2005, ISBN 0131118269, Chapter 1 (pp. 1-22).
"Parasoft BPEL Maestro," http://www.parasoft.com/jsp/products/home.jsp?product=BPEL.
Office Action for U.S. Appl. No. 11/966,495 dated Oct. 29, 2009.
Office Action for U.S. Appl. No. 11/965,874 dated Mar. 18, 2010.
Office Action for U.S. Appl. No. 11/965,897 dated Mar. 31, 2010.
Office Action for U.S. Appl. No. 11/965,930 dated Apr. 1, 2010.
Office Action for U.S. Appl. No. 11/965,855 dated Apr. 30, 2010.
Final Office Action for U.S. Appl. No. 11/966,495 dated May 14, 2010.
Final Office Action for U.S. Appl. No. 11/965,897 dated Sep. 17, 2010.
"BPEL Project", http://www.eclipse.org/bpel/, 2008.
"Factor Analysis Using SAS Proc Factor", http://www.utexas.edu/cc/docs/stat53.html, Jun. 25, 1995.
"Principal Components and Factor Analysis", http://statsoft.com/textbook/stfacan.html, 1984.
"WebSphere Intergration Developer", http://www-306.ibm.com/software/integration/wid/about/?S_CMP=rnav, 2008.
Office Action for U.S. Appl. No. 11/965,862 dated Jun. 23, 2010.
Final Office Action for U.S. Appl. No. 11/966,495 dated Jun. 14, 2010.
Office Action for U.S. Appl. No. 11/966,619 dated Feb. 2, 2011.
Office Action for U.S. Appl. No. 11/965,926 dated Feb. 3, 2011.
Rood, Melody A., "Enterprise Architecture: Definition, Content & Utility," IEEE, Jul. 1994, pp. 106-111.
Buchanan, Richard D., et al., "Aligning Enterprise and IT Investments with Corporate Goals," OMG White Paper, 2002, p. 1-13 (Office Action for U.S. Appl. No. 11/965,926 —no further date information available.).
Restriction Requirement for U.S. Appl. No. 11/965,889 dated Feb. 16, 2011.
Office Action for U.S. Appl. No. 11/965,913 dated Mar. 1, 2011.
Office Action for U.S. Appl. No. 11/965,845 dated Mar. 11, 2011.
Liu, Rong et al., "Modeling Business Contexture and Behavior Using Business Artifacts," Lecture Notes in Computer Science, 2007, vol. 4495/2007, pp. 324-339 (Office Action for U.S. Appl. No. 11/965,845—no further date information available.).
Office Action for U.S. Appl. No. 11/965,922 dated Mar. 16, 2011.
Final Office Action for U.S. Appl. No. 11/965,930 dated Sep. 29, 2010.
Final Office Action for U.S. Appl. No. 11/965,874 dated Oct. 14, 2010.
Office Action for U.S. Appl. No. 11/965,862 dated Dec. 7, 2010.
Final Office Action for U.S. Appl. No. 11/965,855 dated Dec. 22, 2010.
Office Action for U.S. Appl. No. 11/965,832 dated Dec. 22, 2010.
Patent Application for U.S. Appl. No. 12/975,520, filed Dec. 22, 2010 entitled "Real-Time Information Technology Environments".
Office Action for U.S. Appl. No. 11/965,978 dated Jun. 22, 2011.
Office Action for U.S. Appl. No. 11/965,889 dated May 25, 2011.
Final Office Action for U.S. Appl. No. 11/966,619 dated Jun. 15, 2011.
Office Action for U.S. Appl. No. 11/965,899 dated Jun. 20, 2011.
Office Action for U.S. Appl. No. 11/965,877 dated Jun. 20, 2011.
Office Action for U.S. Appl. No. 11/965,862 dated Jul. 8, 2011.
Office Action for U.S. Appl. No. 11/965,917 dated Jul. 11, 2011.
Office Action for U.S. Appl. No. 11/965,894 dated Jul. 18, 2011.
Final Office Action for U.S. Appl. No. 11/965,926 dated Jul. 19, 2011.
Final Office Action for U.S. Appl. No. 11/965,922 dated Jul. 29, 2011.
Final Office Action for U.S. Appl. No. 11/965,845 dated Jul. 29, 2011.
Final Office Action for U.S. Appl. No. 11/965,913 dated Aug. 17, 2011.
Final Office Action for U.S. Appl. No. 11/965,838 dated Aug. 19, 2011.
Office Action for U.S. Appl. No. 11/965,832 dated Aug. 23, 2011.
Office Action for U.S. Appl. No. 11/965,902 dated Aug. 23, 2011.
Office Action for U.S. Appl. No. 11/965,855 dated Oct. 3, 2011.
Office Action for U.S. Appl. No. 11/965,951 dated Oct. 5, 2011.
Final Office Action for U.S. Appl. No. 11/965,851 dated Oct. 28, 2011.
Final Office Action for U.S. Appl. No. 11/965,877 dated Nov. 8, 2011.

Final Office Action for U.S. Appl. No. 11/965,899 dated Nov. 22, 2011.
Final Office Action for U.S. Appl. No. 11/965,917 dated Dec. 21, 2011.
Final Office Action for U.S. Appl. No. 11/965,902 dated Dec. 21, 2011.
Final Office Action for U.S. Appl. No. 11/965,894 dated Dec. 27, 2011.
Final Office Action for U.S. Appl. No. 11/965,832 dated Jan. 9, 2012.
Final Office Action for U.S. Appl. No. 11/965,889 dated Jan. 11, 2012.
Office Action for U.S. Appl. No. 11/966,495 dated Feb. 1, 2012.
Final Office Action for U.S. Appl. No. 11/965,862 dated Feb. 14, 2012.
Final Office Action for U.S. Appl. No. 11/965,951 dated Feb. 22, 2012.
Office Action for U.S. Appl. No. 11/965,926 dated Mar. 2, 2012.
Office Action for U.S. Appl. No. 11/965,874 dated Mar. 19, 2012.
Office Action for U.S. Appl. No. 11/965,845 dated Apr. 18, 2012.
Office Action for U.S. Appl. No. 11/965,922 dated Apr. 20, 2012.
Crawford et al., "Toward An On Demand Service-Oriented Architecture," IBM Systems Journal, vol. 44, No. 1, 2005.
Office Action for U.S. Appl. No. 11/965,894 dated Jun. 13, 2012.
Final Office Action for U.S. Appl. No. 11/965,889 dated Jun. 20, 2012.
Office Action for U.S. Appl. No. 11/965,902 dated Jul. 5, 2012.
Office Action for U.S. Appl. No. 12/975,520 dated Jul. 18, 2012.
Final Office Action for U.S. Appl. No. 11/965,906 dated Jul. 23, 2012.
Final Office Action for U.S. Appl. No. 11/965,922 dated Aug. 28, 2012.
Office Action for U.S. Appl. No. 11/965,899 dated Aug. 28, 2012.
Final Office Action for U.S. Appl. No. 11/965,845 dated Aug. 29, 2012.
Office Action for U.S. Appl. No. 11/965,862 dated Sep. 26, 2012.
Final Office Action for U.S. Appl. No. 11/965,926 dated Oct. 5, 2012.
Kramer, Jeff et al., "The Evolving Philosophers Problem: Dynamic Change Management," Aug. 1991, pp. 1-33.
Final Office Action for U.S. Appl. No. 11/965,894 dated Oct. 23, 2012.

* cited by examiner

| EVENT LOG X | | |
|---|---|---|
| MESSAGE | RESOURCE | DATE |
| i CONTAINMENT REGION HAS RECOVERED | CONTAINMENT | APR 18, 2006 10:50:52.193 |
| x CONTAINMENT REGION CREATED FOR RESOURCE FAILURE | CONTAINMENT1 | APR 18, 2006 10:50:52.103 |
| i CONTAINMENT REGION HAS RECOVERED | CONTAINMENT3 | APR 18, 2006 10:50:51.982 |
| x DETECTED DYNAMIC MEMBERSHIP CHANGE: ACTIVE POLICY REED... | RECOVERYSEGMENT2 | APR 18, 2006 10:12:25.696 |
| x THIS RESOURCE HAS ENTERED AN UNRECOVERABLE STATE AND REQ... | RECOVERY MANAGER2 | APR 18, 2006 10:12:25.696 |
| x THIS RESOURCE HAS ENTERED AN UNRECOVERABLE STATE AND REQ... | RECOVERY MANAGER1 | APR 18, 2006 10:12:14.770 |
| x ACTIVATION OF POLICY 'XYZ' HAS FAILED | RECOVERY SEGMENT1 | APR 18, 2006 10:12:14.760 |
| i DETECTED DYNAMIC MEMBERSHIP CHANGE: ACTIVE POLICY REED... | RECOVERY SEGMENT2 | APR 18, 2006 10:10:25.695 |

*FIG. 6A*

THE RESOURCE 'CODER 1 RECOVERY' HAS ENTERED AN UNRECOVERABLE STATE THAT REQUIRES YOUR INPUT. DO YOU WANT TO OPEN THE RESOURCE NOW?

YES    NO

*FIG. 6B*

MANAGING PROCESSING OF A COMPUTING ENVIRONMENT DURING FAILURES OF THE ENVIRONMENT

TECHNICAL FIELD

This invention relates, in general, to managing customer environments to provide support for business resiliency, and in particular, to providing recovery for the components used to manage the environment in the event of failure.

BACKGROUND OF THE INVENTION

Today, customers attempt to manually manage and align their availability management with their information technology (IT) infrastructure. Changes in either business needs or the underlying infrastructure are often not captured in a timely manner and require considerable rework, leading to an inflexible environment.

Often high availability solutions and disaster recovery technologies are handled via a number of disparate point products that target specific scopes of failure, platforms or applications. Integrating these solutions into an end-to-end solution is a complex task left to the customer, with results being either proprietary and very specific, or unsuccessful.

Customers do not have the tools and infrastructure in place to customize their availability management infrastructure to respond to failures in a way that allows for a more graceful degradation of their environments. As a result, more drastic and costly actions may be taken (such as a site switch) when other options (such as disabling a set of applications or users) could have been offered, depending on business needs.

Coordination across availability management and other systems management disciplines is either nonexistent or accomplished via non-reusable, proprietary, custom technology.

There is little predictability as to whether the desired recovery objective will be achieved, prior to time of failure. There are only manual, labor intensive techniques to connect recovery actions with the business impact of failures and degradations.

Any change in the underlying application, technologies, business recovery objectives, resources or their interrelationships require a manual assessment of impact to the handcrafted recovery scheme.

SUMMARY OF THE INVENTION

Based on the foregoing, a need exists for a capability to facilitate management of an IT environment. In particular, a need exists for a capability that facilitates recovery of the management components of the IT environment in the event of failure of one or more of the components.

The shortcomings of the prior art are overcome and additional advantages are provided through the provision of a computer-implemented method to facilitate recovery within an IT environment. The method includes, for instance, determining that a management component used in managing the IT environment is to be recovered; and recovering the management component, wherein the recovering performs at least one task that was being performed by the management component prior to recovery.

Computer program products and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6A depicts one example of a notification view indicating a plurality of notifications, in accordance with an aspect of the present invention;

FIG. 6B depicts one example of a notification message sent to a user, in accordance with an aspect of the present invention;

DETAILED DESCRIPTION OF THE INVENTION

Figure 1:
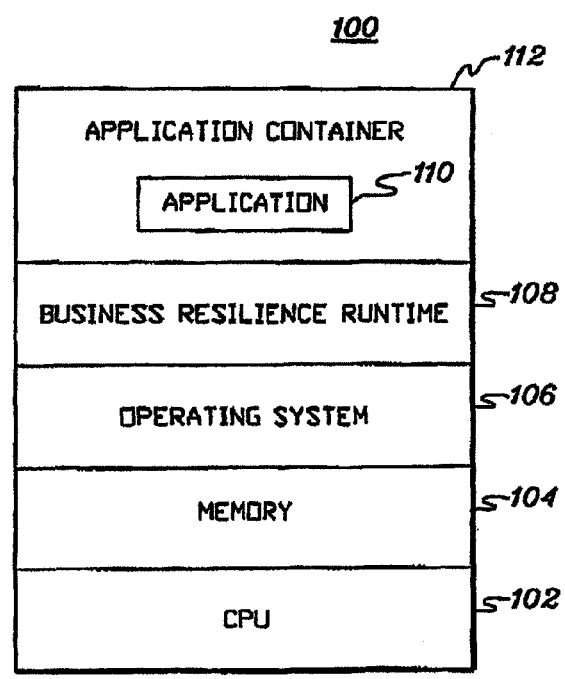
FIG. 1 depicts one embodiment of a processing environment to incorporate and use one or more aspects of the present invention.

In managing a customer's environment, such as its business environment, there is a set of requirements unaddressed by existing technology, which causes unpredictable down time, large impact failures and recoveries, and significant extra labor cost, with resulting loss of business revenue. These requirements include, for instance:

1. Ensuring that there is a consistent recovery scheme across the environment, linked to the business application, across the different types of resources; not a different methodology performed by platform silo. The recovery is to match the scope of the business application, not limited in scope to a single platform. The recovery is to be end-to-end and allow for interaction across multiple vendor products. In one example, a business application is defined as a process that is supported by IT services. It is supportive of the products and/or services created by a customer. It can be of fine granularity (e.g., a specific service/product provided) or of coarse granularity (e.g., a group of services/products provided).
2. Ability to group together mixed resource types (servers, storage, applications, subsystems, network, etc.) into logical groupings aligned with business processes requirements for availability.
3. Ability to share resources across logical groups of resources; ability to nest these logical group definitions, with specifications for goal policy accepted and implemented at each level.
4. Pre-specified recommendations for resource groupings, with customization possible, and pattern matching customer configuration with vendor or customer provided groupings/relationships—to avoid requiring customers to start from scratch for definitions.
5. Ability to group together redundant resources with functional equivalence—use during validation when customer has less redundancy than required to meet the Recovery Time Objective (RTO) goal; in recovery to select an alternate resource for one that has failed.
6. Ability to configure the definition of what constitutes available, degraded, or unavailable based on customer's own sensitivity for a given grouping of resources, and business needs, and further aggregate the state across various resources to produce an overall state for the business application. The state is to be assessed real time, based on what is actually occurring in the system at the time, rather than fixed definitions. In some cases, a performance slowdown might flag a degraded environment, and in other cases, a failure may be necessary before flagging a degraded or unavailable environment. The definitions of available, degraded and unavailable are to be consumed by an availability system that evaluates them in the context of a policy, and then determines appropriate action, including possibly launching recovery automatically.
7. Ability to relate the redundancy capability of relevant resources to the availability status of a business application.
8. Allow customers to configure when recovery actions can be delegated to lower level resources, particularly since resource sharing is becoming more relevant in many customer environments.
9. Include customer or vendor best practices for availability as prespecified workflows, expressed in a standards based manner, that can be customized.
10. Ability to specify quantitative business goals for the recovery of logical groupings of resources, effecting both how the resources are pre-configured for recovery, as well as recovered during errors. One such quantitative goal is Recovery Time Objective (RTO). As part of the specification of quantitative business goals, to be able to include time bias of applications, and facilitate the encoding of appropriate regulatory requirements for handling of certain workloads during changing business cycles in selected businesses, such as financial services.
11. Decomposition of the overall quantified RTO goal to nested logical groups; processing for shared groups having different goals.
12. Ability to configure redundancy groupings and co-location requirements with resources from other vendors, using a representation for resources (which may be, for example, standards based), with ability to clearly identify the vendor as part of the resource definition.
13. Ability to use customer's own historical system measures to automatically generate various system environments, then use these system environments when specifying quantitative recovery goals (since recovery time achievability and requirements are not consistent across time of day, business cycle, etc.). The function is to be able to incorporate historical information from dependent resources, as part of the automatic generation of system environments.
14. Specification of statistical thresholds for acceptability of using historical information; customer specification directly of expected operation times and directive to use customer specified values.
15. Environments are matched to IT operations and time of day, with automatic processing under a new system environment at time boundaries—no automatic internal adjustment of RTO is to be allowed, rather changed if the customer has specified that a different RTO is needed for different system environments.
16. Goal Validation—Prior to failure time. Ability to see assessment of achievable recovery time, in, for instance, a Gantt chart like manner, detailing what is achievable for each resource and taking into account overlaps of recovery sequences, and differentiating by system environment. Specific use can be during risk assessments, management requests for additional recovery related resources, mitigation plans for where there are potentials for RTO miss. Example customer questions:
    What is my expected recovery time for a given application during "end of month close" system environment?
    What is the longest component of that recovery time?
    Can I expect to achieve the desired RTO during the "market open" for stock exchange or financial services applications?
    What would be the optimal sequence and parallelization of recovery for the resources used by my business application?
17. Ability to prepare the environment to meet the desired quantitative business goals, allowing for tradeoffs when shared resources are involved. Ensure that both automated and non-automated tasks can be incorporated into the pre-conditioning. Example of customer question: What would I need to do for pre-conditioning my system to support the RTO goal I need to achieve for this business application?
18. Ability to incorporate operations from any vendors' resources for pre-conditioning or recovery workflows, including specification of which pre-conditioning operations have effect on recoveries, which operations have dependencies on others, either within vendor resources or across resources from multiple vendors.
19. Customer ability to modify pre-conditioning workflows, consistent with supported operations on resources.
20. Ability to undo pre-conditioning actions taken, when there is a failure to complete a transactionally consistent set of pre-conditioning actions; recognize the failure, show customers the optional workflow to undo the actions taken, allow them to decide preferred technique for reacting to the failure—manual intervention, running undo set of operations, combination of both, etc.

21. Ability to divide pre-conditioning work between long running and immediate, nondisruptive short term actions.
22. Impact only the smallest set of resources required during recovery, to avoid negative residual or side effects for attempting to recover a broader set of resources than what is actually impacted by the failure.
23. Choosing recovery operations based on determination of which recovery actions address the minimal impact, to meet goal, and then prepare for subsequent escalation in event of failure of initial recovery actions.
24. Choosing a target for applications and operating systems (OS), based on customer co-location specifications, redundancy groups, and realtime system state.
25. Ability for customer to indicate specific effect that recovery of a given business process can have on another business process—to avoid situations where lower priority workloads are recovered causing disruption to higher priority workloads; handling situations where resources are shared.
26. Ability to prioritize ongoing recovery processing over configuration changes to an availability system, and over any other administration functions required for the availability system.
27. Ability for recoveries and pre-conditioning actions to run as entire transactions so that partial results are appropriately accounted for and backed out or compensated, based on actual effect (e.g., during recovery time or even pre-conditioning, not all actions may succeed, so need to preserve a consistent environment).
28. Allow for possible non-responsive resources or underlying infrastructure that does not have known maximum delays in response time in determining recovery actions, while not going beyond the allotted recovery time.
29. Allow customer to change quantified business recovery goals/targets without disruption to the existing recovery capability, with appropriate labeling of version of the policy to facilitate interaction with change management systems.
30. Allow customers to change logical groupings of resources that have assigned recovery goals, without disruption to the existing recovery capability, with changes versioned to facilitate interaction with change management systems.
31. Ability to specify customizable human tasks, with time specifications that can be incorporated into the goal achievement validation so customers can understand the full time involved for a recovery and where focusing on IT and people time is critical to reducing RTO.
32. There is a requirement/desire to implement dynamically modified redundancy groupings for those resources which are high volume—automatic inclusion based on a specified set of characteristics and a matching criteria.
33. There is a requirement/desire to automatically add/delete resources from the logical resource groupings for sets of resources that are not needing individual assessment.

The above set of requirements is addressed, however, by a Business Resiliency (BR) Management System, of which one or more aspects of the present invention are included. The Business Resiliency Management System provides, for instance:

1. Rapid identification of fault scope.
   Correlation and identification of dependencies between business functions and the supporting IT resources.
   Impact analysis of failures affecting business functions, across resources used within the business functions, including the applications and data.
   Isolation of failure scope to smallest set of resources, to ensure that any disruptive recovery actions effect only the necessary resources.
2. Rapid granular and graceful degradation of IT service.
   Discontinuation of services based on business priorities.
   Selection of alternate resources at various levels may include selection of hardware, application software, data, etc.
   Notifications to allow applications to tailor or reduce service consumption during times of availability constraints.
3. Integration of availability management with normal business operations and other core business processes.
   Policy controls for availability and planned reconfiguration, aligned with business objectives.
   Encapsulation, integration of isolated point solutions into availability IT fabric, through identification of affected resources and operations initiated by the solutions, as well as business resiliency.
   Goal based policy support, associated with Recovery Segments that may be overlapped or nested in scope.
   Derivation of data currency requirements, based on business availability goals.

One goal of the BR system is to allow customers to align their supporting information technology systems with their business goals for handling failures of various scopes, and to offer a continuum of recovery services from finer grained process failures to broader scoped site outages. The BR system is built around the idea of identifying the components that constitute a business function, and identifying successive levels of recovery that lead to more complex constructs as the solution evolves. The various recovery options are connected by an overall BR management capability that is driven by policy controls.

Various characteristics of one embodiment of a BR system include:

1. Capability for dynamic generation of recovery actions, into a programmatic and manageable entity.
2. Dynamic generation of configuration changes required/desired to support a customer defined Recovery Time Objective (RTO) goal.
3. Dynamic definition of key Pattern System Environments (PSEs) through statistical analysis of historical observations.
4. Validation of whether requested RTO goals are achievable, based on observed historical snapshots of outages or customer specified recovery operation time duration, in the context of key Pattern System Environments.
5. BR system dynamic, automatic generation and use of standards based Business Process Execution Language (BPEL) workflows to specify recovery transactions and allow for customer integration through workflow authoring tools.
6. Ability to configure customized scopes of recovery, based on topologies of resources and their relationships, called Recovery Segments (RSs).

7. Best practice workflows for configuration and recovery, including, but not limited to, those for different resource types: servers, storage, network, and middleware, as examples.
8. Ability to customize the definition of available, degraded, unavailable states for Recovery Segments.
9. Ability to represent customers' recommended configurations via best practice templates.
10. Ability to define the impact that recovery of one business application is allowed to have on other business applications.
11. Ability to correlate errors from the same or multiple resources into related outages and perform root cause analysis prior to initiating recovery actions.
12. Quantified policy driven, goal oriented management of unplanned outages.
13. Groupings of IT resources that have associated, consistent recovery policy and recovery actions, classified as Recovery Segments.
14. Handling of situations where the underlying error detection and notifications system itself is unavailable.

A Business Resilience System is capable of being incorporated in and used by many types of environments. One example of a processing environment to incorporate and use aspects of a BR system, including one or more aspects of the present invention, is described with reference to FIG. 1.

Processing environment 100 includes, for instance, a central processing unit (CPU) 102 coupled to memory 104 and executing an operating system 106. Examples of operating systems include AIX® and z/OS®, offered by International Business Machines Corporation; Linux; etc. AIX® and z/OS® are registered trademarks of International Business Machines Corporation, Armonk, N.Y., U.S.A. Other names used herein may be registered trademarks, trademarks or product names of International Business Machines Corporation or other companies.

The operating system manages execution of a Business Resilience Runtime Component 108 of a Business Resilience System, described herein, and one or more applications 110 of an application container 112.

As examples, processing environment 100 includes an IBM® System Z™ processor or a pSeries® server offered by International Business Machines Corporation; a Linux server; or other servers, processors, etc. Processing environment 100 may include more, less and/or different components than described herein. (pSeries® is a registered trademark of International Business Machines Corporation, Armonk, N.Y., USA.)

Figure 2:
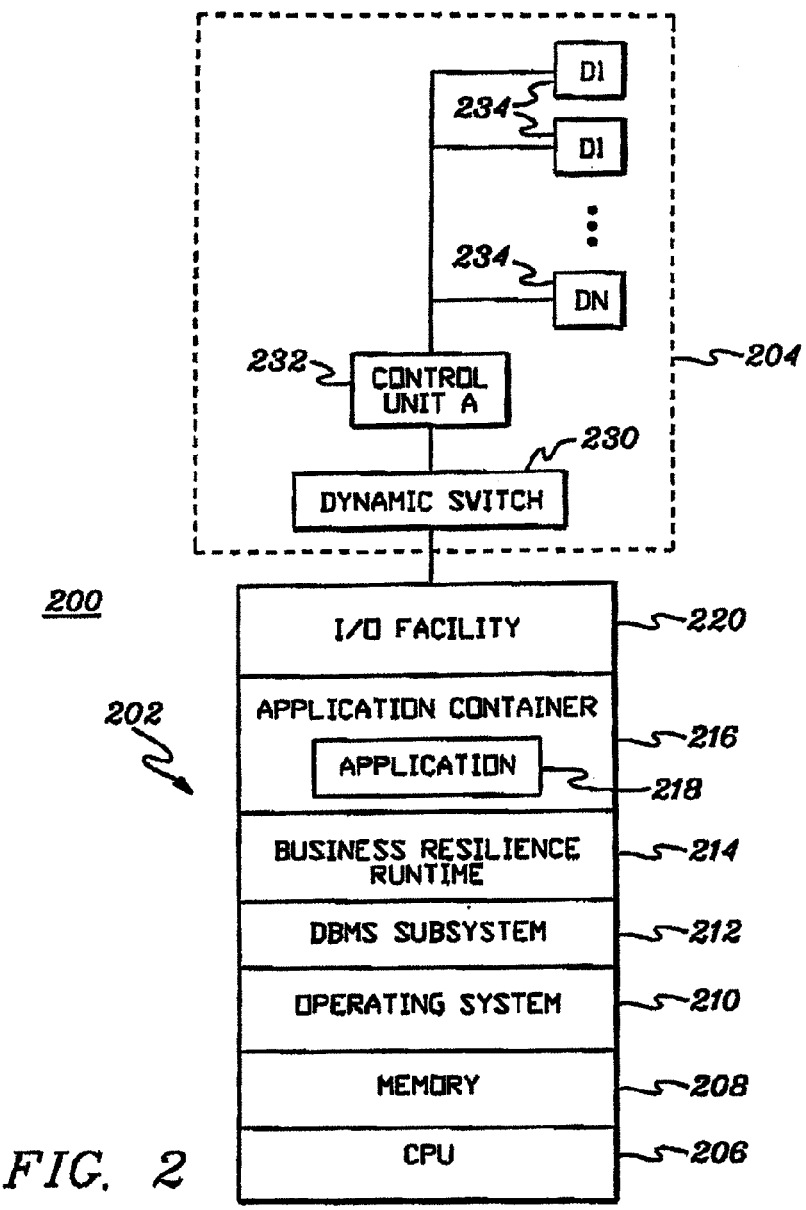
FIG. 2 depicts another embodiment of a processing environment to incorporate and use one or more aspects of the present invention.

Another example of a processing environment to incorporate and use aspects of a BR System, including one or more aspects of the present invention, is described with reference to FIG. 2.

As shown, a processing environment 200 includes for instance, a central processing complex 202 coupled to an input/output (I/O) subsystem 204. Central processing complex 202 includes, for instance, a central processing unit 206, memory 208, an operating system 210, a database management system 212, a Business Resilience Runtime Component 214, an application container 216 including one or more applications 218, and an I/O facility 220.

I/O facility 220 couples central processing complex 202 to I/O subsystem 204 via, for example, a dynamic switch 230. Dynamic switch 230 is coupled to a control unit 232, which is further coupled to one or more I/O devices 234, such as one or more direct access storage devices (DASD).

Processing environments 100 and/or 200 may include, in other embodiments, more, less and/or different components.

Figure 3:
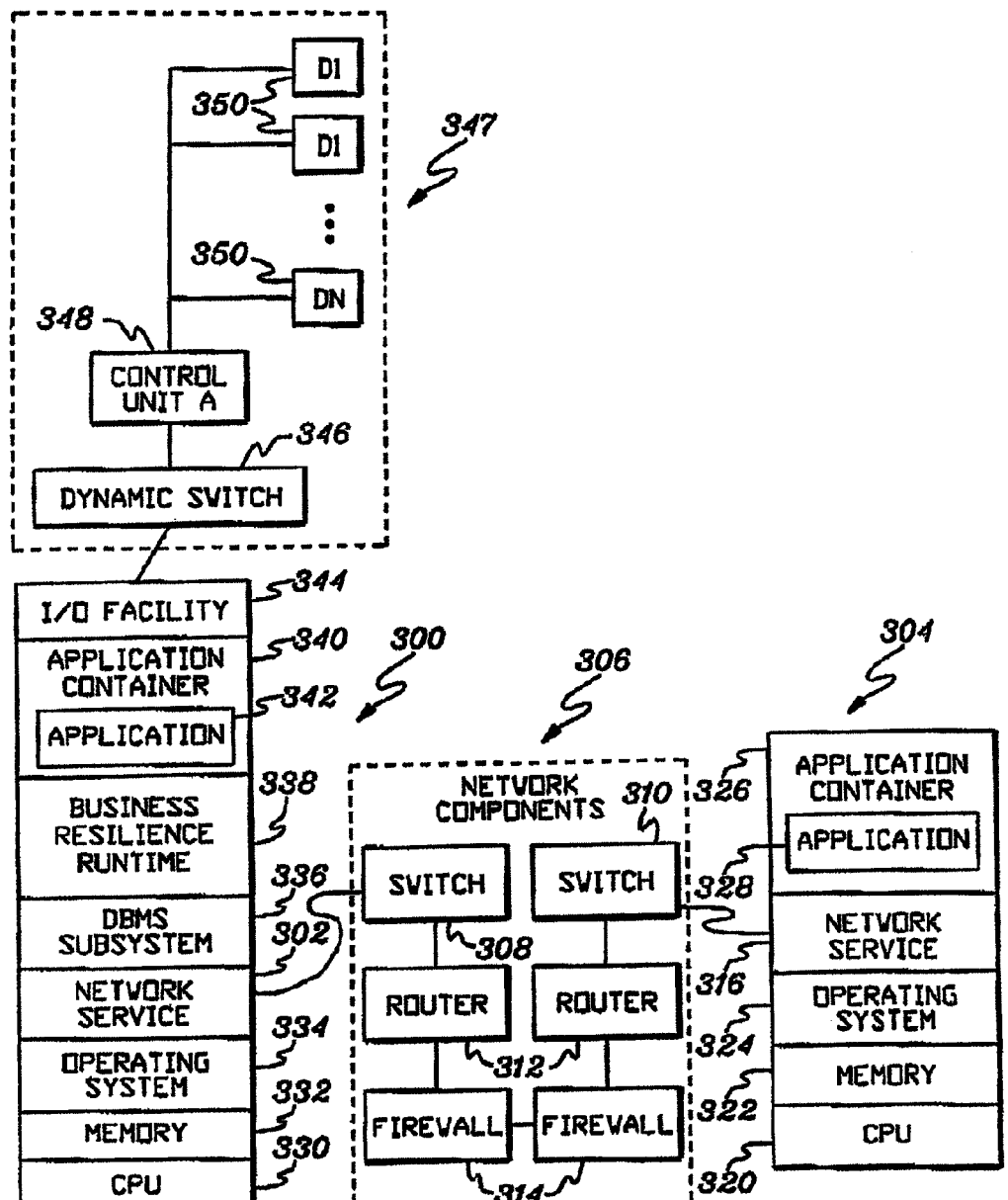
FIG. 3 depicts yet a further embodiment of a processing environment to incorporate and use one or more aspects of the present invention.

In yet another embodiment, a central processing complex 300 (FIG. 3) further includes a network service 302, which is used to couple a central processing complex 300 to a processing environment 304 via a network subsystem 306.

For example, network service 302 of central processing complex 300 is coupled to a switch 308 of network subsystem 306. Switch 308 is coupled to a switch 310 via routers 312 and firewalls 314. Switch 310 is further coupled to a network service 316 of processing environment 304.

Processing environment 304 further includes, for instance, a central processing unit 320, a memory 322, an operating system 324, and an application container 326 including one or more applications 328. In other embodiments, it can include more, less and/or different components.

Moreover, CPC 300 further includes, in one embodiment, a central processing unit 330, a memory 332, an operating system 334, a database management system 336, a Business Resilience Runtime Component 338, an application container 340 including one or more applications 342, and an I/O facility 344. It also may include more, less and/or different components.

I/O facility 344 is coupled to a dynamic switch 346 of an I/O subsystem 347. Dynamic switch 346 is further coupled to a control unit 348, which is coupled to one or more I/O devices 350.

Although examples of various environments are provided herein, these are only examples. Many variations to the above environments are possible and are considered within the scope of the present invention.

In the above-described environments, a Business Resilience Runtime Component of a Business Resilience System is included. Further details associated with a Business Resilience Runtime Component and a Business Resilience System are described with reference to FIG. 4.

In one example, a Business Resilience System 400 is a component that represents the management of recovery operations and configurations across an IT environment. Within that Business Resilience System, there is a Business Resilience Runtime Component (402) that represents the management functionality across multiple distinct Recovery Segments, and provides the service level automation and the support of creation of the recovery sequences. In addition, there are user interface (404), administration (406), installation (408) and configuration template (410) components within the Business Resilience System that enable the administrative operations that are to be performed. Each of these components is described in further detail below.

Business Resilience Runtime Component 402 includes a plurality of components of the BR System that are directly responsible for the collection of observations, creation of PSEs, policy acceptance, validation, error detection, and formulation of recovery sequences. As one example, Business Resilience Runtime Component 402 includes the following components:

1. One or more Business Resilience Managers (BRM) (412).
   The Business Resilience Manager (BRM) is the primary component containing logic to detect potential errors in the IT environment, perform assessment to find resources causing errors, and formulate recovery sequences to reestablish the desired state for resources for all Recovery Segments that may be impacted.
   The Business Resilience Manager is a component of which there can be one or more. It manages a set of Recovery Segments, and has primary responsibility to formulate recovery sequences. The association of which Recovery Segments are managed by a given BRM is determined at deployment time by the customer, with the help of deployment time templates. BRMs are primarily responsible for operations that relate to error handling and recovery workflow generation, and cross RS interaction.

2. One or more Recovery Segments (RS) (414).

Recovery Segments are customer-defined groupings of IT resources to which consistent availability policy is assigned. In other words, a Recovery Segment acts as a context within which resource recovery is performed. In many cases, Recovery Segments are compositions of IT resources that constitute logical entities, such as a middleware and its related physical resources, or an "application" and its related components.

There is no presumed granularity of a Recovery Segment. Customers can choose to specify fine-grained Recovery Segments, such as one for a given operating system, or a coarser grained Recovery Segment associated with a business process and its component parts, or even a site, as examples.

Relationships between IT resources associated with a RS are those which are part of the IT topology.

Recovery Segments can be nested or overlapped. In case of overlapping Recovery Segments, there can be policy associated with each RS, and during policy validation, conflicting definitions are reconciled. Runtime assessment is also used for policy tradeoff.

The Recovery Segment has operations which support policy expression, validation, decomposition, and assessment of state.

The number of Recovery Segments supported by a BR System can vary, depending on customer configurations and business needs.

One BRM can manage multiple Recovery Segments, but a given RS is managed by a single BRM. Further, Recovery Segments that share resources, or are subset/superset of other Recovery Segments are managed by the same BRM, in this example. Multiple BRMs can exist in the environment, depending on performance, availability, and/or maintainability characteristics.

3. Pattern System Environments (PSEs) (416).

Pattern System Environments (PSEs) are representations of a customer's environment. Sets of observations are clustered together using available mathematical tooling to generate the PSEs. In one embodiment, the generation of a PSE is automatic. A PSE is associated with a given RS, but a PSE may include information that crosses RSs.

As one example, the representation is programmatic in that it is contained within a structure from which information can be added/extracted.

4. Quantified Recovery Goal (418).

A quantified recovery goal, such as a Recovery Time Objective (RTO), is specified for each Recovery Segment that a customer creates. If customers have multiple Pattern System Environments (PSEs), a unique RTO for each PSE associated with the RS may be specified.

5. Containment Region (CR) (420).

Containment Region(s) are components of the BR System which are used at runtime to reflect the scope and impact of an outage. A Containment Region includes, for instance, identification for a set of impacted resources, as well as BR specific information about the failure/degraded state, as well as proposed recovery. CRs are associated with a set of impacted resources, and are dynamically constructed by BR in assessing the error.

The original resources reporting degraded availability, as well as the resources related to those reporting degraded availability, are identified as part of the Containment Region. Impacted resources are accumulated into the topology by traversing the IT relationships and inspecting the attributes defined to the relationships. The Containment Region is transitioned to an inactive state after a successful recovery workflow has completed, and after all information (or a selected subset in another example) about the CR has been logged.

6. Redundancy Groups (RG) (422).

Redundancy Group(s) (422) are components of the BR System that represent sets of logically equivalent services that can be used as alternates when a resource experiences failure or degradation. For example, three instances of a database may form a redundancy group, if an application server requires connectivity to one of the set of three, but does not specify one specific instance.

There can be zero or more Redundancy Groups in a BR System.

Redundancy Groups also have an associated state that is maintained in realtime, and can contribute to the definition of what constitutes available, degraded, or unavailable states. In addition, Redundancy Groups members are dynamically and automatically selected by the BR System, based on availability of the member and co-location constraints.

7. BR Manager Data Table (BRMD) (424).

BR maintains specific internal information related to various resources it manages and each entry in the BR specific Management Data (BRMD) table represents such a record of management. Entries in the BRMD represent IT resources.

8. BR Manager Relationship Data Table (BRRD) (426).

BR maintains BR specific internal information related to the pairings of resources it needs to interact with, and each entry in the BR specific Relationship Data (BRRD) table represents an instance of such a pairing. The pairing record identifies the resources that participate in the pairing, and resources can be any of those that appear in the BRMD above. The BRRD includes information about the pairings, which include operation ordering across resources, failure and degradation impact across resources, constraint specifications for allowable recovery actions, effect an operation has on resource state, requirements for resource to co-locate or anti-co-locate, and effects of preparatory actions on resources.

9. BR Asynchronous Distributor (BRAD) (428).

The BR Asynchronous Distributor (BRAD) is used to handle asynchronous behavior during time critical queries for resource state and key properties, recovery, and for getting observations back from resources for the observation log.

10. Observation Log(430).

The Observation Log captures the information that is returned through periodic observations of the environment. The information in the Observation Log is used by cluster tooling to generate Pattern System Environments (PSE).

11. RS Activity Log (432).
   Each RS has an activity log that represents the RS actions, successes, failures. Activity logs are internal BR structures. Primarily, they are used for either problem determination purposes or at runtime, recovery of failed BR components. For example, when the RS fails and recovers, it reads the Activity Log to understand what was in progress at time of failure, and what needs to be handled in terms of residuals.
12. BRM Activity Log (434).
   The BRM also has an activity log that represents BRM actions, success, failures. Activity logs are internal BR structures.
13. Transaction Table (TT) (436).
   The transaction table is a serialization mechanism used to house the counts of ongoing recovery and preparatory operations. It is associated with the RS, and is referred to as the RS TT.

In addition to the Business Resilience Runtime Component of the BR system, the BR system includes the following components, previously mentioned above.

Figure 5A:
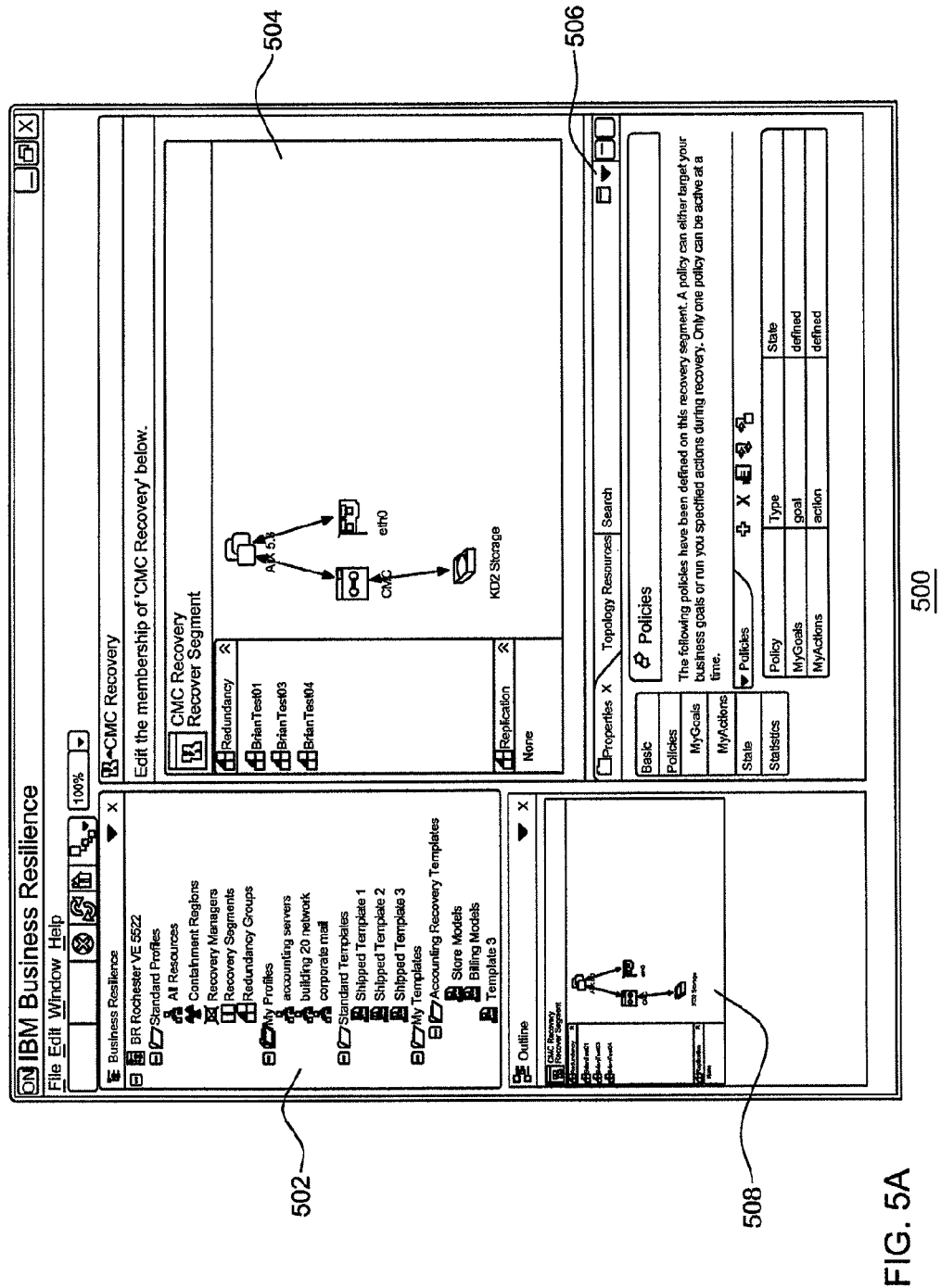
FIG. 5A depicts one example of a screen display of a business resilience perspective, in accordance with an aspect of the present invention.
Figure 5B:
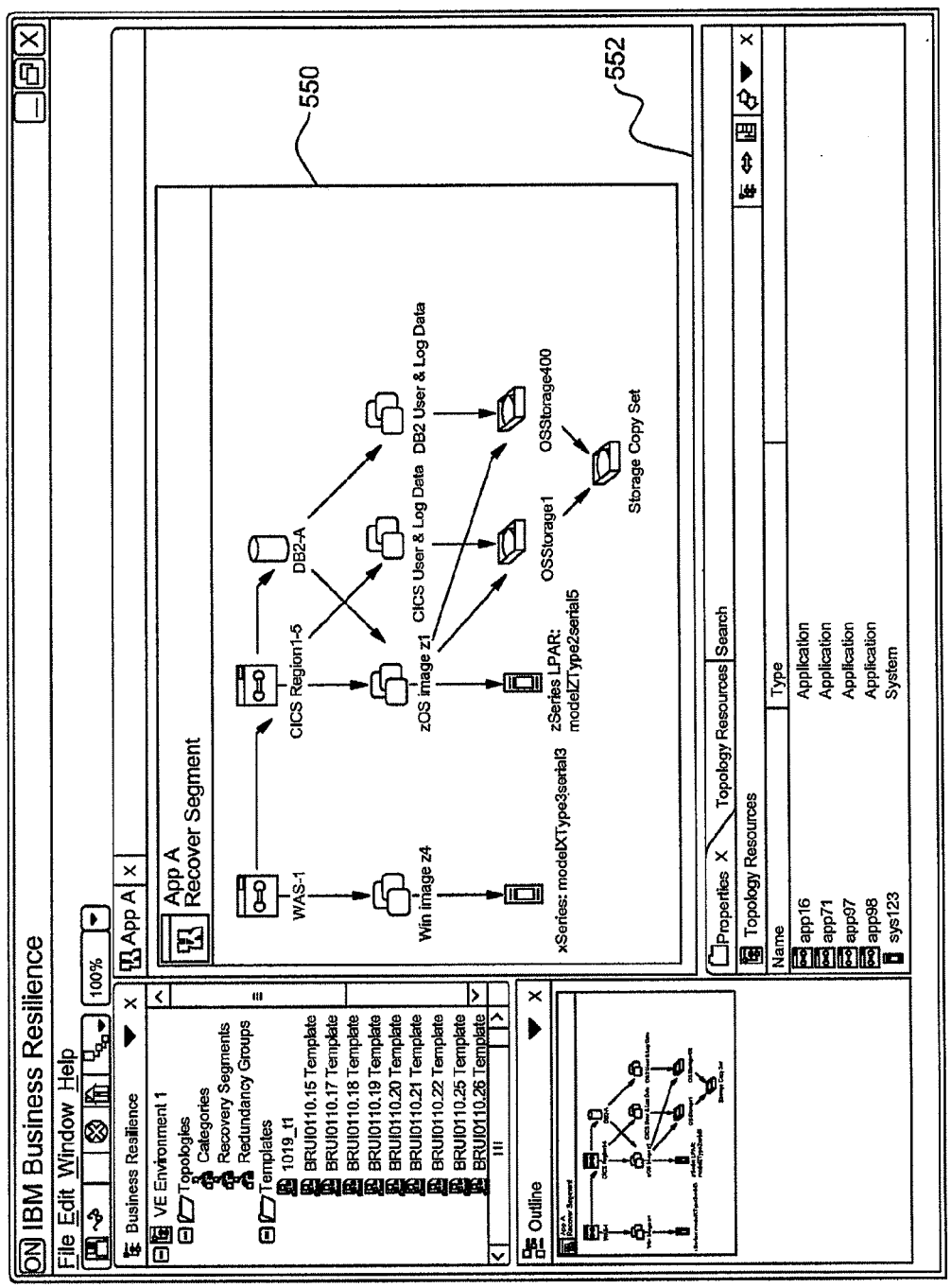
FIG. 5B depicts one example of a screen display of a Recovery Segment, in accordance with an aspect of the present invention.

User Interface (UI) Component (404).
   The User interface component is, for instance, a graphical environment through which the customer's IT staff can make changes to the BR configuration. As examples: create and manage Recovery Segments; specify recovery goals; validate achievability of goals prior to failure time; view and alter BR generated workflows.
   The user interface (UI) is used as the primary interface for configuring BR. It targets roles normally associated with a Business Analyst, Solution Architect, System Architect, or Enterprise Architect, as examples.
   One purpose of the BR UI is to configure the BR resources. It allows the user to create BR artifacts that are used for a working BR runtime and also monitors the behaviors and notifications of these BR resources as they run. In addition, the BR UI allows interaction with resources in the environment through, for instance, relationships and their surfaced properties and operations. The user can add resources to BR to affect recovery and behaviors of the runtime environment.
   The BR UI also surfaces recommendations and best practices in the form of templates. These are reusable constructs that present a best practice to the user which can then be approved and realized by the user.
   Interaction with the BR UI is based on the typical editor save lifecycle used within, for instance, the developmental tool known as Eclipse (available and described at www.Eclipse.org). The user typically opens or edits an existing resource, makes modifications, and those modifications are not persisted back to the resource until the user saves the editor.
   Predefined window layouts in Eclipse are called perspectives. Eclipse views and editors are displayed in accordance with the perspective's layout, which can be customized by the user. The BR UI provides a layout as exemplified in the screen display depicted in FIG. 5A.
   Screen display 500 depicted in FIG. 5A displays one example of a Business Resilience Perspective. Starting in the upper left corner and rotating clockwise, the user interface includes, for instance:
   1. Business Resilience View 502
      This is where the user launches topologies and definition templates for viewing and editing.
   2. Topology/Definition Template Editor 504
      This is where editors are launched from the Business Resilience View display. The user can have any number of editors open at one time.
   3. Properties View/Topology Resources View/Search View 506
      The property and topology resource views are driven off the active editor. They display information on the currently selected resource and allow the user to modify settings within the editor.
   4. Outline View 508
      This view provides a small thumbnail of the topology or template being displayed in the editor. The user can pan around the editor quickly by moving the thumbnail.
   The topology is reflected by a RS, as shown in the screen display of FIG. 5B. In FIG. 5B, a Recovery Segment 550 is depicted, along with a list of one or more topology resources 552 of the RS (not necessarily shown in the current view of the RS).
   In one example, the BR UI is created on the Eclipse Rich Client Platform (RCP), meaning it has complete control over the Eclipse environment, window layouts, and overall behavior. This allows BR to tailor the Eclipse platform and remove Eclipse artifacts not directly relevant to the BR UI application, allowing the user to remain focused, while improving usability.
   BR extends the basic user interface of Eclipse by creating software packages called "plugins' that plug into the core Eclipse platform architecture to extend its capabilities. By implementing the UI as a set of standard Eclipse plug-ins, BR has the flexibility to plug into Eclipse, WebSphere Integration Developer, or Rational product installs, as examples. The UI includes two categories of plug-ins, those that are BR specific and those that are specific to processing resources in the IT environment. This separation allows the resource plug-ins to be potentially re-used by other products.
   By building upon Eclipse, BR has the option to leverage other tooling being developed for Eclipse. This is most apparent in its usage of BPEL workflow tooling, but the following packages and capabilities are also being leveraged, in one embodiment, as well:
      The Eclipse platform provides two graphical toolkit packages, GEF and Draw2D, which are used by BR, in one example, to render topology displays and handle the rather advanced topology layouts and animations. These packages are built into the base Eclipse platform and provide the foundation for much of the tooling and topology user interfaces provided by this design.
      The Eclipse platform allows building of advanced editors and forms, which are being leveraged for BR policy and template editing. Much of the common support needed for editors, from the common save lifecycle to undo and redo support, is provided by Eclipse.
      The Eclipse platform provides a sophisticated Welcome and Help system, which helps introduce and helps users to get started configuring their environment. Likewise, Eclipse provides a pluggable capability to create task instructions, which can be followed step-by-step by the user to accomplish common or difficult tasks.

Figure 4:
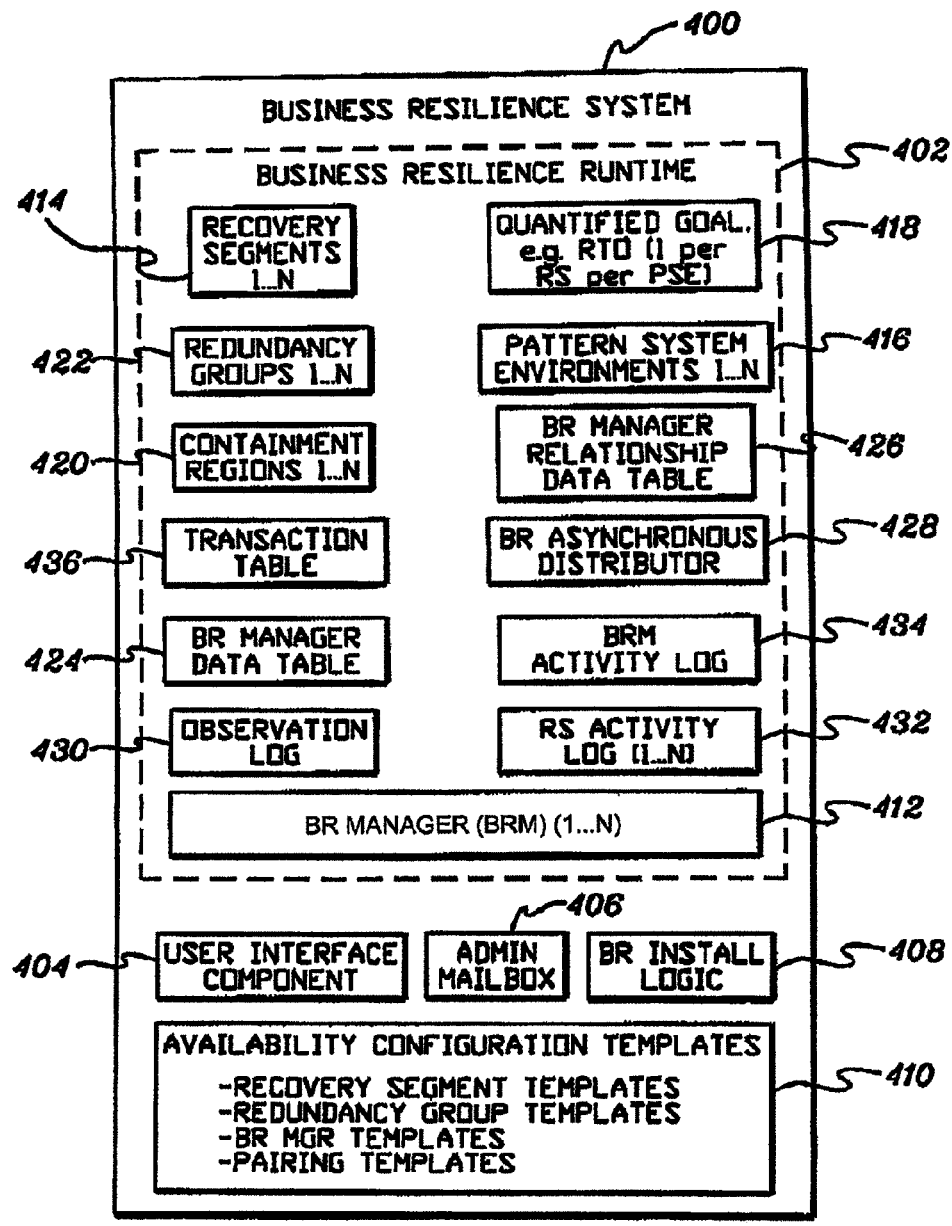
FIG. 4 depicts one embodiment of a Business Resilience System used in accordance with an aspect of the present invention.

BR Admin Mailbox (406) (FIG. 4).
   The BR Admin (or Administrative) Mailbox is a mechanism used by various flows of the BR runtime to get requests to an administrator to take some action. The Admin mailbox periodically retrieves information from a table, where BR keeps an up-to-date state.

As an example, the Admin Mailbox defines a mechanism where BR can notify the user of important events needing user attention or at least user awareness. The notifications are stored in the BR database so they can be recorded while the UI is not running and then shown to the user during their next session.

The notifications are presented to the user, in one example, in their own Eclipse view, which is sorted by date timestamp to bubble the most recent notifications to the top. An example of this view is shown in FIG. 6A. As shown, a view 600 is presented that includes messages 602 relating to resources 604. A date timestamp 606 is also included therewith.

Double clicking a notification opens an editor on the corresponding resource within the BR UI, which surfaces the available properties and operations the user may need to handle the notification.

The user is able to configure the UI to notify them whenever a notification exceeding a certain severity is encountered. The UI then alerts 650 the user of the notification and message when it comes in, as shown in FIG. 6B, in one example.

When alerted, the user can choose to open the corresponding resource directly. If the user selects No, the user can revisit the message or resource by using the above notification log view.

BR Install Logic (408) (FIG. 4).

The BR Install logic initializes the environment through accessing the set of preconfigured template information and vendor provided tables containing resource and relationship information, then applying any customizations initiated by the user.

Availability Configuration Templates (410):

Recovery Segment Templates

The BR System has a set of Recovery Segment templates which represent common patterns of resources and relationships. These are patterns matched with each individual customer environment to produce recommendations for RS definitions to the customer, and offer these visually for customization or acceptance.

Redundancy Group Templates

The BR System has a set of Redundancy Group templates which represent common patterns of forming groups of redundant resources. These are optionally selected and pattern matched with each individual customer environment to produce recommendations for RG definitions to a customer.

BR Manager Deployment Templates

The BR System has a set of BR Manager Deployment templates which represent recommended configurations for deploying the BR Manager, its related Recovery Segments, and the related BR management components. There are choices for distribution or consolidation of these components. Best practice information is combined with optimal availability and performance characteristics to recommend a configuration, which can then be subsequently accepted or altered by the customer.

Pairing Templates

The BR System has a set of Pairing Templates used to represent best practice information about which resources are related to each other.

The user interface, admin mailbox, install logic and/or template components can be part of the same computing unit executing BR Runtime or executed on one or more other distributed computing units.

To further understand the use of some of the above components and their interrelationships, the following example is offered. This example is only offered for clarification purposes and is not meant to be limiting in any way.

Figure 7:
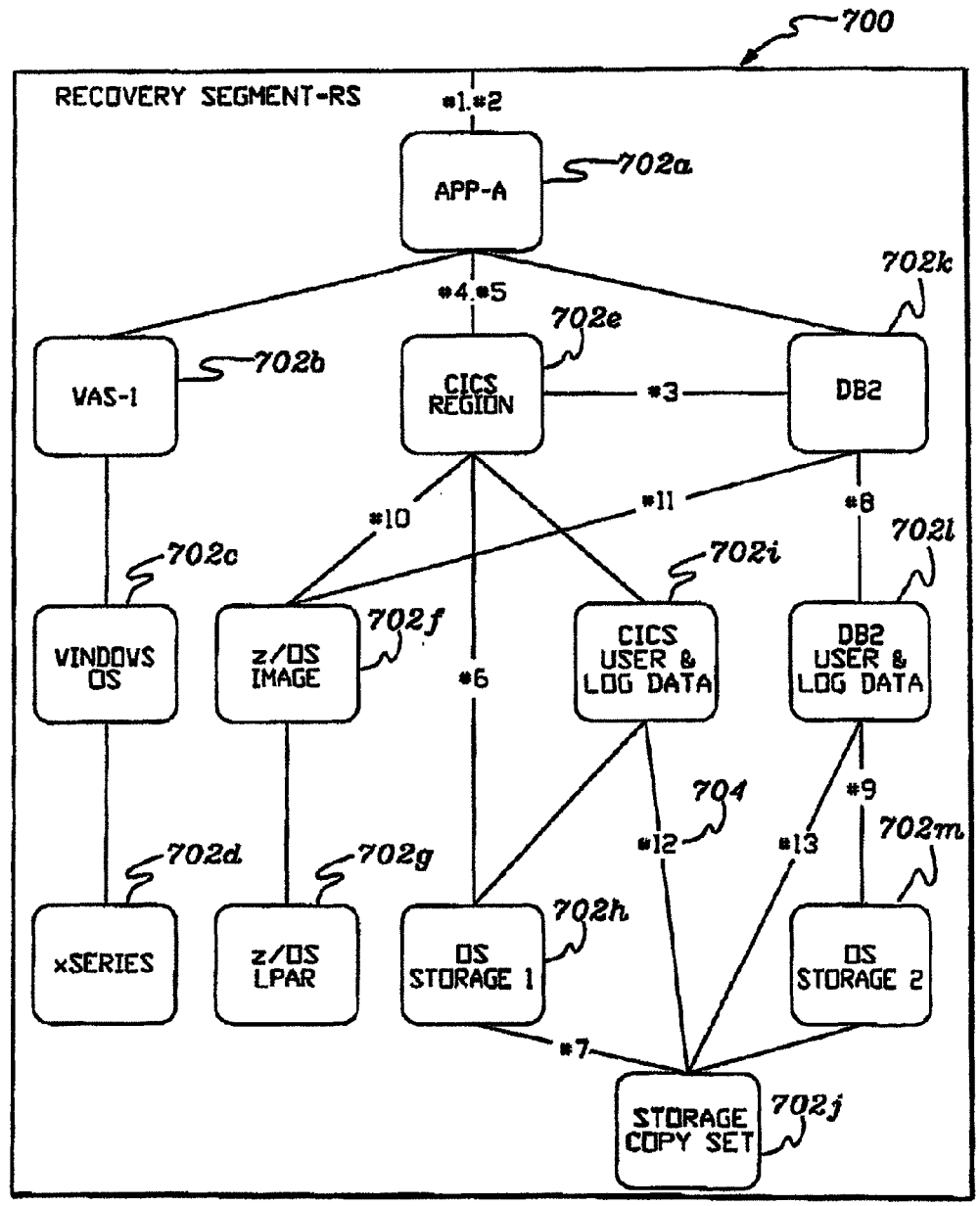
FIG. 7 depicts one example of a Recovery Segment of the Business Resilience System of FIG. 4, in accordance with an aspect of the present invention.

Referring to FIG. 7, a Recovery Segment RS 700 is depicted. It is assumed for this Recovery Segment that:

The Recovery Segment RS has been defined associated with an instantiated and deployed BR Manager for monitoring and management.

Relationships have been established between the Recovery Segment RS and the constituent resources 702a-702m.

A goal policy has been defined and validated for the Recovery Segment through interactions with the BR UI.

The following impact pairings have been assigned to the resources and relationships:

| Rule | Resource #1 | State | Resource #2 | State |
|---|---|---|---|---|
| 1 | App-A | Degraded | RS | Degraded |
| 2 | App-A | Unavailable | RS | Unavailable |
| 3 | DB2 | Degraded | CICS | Unavailable |
| 4 | CICS | Unavailable | App-A | Unavailable |
| 5 | CICS | Degraded | App-A | Degraded |
| 6 | OSStorage-1 | Unavailable | CICS | Degraded |
| 7 | OSStorage-1 | Unavailable | Storage Copy Set | Degraded |
| 8 | DB2 User & Log Data | Degraded | DB2 | Degraded |
| 9 | OSStorage-2 | Unavailable | DB2 User & Log Data | Degraded |
| 10 | z/OS | Unavailable | CICS | Unavailable |
| 11 | z/OS | Unavailable | DB2 | Unavailable |
| 12 | Storage Copy Set | Degraded | CICS User & Log Data | Degraded |
| 13 | Storage Copy Set | Degraded | DB2 User & Log Data | Degraded |

The rules in the above table correspond to the numbers in the figure. For instance, #12 (704) corresponds to Rule 12 above.

Observation mode for the resources in the Recovery Segment has been initiated either by the customer or as a result of policy validation.

The environment has been prepared as a result of that goal policy via policy validation and the possible creation and execution of a preparatory workflow.

The goal policy has been activated for monitoring by BR.

As a result of these conditions leading up to runtime, the following subscriptions have already taken place:

The BRM has subscribed to runtime state change events for the RS.

RS has subscribed to state change events for the constituent resources.

These steps highlight one example of an error detection process:

The OSStorage-1 resource 702h fails (goes Unavailable).

RS gets notified of state change event.

1st level state aggregation determines:

Copy Set→Degraded

CICS User & Log Data→Degraded

DB2 User & Log Data→Degraded

DB2→Degraded

CICS→Unavailable

App-A→Unavailable

1st level state aggregation determines:
RS→Unavailable
BRM gets notified of RS state change. Creates the following Containment Region:

| Resource | Reason |
|---|---|
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

Creates a recovery workflow based on the following resources:

| Resource | State |
|---|---|
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

In addition to the above, BR includes a set of design points that help in the understanding of the system. These design points include, for instance:

Goal Policy Support

BR is targeted towards goal based policies—the customer configures his target availability goal, and BR determines the preparatory actions and recovery actions to achieve that goal (e.g., automatically).

Availability management of the IT infrastructure through goal based policy is introduced by this design. The BR system includes the ability to author and associate goal based availability policy with the resource Recovery Segments described herein. In addition, support is provided to decompose the goal policy into configuration settings, preparatory actions and runtime procedures in order to execute against the deployed availability goal. In one implementation of the BR system, the Recovery Time Objective (RTO—time to recover post outage) is a supported goal policy. Additional goal policies of data currency (e.g., Recovery Point Objective) and downtime maximums, as well as others, can also be implemented with the BR system. Recovery Segments provide the context for association of goal based availability policies, and are the scope for goal policy expression supported in the BR design. The BR system manages the RTO through an understanding of historical information, metrics, recovery time formulas (if available), and actions that affect the recovery time for IT resources.

RTO goals are specified by the customer at a Recovery Segment level and apportioned to the various component resources grouped within the RS. In one example, RTO goals are expressed as units of time intervals, such as seconds, minutes, and hours. Each RS can have one RTO goal per Pattern System Environment associated with the RS. Based on the metrics available from the IT resources, and based on observed history and/or data from the customer, the RTO goal associated with the RS is evaluated for achievability, taking into account which resources are able to be recovered in parallel.

Based on the RTO for the RS, a set of preparatory actions expressed as a workflow is generated. This preparatory workflow configures the environment or makes alterations in the current configuration, to achieve the RTO goal or to attempt to achieve the goal.

In terms of optimizing RTO, there are tradeoffs associated with the choices that are possible for preparatory and recovery actions. Optimization of recovery choice is performed by BR, and may include interaction at various levels of sophistication with IT resources. In some cases, BR may set specific configuration parameters that are surfaced by the IT resource to align with the stated RTO. In other cases, BR may request that an IT resource itself alter its management functions to achieve some portion of the overall RS RTO. In either case, BR aligns availability management of the IT resources contained in the RS with the stated RTO.

Metrics and Goal Association

In this design, as one example, there is an approach to collecting the required or desired metrics data, both observed and key varying factors, system profile information that is slow or non-moving, as well as potential formulas that reflect a specific resource's use of the key factors in assessing and performing recovery and preparatory actions, historical data and system information. The information and raw metrics that BR uses to perform analysis and RTO projections are expressed as part of the IT resources, as resource properties. BR specific interpretations and results of statistical analysis of key factors correlated to recovery time are kept as BR Specific Management data (BRMD).

Relationships Used by BR, and BR Specific Resource Pairing Information

BR maintains specific information about the BR management of each resource pairing or relationship between resources. Information regarding the BR specific data for a resource pairing is kept by BR, including information such as ordering of operations across resources, impact assessment information, operation effect on availability state, constraint analysis of actions to be performed, effects of preparatory actions on resources, and requirements for resources to co-locate or anti-co-locate.

Evaluation of Failure Scope

One feature of the BR function is the ability to identify the scope and impact of a failure. The BR design uses a Containment Region to identify the resources affected by an incident. The Containment Region is initially formed with a fairly tight restriction on the scope of impact, but is expanded on receiving errors related to the first incident. The impact and scope of the failure is evaluated by traversing the resource relationships, evaluating information on BR specific resource pairing information, and determining most current state of the resources impacted.

Generation and Use of Workflow

Various types of preparatory and recovery processes are formulated and in some cases, optionally initiated. Workflows used by BR are dynamically generated based on, for instance, customer requirements for RTO goal, based on actual scope of failure, and based on any configuration settings customers have set for the BR system.

A workflow includes one or more operations to be performed, such as Start CICS, etc. Each operation takes time to execute and this amount of time is learned based on execution of the workflows, based on historical data in the observation log or from customer specification of execution time for operations. The workflows formalize, in a machine readable, machine editable form, the operations to be performed.

In one example, the processes are generated into Business Process Execution Language (BPEL) compliant workflows with activities that are operations on IT resources or specified manual, human activities. For example, BRM automatically generates the workflows in BPEL. This automatic generation includes invoking routines to insert activities to build the workflow, or forming the activities and building the XML (Extensible Mark-Up Language). Since these workflows are BPEL standard compliant, they can be integrated with other BPEL defined workflows which may incorporate manual activities performed by the operations staff. These BR related workflows are categorized as follows, in one example:

Preparatory—Steps taken during the policy prepare phase in support of a given goal, such as the setting of specific configuration values, or the propagation of availability related policy on finer grained resources in the Recovery Segment composition. BR generates preparatory workflows, for instance, dynamically. Examples of preparatory actions include setting up storage replication, and starting additional instances of middleware subsystems to support redundancy.

Recovery—Steps taken as a result of fault detection during runtime monitoring of the environment, such as, for example, restarting a failed operating system (OS). BR generates recovery workflows dynamically, in one example, based on the actual failure rather than a pre-specified sequence.

Preventive—Steps taken to contain or fence an error condition and prevent the situation from escalating to a more substantial outage or impact; for example, the severing of a failed resource's relationship instances to other resources. Preventive workflows are also dynamically generated, in one example.

Return—Steps taken to restore the environment back to 'normal operations' post recovery, also represented as dynamically generated workflows, as one example.

Capturing of Workflow Information

Since the set of BR actions described above modify existing IT environments, visibility to the actions that are taken by BR prior to the actual execution is provided. To gain trust in the decisions and recommendations produced by BR, the BR System can run in 'advisory mode'. As part of advisory mode, the possible actions that would be taken are constructed into a workflow, similar to what would be done to actually execute the processes. The workflows are then made visible through standard workflow authoring tooling for customers to inspect or modify. Examples of BPEL tooling include:

Bolie, et al., BPEL Cookbook: Best Practices for SOA-based Integration and Composite Applications Development, ISBN 1904811337, 2006, PACKT Publishing, hereby incorporated herein by reference in its entirety;

Juric, et al., Business Process Execution Language for Web Services: BPEL and BPEL YWS, ISBN 1-904811-18-3, 2004, PACKT Publishing, hereby incorporated herein by reference in its entirety.

http://www-306.ibm.com/software/integration/wid/about/?S_CMP=rnav http://www.eclipse.org/bpel/ http://www.parasoft.com/jsp/products/home.jsp;jessionid=aaa56iqFywA-HJ?product=BPEL&redname=googbpelm&referred=searchengine%2Fgoogle%Fbpel Tooling Lifecycle, Support of Managed Resources and Roles BR tooling spans the availability management lifecycle from definition of business objectives, IT resource selection, availability policy authoring and deployment, development and deployment of runtime monitors, etc. In one example, support for the following is captured in the tooling environment for the BR system:

Visual presentation of the IT resources & their relationships, within both an operations and administration context.

Configuration and deployment of Recovery Segments and BRMs.

Authoring and deployment of a BR policy.

Modification of availability configuration or policy changes for BR.

BPEL tooling to support viewing of BR created, as well as customer authored, workflows.

BPEL tooling to support monitoring of workflow status, related to an operations console view of IT resource operational state.

Policy Lifecycle

The policy lifecycle for BR goal policies, such as RTO goals, includes, for example:

Define—Policy is specified to a RS, but no action is taken by the BRM to support the policy (observation information may be obtained).

Validate—Policy is validated for syntax, capability, etc.; preparatory workflow created for viewing and validation by customer.

Prepare—Preparatory action workflows are optionally executed.

Activate—Policy is activated for runtime monitoring of the environment.

Modify—Policy is changed dynamically in runtime.

Configurable State Aggregation

One of the points in determining operational state of a Recovery Segment is that this design allows for customers to configure a definition of specific 'aggregated' states, using properties of individual IT resources. A Recovery Segment is an availability management context, in one example, which may include a diverse set of IT resources.

The customer may provide the rules logic used within the Recovery Segment to consume the relevant IT resource properties and determine the overall state of the RS (available, degraded and unavailable, etc). The customer can develop and deploy these rules as part of the Recovery Segment availability policy. For example, if there is a database included in the Recovery Segment, along with the supporting operating system, storage, and network resources, a customer may configure one set of rules that requires that the database must have completed the recovery of in-flight work in order to consider the overall Recovery Segment available. As another example, customers may choose to configure a definition of availability based on transaction rate metrics for a database, so that if the rate falls below some value, the RS is considered unavailable or degraded, and evaluation of 'failure' impact will be triggered within the BR system. Using these configurations, customers can tailor both the definitions of availability, as well as the rapidity with which problems are detected, since any IT resource property can be used as input to the aggregation, not just the operational state of IT resources.

Failure During Workflow Sequences of Preparatory, Recovery, Preventive

Failures occurring during sequences of operations executed within a BPEL compliant process workflow are intended to be handled through use of BPEL declared compensation actions, associated with the workflow activities that took a failure. The BR System creates associated "undo" workflows that are then submitted to compensate, and reset the environment to a stable state, based on where in the workflow the failure occurred.

Customer Values

The following set of customer values, as examples, are derived from the BR system functions described above, listed here with supporting technologies from the BR system:
- Align total IT runtime environment to business function availability objectives:
  - RS definition from representation of IT Resources;
  - Goal (RTO) and action policy specification, validation and activation; and
  - Tooling by Eclipse, as an example, to integrate with IT process management.
- Rapid, flexible, administrative level:
  - Alteration of operation escalation rules;
  - Customization of workflows for preparatory and recovery to customer goals;
  - Customization of IT resource selection from RG based on quality of service (QoS);
  - Alteration of definition of IT resource and business application state (available, degraded, or unavailable);
  - Customization of aggregated state;
  - Modification of topology for RS and RG definition;
  - Selection of BR deployment configuration;
  - Alteration of IT resource recovery metrics;
  - Customization of generated Pattern System Environments; and
  - Specification of statistical tolerances required for system environment formation or recovery metric usage.
- Extensible framework for customer and vendor resources:
  - IT resource definitions not specific to BR System; and
  - Industry standard specification of workflows, using, for instance, BPEL standards.
- Adaptive to configuration changes and optimization:
  - IT resource lifecycle and relationships dynamically maintained;
  - System event infrastructure utilized for linkage of IT resource and BR management;
  - IT resource recovery metrics identified and collected;
  - IT resource recovery metrics used in forming Pattern System Environments;
  - Learned recovery process effectiveness applied to successive recovery events;
  - System provided measurement of eventing infrastructure timing;
  - Dynamic formation of time intervals for aggregation of related availability events to a root cause; and
  - Distribution of achieved recovery time over constituent resources.
- Incremental adoption and coexistence with other availability offerings:
  - Potential conflict of multiple managers for a resource based on IT representation;
  - Workflows for recovery and preparatory reflect operations with meta data linked to existing operations;
  - Advisory mode execution for preparatory and recovery workflows; and
  - Incremental inclusion of resources of multiple types.
- Support for resource sharing:
  - Overlapping and contained RS;
  - Merger of CR across RS and escalation of failure scope; and
  - Preparatory and recovery workflows built to stringency requirements over multiple RS.
- Extensible formalization of best practices based on industry standards:
  - Templates and patterns for RS and RG definition;
  - Preparatory and recovery workflows (e.g., BPEL) for customization, adoption; and
  - Industry standard workflow specifications enabling integration across customer and multiple vendors.
- Integration of business resilience with normal runtime operations and IT process automation:
  - Option to base on IT system wide, open industry standard representation of resources;
  - BR infrastructure used for localized recovery within a system, cluster and across sites; and
  - Utilization of common system infrastructure for events, resource discovery, workflow processing, visualization.

Management of the IT environment is adaptively performed, as described herein and in a U.S. patent application "Adaptive Business Resiliency Computer System for Information Technology Environments," (POU920070364US1), Bobak et al., co-filed herewith, which is hereby incorporated herein by reference in its entirety.

Many different sequences of activities can be undertaken in creating a BR environment. The following represents one possible sequence; however, many other sequences are possible. This sequence is provided merely to facilitate an understanding of a BR system and one or more aspects of the present invention. This sequence is not meant to be limiting in any way. In the following description, reference is made to various U.S. patent applications, which are co-filed herewith.

On receiving the BR and related product offerings, an installation process is undertaken. Subsequent to installation of the products, a BR administrator may define the configuration for BR manager instances with the aid of BRM configuration templates.

Having defined the BRM configuration a next step could be to define Recovery Segments as described in "Recovery Segments for Computer Business Applications," (POU920070108US1), Bobak et al., which is hereby incorporated herein by reference in its entirety.

Definition of a RS may use a representation of resources in a topology graph as described in "Use of Graphs in Managing Computing Environments," (POU920070112US1), Bobak et al., which is hereby incorporated herein by reference in its entirety.

It is expected that customers will enable BR operation in "observation" mode for a period of time to gather information regarding key metrics and operation execution duration associated with resources in a RS.

At some point, sufficient observation data will have been gathered or a customer may have sufficient knowledge of the environment to be managed by BR. A series of activities may then be undertaken to prepare the RS for availability management by BR. As one example, the following steps may be performed iteratively.

A set of functionally equivalent resources may be defined as described in "Use of Redundancy Groups in Runtime Computer Management of Business Applications," (POU920070113 US1), Bobak et al., which is hereby incorporated herein by reference in its entirety.

Specification of the availability state for individual resources, redundancy groups and Recovery Segments may be performed as described in "Use of Multi-Level State Assessment in Computer Business Environments," (POU920070114US1), Bobak et al., which is hereby incorporated herein by reference in its entirety.

Representations for the IT environment in which BR is to operate may be created from historical information captured during observation mode, as described in "Computer Pattern System Environment Supporting Business Resiliency,"

(POU920070107US1), Bobak et al., which is hereby incorporated herein by reference in its entirety. These definitions provide the context for understanding how long it takes to perform operations which change the configuration—especially during recovery periods.

Information on relationships between resources may be specified based on recommended best practices—expressed in templates—or based on customer knowledge of their IT environment as described in "Conditional Computer Runtime Control of an Information Technology Environment Based on Pairing Constructs," (POU920070110US1), Bobak et al., which is hereby incorporated herein by reference in its entirety. Pairing processing provides the mechanism for reflecting required or desired order of execution for operations, the impact of state change for one resource on another, the effect execution of an operation is expected to have on a resource state, desire to have one subsystem located on the same system as another and the effect an operation has on preparing the environment for availability management.

With preliminary definitions in place, a next activity of the BR administrator might be to define the goals for availability of the business application represented by a Recovery Segment as described in "Programmatic Validation in an Information Technology Environment," (POU920070111US1), Bobak et al., which is hereby incorporated herein by reference in its entirety.

Managing the IT environment to meet availability goals includes having the BR system prioritize internal operations. The mechanism utilized to achieve the prioritization is described in "Serialization in Computer Management," (POU920070105US1), Bobak et al., which is hereby incorporated herein by reference in its entirety.

Multiple operations are performed to prepare an IT environment to meet a business application's availability goal or to perform recovery when a failure occurs. The BR system creates workflows to achieve the required or desired ordering of operations, as described in "Dynamic Generation of Processes in Computing Environments," (POU920070123US1), Bobak et al., which is hereby incorporated herein by reference in its entirety.

A next activity in achieving a BR environment might be execution of the ordered set of operations used to prepare the IT environment, as described in "Dynamic Selection of Actions in an Information Technology Environment," (POU920070117US1), Bobak et al., which is hereby incorporated herein by reference in its entirety.

Management by BR to achieve availability goals may be initiated, which may initiate or continue monitoring of resources to detect changes in their operational state, as described in "Real-Time Information Technology Environments," (POU920070120US1), Bobak et al., which is hereby incorporated herein by reference in its entirety. Monitoring of resources may have already been initiated as a result of "observation" mode processing.

Changes in resource or redundancy group state may result in impacting the availability of a business application represented by a Recovery Segment. Analysis of the environment following an error is performed. The analysis allows sufficient time for related errors to be reported, insures gathering of resource state completes in a timely manner and insures sufficient time is provided for building and executing the recovery operations—all within the recovery time goal, as described in "Management Based on Computer Dynamically Adjusted Discrete Phases of Event Correlation," (POU920070119US1), Bobak et al., which is hereby incorporated herein by reference in its entirety.

A mechanism is provided for determining if events impacting the availability of the IT environment are related, and if so, aggregating the failures to optimally scope the outage, as described in "Management of Computer Events in a Computer Environment," (POU920070118US1), Bobak et al., which is hereby incorporated herein by reference in its entirety.

Ideally, current resource state can be gathered after scoping of a failure. However, provisions are made to insure management to the availability goal is achievable in the presence of non-responsive components in the IT environment, as described in "Managing the Computer Collection of Information in an Information Technology Environment," (POU920070121 US1), Bobak et al., which is hereby incorporated herein by reference in its entirety.

With the outage scoped and current resource state evaluated, the BR environment can formulate an optimized recovery set of operations to meet the availability goal, as described in "Defining a Computer Recovery Process that Matches the Scope of Outage," (POU920070124US1), Bobak et al., which is hereby incorporated herein by reference in its entirety.

Formulation of a recovery plan is to uphold customer specification regarding the impact recovery operations can have between different business applications, as described in "Managing Execution Within a Computing Environment," (POU920070115US1), Bobak et al., which is hereby incorporated herein by reference in its entirety.

Varying levels of recovery capability exist with resources used to support a business application. Some resources possess the ability to perform detailed recovery actions while others do not. For resources capable of performing recovery operations, the BR system provides for delegation of recovery if the resource is not shared by two or more business applications, as described in "Conditional Actions Based on Runtime Conditions of a Computer System Environment," (POU920070116US1), Bobak et al., which is hereby incorporated herein by reference in its entirety.

Having evaluated the outage and formulated a set of recovery operations, the BR system resumes monitoring for subsequent changes to the IT environment.

In support of mainline BR system operation, there are a number of activities including, for instance:

Coordination for administrative task that employ multiple steps, as described in "Adaptive Computer Sequencing of Actions," (POU920070106US1), Bobak et al., which is hereby incorporated herein by reference in its entirety.

Use of provided templates representing best practices in defining the BR system, as described in "Defining and Using Templates in Configuring Information Technology Environments," (POU920070109US1), Bobak et al., which is hereby incorporated herein by reference in its entirety.

Use of provided templates in formulation of workflows, as described in "Using Templates in a Computing Environment," (POU920070126US1), Bobak et al., which is hereby incorporated herein by reference in its entirety.

Making changes to the availability goals while supporting ongoing BR operation, as described in "Non-Disruptively Changing a Computing Environment," (POU920070122US1), Bobak et al., which is hereby incorporated herein by reference in its entirety.

Making changes to the scope of a business application or Recovery Segment, as described in "Non-Disruptively Changing Scope of Computer Business Applications Based on Detected Changes in Topology,"

(POU920070125US1), Bobak et al., which is hereby incorporated herein by reference in its entirety.

Detecting and recovery for the BR system is performed non-disruptively, as described herein, in accordance with one or more aspects of the present invention.

In order to build a BR environment that meets recovery time objectives, IT configurations within a customer's location are to be characterized and knowledge about the duration of execution for recovery time operations within those configurations is to be gained. IT configurations and the durations for operation execution vary by time, constituent resources, quantity and quality of application invocations, as examples. Customer environments vary widely in configuration of IT resources in support of business applications. Understanding the customer environment and the duration of operations within those environments aids in insuring a Recovery Time Objective is achievable and in building workflows to alter the customer configuration of IT resources in advance of a failure and/or when a failure occurs.

A characterization of IT configurations within a customer location is built by having knowledge of the key recovery time characteristics for individual resources (i.e., the resources that are part of the IT configuration being managed; also referred to as managed resources). Utilizing the representation for a resource, a set of key recovery time objective (RTO) metrics are specified by the resource owner. During ongoing operations, the BR manager gathers values for these key RTO metrics and gathers timings for the operations that are used to alter the configuration. It is expected that customers will run the BR function in "observation" mode prior to having provided a BR policy for availability management or other management. While executing in "observation" mode, the BR manager periodically gathers RTO metrics and operation execution durations from resource representations. The key RTO metrics properties, associated values and operation execution times are recorded in an Observation log for later analysis through tooling. Key RTO metrics and operation execution timings continue to be gathered during active BR policy management in order to maintain currency and iteratively refine data used to characterize customer IT configurations and operation timings within those configurations.

Examples of RTO properties and value range information by resource type are provided in the below table. It will be apparent to those skilled in the art that additional, less, and/or different resource types, properties and/or value ranges may be provided.

| Resource Type | Property | Value Range |
| --- | --- | --- |
| Operating System | Identifier | Text |
| | State | Ok, stopping, planned stop, stopped, starting, error, lost monitoring capability, unknown |
| | Memory Size | Units in MB |
| | Number of systems in sysplex, if applicable | integer |
| | Last IPL time of day | Units in time of day/clock |
| | Type of last IPL | Cold, warm, emergency |
| | Total Real Storage Available | Units in MB |
| | GRS Star Mode | Yes or No |
| | Complete IPL time to reach 'available' | Units of elapsed time |
| | Total CPU using to reach available during IPL | Units of elapsed time |
| | Total CPU delay to reach available during IPL | Units of elapsed time |
| | Total Memory using to reach available during IPL | Units in MB |
| | Total Memory delay to reach available during IPL | Units of elapsed time |
| | Total i/o requests | Integer value, number of requests |
| | Total i/o using to reach available during IPL | Units of elapsed time |
| | Total i/o delay to reach available during IPL | Units of elapsed time |
| Computer System (LPAR, Server, etc.) | Identifier | Text |
| | State | Ok, stopping, stopped, planned down, starting, error, lost monitoring capability, unknown |
| | Type of CPU - model, type, serial | Text value |
| | Number of CPUs | integer |
| | Number of shared processors | integer |
| | Number of dedicated processors | integer |
| | Last Activate Time of Day | Units in time of day/clock |
| Network Components | | |
| Group of Network Connections | Identity | |
| | Operational State | Ok, Starting, Disconnected, Stopping, Degraded, Unknown |
| | State of each associated Network Application Connection | Text |
| | Performance Stats on loss and delays | Complex |
| | Recovery Time for any associated application network connections | Units in elapsed time |

-continued

| Resource Type | Property | Value Range |
|---|---|---|
| | Number of active application network connections associated at time of network problem | Integer |
| | Stopped Time/duration for group of connectoins | Units in elapsed time |
| | Maximum Network Recovery Time for any application connection in group | Units in elapsed time |
| | Maximum Number of active connections at time of network problem encountered, for any application connection in group | Integer |
| | Maximum Number of connections processed at time of network recovery, for the group of connections | Integer |
| | Maximum network connection recovery time/duration for any application connection in the group | Units in elapsed time |
| | Maximum Number of connections dropped at time of application network connection recovery, for any application connection in the group | Integer |
| Network Application Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Network Recovery Time for app connection | Units in elapsed time |
| | Number of active connections at time of network problem encountered, on a per app connection basis | Integer |
| | Number of connections processed at time of network recovery, for the app connection | Integer |
| | application network connection recovery time/duration | Units in elapsed time |
| | Number of connections at time of application network connection problem encountered | Integer |
| | Number of connections processed at time of application network connection recovery | Integer |
| | Number of connections dropped at time of application network connection recovery | Integer |
| Network Host Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Number of QoS Events, indicating potential degradation | Integer |
| | Number of QoS Events handled, | Integer |
| | Last handled QoS Event | Text |

| Resource Type | Property | Value Range |
|---|---|---|
| Database Subsystem | Name, identifier | Text |
| | Operational State | Operational, Nonoperational, starting, stopping, in recovery, log suspended, backup initiated, restore initiated, restore complete, in checkpoint, checkpoint completed, applying log, backing out inflights, resolving indoubts, planned termination, lost monitoring capability |
| | Time spent in log apply | Units of elapsed time |
| | Time spent during inflight processing | Units of elapsed time |
| | Time spent during indoubt processing | Units of elapsed time |
| | Total time to restart | Units of elapsed time |
| | Checkpoint frequency | Units of time |
| | Backout Duration | Number of records to read back in log during restart processing |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O using during restart | Units of elapsed time |
| | I/O Delay during restart | Units of elapsed time |
| Database Datasharing Group | Identifer | Text |
| | Operational State | Operational, nonoperational, degraded (some subset of members non operational), lost monitoring capability |
| | Number of locks in Shared Facility | Integer value |
| | Time spent in lock cleanup for last restart | Elapsed time value |
| Database | Identifier | Text |
| Tablespace | Identifier | Text |
| Transaction Region | Identifier | Text |
| | Name | Text |
| | Associated job name | Text |
| | Maximum number of tasks/threads | Integer value |
| | Restart type for next restart | Warm, cold, emergency |
| | Forward log name | Text |
| | System log name | Text |
| | Operational State | Operational, nonoperational, in recovery, starting, stop normal first quiesce, stop normal second quiesce, stop normal third quiesce |
| | Time spent in log apply | Units of elapsed time |
| | Time during each recovery stage | Units of elapsed time |
| | Total time to restart | Units of elapsed time |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O connect time during restart | Units of elapsed time |
| | I/O Delay during restart | Units of elapsed time |
| | System Logsize | Units in MB |
| | Forward Logsize | Units in MB |
| | Activity Keypoint frequency | Integer - number of writes before activity checkpoint taken |
| | Average Transaction Rate for this region | Number of transactions per second, on average |
| Transaction Group | Group name | Text |
| Transaction Region File | Filename | Text |
| | Region Name | Text |
| | Dataset Name | Text |
| | Operational State | Operational/enabled, nonoperational/disabled |
| | Open status | Open, closed, closing |

-continued

| Resource Type | Property | Value Range |
|---|---|---|
| Transaction | Identifier | Text |
| | Operational State | Running, failed, shunted, retry in progress |
| | Region Name (s) that can run this transaction | Text |
| | Program Name | Text |
| Logical Replication Group of related datasets | Identity | Text |
| | State | |
| | Required currency characteristics for datasets | Complex |
| | Required consistency characteristics for datasets | Complex |
| Replication Group | Identity | |
| | State | |
| Replication Session | Identity | |
| | State | Established, in progress replication, replication successful complete |
| | Type of Session | Flash copy, metro mirror, etc. |
| | Duration of last replication | Units in elapsed time |
| | Time of Day for last replication | Units in time of day/clock |
| | Amount of data replicated at last replication | Units in MB |
| Roleset | Identity | Text |
| | State | |
| CopySet | Identity | Text |
| | State | |
| Dataset | Identity | Text |
| | State | Open, Closed |
| Storage Group | Identity | Text |
| | State | |
| Storage Volume | Identity | Text |
| | State | Online, offline, boxed, unknown |
| Logical Storage Subsystem | Identity | Text |
| | State | |
| Storage Subsystem | Identity | Text |
| | State | |
| | Subsystem I/O Velocity - ratio of time channels are being used | |
| Replication Link (Logical) between Logical Subsystems | Identity | Text |
| | State | Operational, nonoperational, degraded redundancy |
| | Number of configured pipes | Integer |
| | Number of operational pipes | Integer |

Figure 8A:
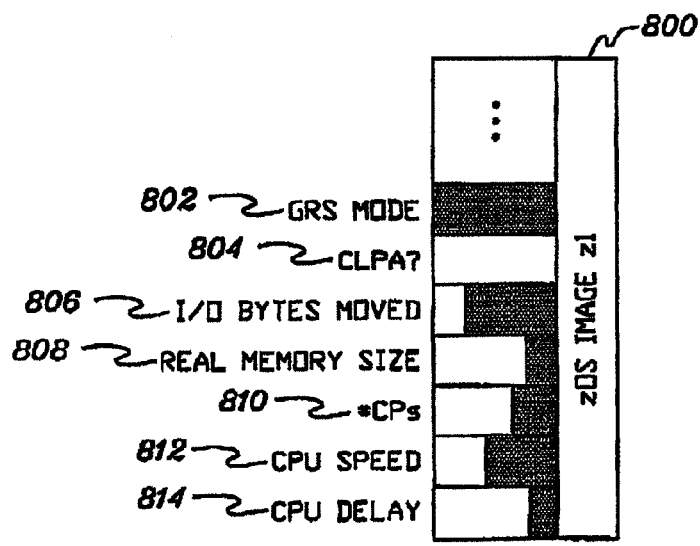
FIG. 8A depicts examples of key Recovery Time Objective properties for a particular resource, in accordance with an aspect of the present invention.

A specific example of key RTO properties for a z/OS® image is depicted in FIG. 8A. As shown, for a z/OS® image 800, the following properties are identified: GRS mode 802, CLPA? (i.e., Was the link pack area page space initialized?) 804, I/O bytes moved 806, real memory size 808, # CPs 810, CPU speed 812, and CPU delay 814, as examples.

Figure 8B:
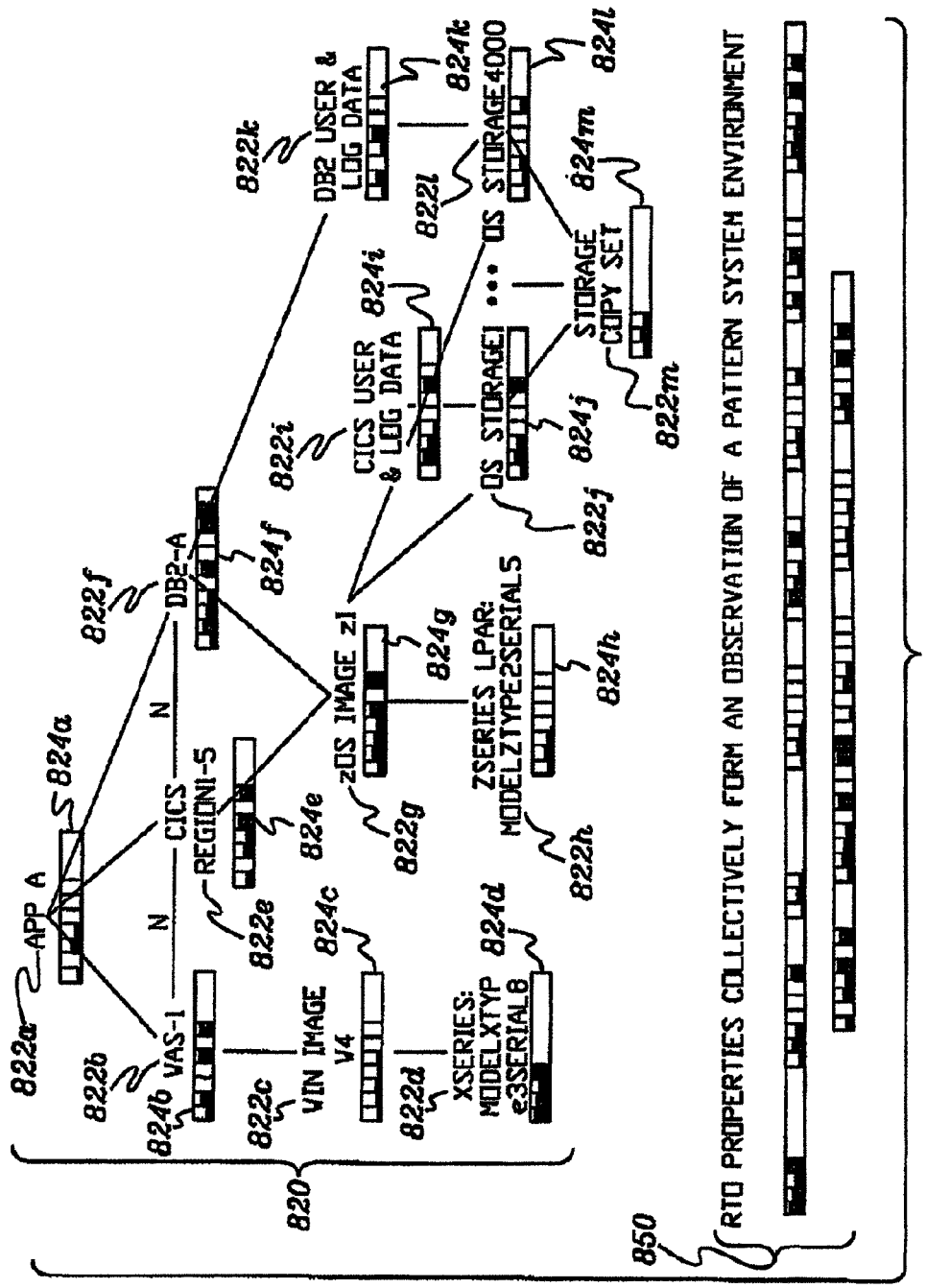
FIG. 8B depicts one example in which Recovery Time Objective properties collectively form an observation of a Pattern System Environment, in accordance with an aspect of the present invention.

The z/OS® image has a set of RTO metrics associated therewith, as described above. Other resources may also have its own set of metrics. An example of this is depicted in FIG. 8B, in which a Recovery Segment 820 is shown that includes a plurality of resources 822a-m, each having its own set of metrics 824a-m, as indicated by the shading.

Further, in one example, the RTO properties from each of the resources that are part of the Recovery Segment for App A have been gathered by BR and formed into an "observation" for recording to the Observation log, as depicted at 850.

Resources have varying degrees of functionality to support RTO goal policy. Such capacity is evaluated by BR, and expressed in resource property RTOGoalCapability in the BRMD entry for the resource. Two options for BR to receive information operation execution timings are: use of historical data or use of explicitly customer configured data. If BR relies on historical data to make recovery time projections, then before a statistically meaningful set of data is collected, this resource is not capable of supporting goal policy. A mix of resources can appear in a given RS—some have a set of observations that allow classification of the operation execution times, and others are explicitly configured by the customer.

Calculation of projected recovery time can be accomplished in two ways, depending on customer choice: use of historical observations or use of customers input timings. The following is an example of values for the RTOGoalCapability metadata that is found in the BRMD entry for the resource that indicates this choice:

| | |
|---|---|
| UseHistoricalObservations | The resource has a collection of statistically meaningful observations of recovery time, where definition of 'statistically valid' is provided on a resource basis, as default by BR, but tailorable by customers |
| UseCustomerInputTimings | The customer can explicitly set the operation timings for a resource |

If the customer is in observation mode, then historical information is captured, regardless of whether the customer has indicated use of explicitly input timings or use of historical information.

The administrator can alter, on a resource basis, which set of timings BR is to use. The default is to use historical observations. In particular, a change source of resource timing logic is provided that alters the source that BR uses to retrieve resource timings. The two options for retrieving timings are from observed histories or explicitly from admin defined times for operation execution. The default uses information from the observed histories, gathered from periodic polls. If the customer defines times explicitly, the customer can direct BR to use those times for a given resource. If activated, observation mode continues and captures information, as well as running averages, and standard deviations. The impact to this logic is to alter the source of information for policy validation and formulation of recovery plan.

With respect to the historical observations, there may be a statistically meaningful set of observations to verify. The sample size should be large enough so that a time range for each operation execution can be calculated, with a sufficient confidence interval. The acceptable number of observations to qualify as statistically meaningful, and the desired confidence interval are customer configurable using BR UI, but provided as defaults in the BRMD entry for the resource. The default confidence interval is 95%, in one example.

There are metrics from a resource that are employed by BR to enable and perform goal management. These include, for instance:

Values of statistical thresholds to indicate sufficient observations for goal managing the resource (number of observations, max standard deviations, confidence level).

In addition to the resources defined herein as part of the IT configuration that is managed, there are other resources, referred to herein as assessed resources. Assessed resources are present primarily to provide observation data for PSE formation, and to understand impact(s) on managed resources. They do not have a decomposed RTO associated with them nor are they acted on for availability by BR. Assessed resources have the following characteristics, as examples:

Are present to collect observation data for PSE formation.
Are present to understand impacts on managed resources.
No decomposed RTO is associated with an assessed resource.
They are resources on which resources managed by BR depend upon, but are not directly acted on for availability by BR.
They are resources removed (or not explicitly added) from the actively monitored set of resources by the BR admin during RS definition.
They are resources that BR does not try to recover and BR thus will not invoke any preparatory or recovery operations on them.

| Metric | Qualification |
| --- | --- |
| Last observed recovery/restart time | In milliseconds; or alternately specifying units to use in calculations |
| The key factors and associated values of the resource that affect recovery time | Captured at last observed recovery time, and capturable at a point in time by BR |
| The key factors and associated values of the resource that affect other dependent resources' recovery times | Captured at last observed recovery time, and capturable at a point in time by BR |
| Observed time interval from 'start' state to each 'non-blocking' state | If there are various points in the resource recovery lifecycle at which it becomes non-blocking to other resources which depend upon it, then: Observed time interval from 'start' state to each 'non-blocking' state |
| Resource Consumption Information | If the resource can provide information about its consumption, or the consumption of dependent resources, on an interval basis, then BR will use this information in forming PSEs and classifying timings. One example of this is: cpu, i/o, memory usage information that is available from zOS WLM for an aggregation of processes/address spaces over a given interval. |

There is also a set of information about the resource that is employed—this information is provided as defaults in the BRMD entry for the resource, but provided to the BR team in the form of best practices information/defaults by the domain owners:

The operational state of the resource at which the observed recovery time interval started.
The operational state of the resource at which the observed recovery time interval ended.
The operational states of the resource at which point it can unblock dependent resources (example: operational states at which a DB2 could unblock new work from CICS, at which it could allow processing of logs for transactions ongoing at time of failure . . . ).

Similarly, there are likely scenarios where a resource exists in a customer environment that already has an alternative availability management solution, and does not require BR for its availability. However, since other resources that are managed by BR may be dependent on them, they are observed and assessed in order to collect observation data and understand their impacts on managed resources. Additionally, there may be resources that do not have alternative management solutions, but the customer simply does not want them managed by BR, but other managed resources are dependent upon them. They too are classified as assessed resources.

These assessed resources share many of the same characteristics of managed resources, such as, for example:

They have an entry in the BRMD, depending on their use, and the BRMD entry has an indication of assessed vs. managed.

The RS subscribes to state change notifications for assessed resources (and possibly other notifiable properties).

Relationships between observed and managed resources are possible (and likely).

BR monitors for lifecycle events on assessed resources in the same manner as for managed resources.

Assessed resources can be added and/or removed from Recovery Segments.

They can be used to contribute to the aggregated state of an RS.

Finally, there are a few restrictions that BR imposes upon assessed resources, in this embodiment:

Again, BR does not invoke any workflow operations on assessed resources.

A resource that is shared between two Recovery Segments is not categorized as an assessed resource in one RS and a managed resource in the other. It is one or the other in the RS's, but not both.

To facilitate the building of the customer's IT configuration, observations regarding the customer's environment are gathered and stored in an observation log. In particular, the observation log is used to store observations gathered during runtime in customer environments, where each observation is a collection of various data points. They are created for each of the Recovery Segments that are in "observation" mode. These observations are used for numerous runtime and administrative purposes in the BR environment. As examples the observations are used:

To perform statistical analysis from the BR UI to form characterizations of customers' normal execution environments, represented in BR as Pattern System Environments (PSE).

To classify operations on resources into these PSEs for purposes of determining operation execution duration.

Help determine approximate path length of operations that are pushed down from BR to the resources, and possibly to the underlying instrumentation of each resource.

Help determine approximate path length of activities executed within BPEL workflows.

Finally, the data collected via the observation is also used to update the metadata associated with the resource (i.e., in the BRMD table) where appropriate.

BR gathers observations during runtime when "observation mode" is enabled at the Recovery Segment level. There are two means for enabling observation mode, as examples:

1. The BR UI allows the administrator to enable observation mode at a Recovery Segment, which will change its "ObservationMode" resource property to "True", and to set the polling interval (default=15 minutes). The Recovery Segment is defined in order to allow observation mode, but a policy does not have to be defined or activated for it.

2. Once a policy is defined though and subsequently activated, observation mode is set for the Recovery Segment (due to the data being used in managing and monitoring the customer's environment). Thus, it is set automatically at policy activation, if not already set explicitly by the administrator (see 1 above) using the default polling interval (15 minutes).

The administrator may also disable observation mode for a Recovery Segment, which stops it from polling for data and creating subsequent observation records for insertion in the log. However, the accumulated observation log is not deleted. In one example, an RS remains in observation mode throughout its lifecycle. The UI displays the implications of disabling observation mode.

In BR, the observations that are collected by BR during runtime can be grouped into two categories, as examples:
1. Periodic poll.
2. Workflow (includes workflow begin/end, and workflow activity begin/end).

A periodic poll observation is a point-in-time snapshot of the constituent resources in a Recovery Segment. Observation data points are collected for those resources in the Recovery Segment(s) which have associated BR management data for any of the following reasons, as examples:
1. Resource has RTO properties.
2. Resource has operations.
3. Resource participates in the aggregated state for the Recovery Segment, in which it is contained.
4. Resource participates in any of the six types of pairing rules.

The full value of these observations is derived for an RS when they include data that has been gathered for its constituent resources, plus the resources that those are dependent upon. In one embodiment, the administrator is not forced to include all dependent resources when defining a Recovery Segment, and even if that were the case, there is nothing that prevents them from deleting various dependent resources. When defining a Recovery Segment, the BR UI provides an option that allows the customer to display the dependency graph for those resources already in the Recovery Segment. This displays the topology from the seed node(s) in the Recovery Segment down to and including the dependent leaf nodes. The purpose of this capability is to give the customer the opportunity to display the dependent nodes and recommend that they be included in the Recovery Segment.

Preparatory and recovery workflows are built by the BR manager to achieve the customer requested RTO policy based on resource operations timings. During active policy monitoring by the BR manager, measurements of achieved time for operations are recorded in observations to the log and used to maintain the running statistical data on operation execution times. Observations written to the log may vary in the contained resource RTO metrics and operation execution timings.

Observations are also collected from any of the BPEL workflows created by BR in the customer's environment. There is a standard template that each BR BPEL workflow uses. As part of that template, observation data is captured at the start of, during, and at the completion of each workflow. Specifically, in one example, one observation is created at the end of the workflow with data accumulated from completion of each activity. This information is used to gather timings for workflow execution for use in creating subsequent workflows at time of failure.

In accordance with an aspect of the present invention, a capability is provided for facilitating recovery of components of an IT environment used to manage the environment. The recovery enables the components to be recovered, as well as continues the tasks that were being performed by those components prior to recovery.

Deficiencies in Existing Capabilities

In today's environment, components that manage the IT environment are frequently not able to handle failures in the components themselves, or failures in other dependent components that are used in managing the system. At best, there is a fixed, pre-defined 'secondary' management component to replace the primary component in case of failure. However, the technology available today has the following deficiencies:

The secondary or alternate management components are not selected based on assessment of current system environment, and therefore, may themselves have availability or other goal management problems.

The transition to a secondary or alternate management component causes disruption in any service provided by the management component for the time period of the switch.

Any monitoring or other components that are used by the primary management component are not considered and the recovery of the primary management component is not done in a way to coordinate with failures of other components used by the system.

A failure of a component that has a dependent set of other components which need to be assessed and potentially reinstated together is not addressed.

Ongoing IT management processes are not handled in that they are not preserved, continued and/or appropriately reversed with transactional integrity or reinstated.

Failures in the alternate or secondary components often cause inability to continue any processing.

Overview of Processing

In accordance with an aspect of the present invention, a capability is provided for creating a recovery system for IT management components that is dynamic in selection of alternate components, preserves ongoing processing that was being handled by the components at time of failure, addresses redundant failures of components, and preserves dependencies between management components when selecting restart hosting environments or operating systems.

In the example implementation described herein, the IT management system for which recovery processing is described is a system that performs availability management, and can itself have in progress recoveries at time of management system failure. In other implementations, the management system may be one related to performance management, configuration management or other management. In the context of the example implementation, the BRM (Business Resilience Manager) is the primary runtime management component, and the set of resources used by a business application along with the relationships between those resources is described as a Recovery Segment (RS), where an instance of a RS is also the management component for the business application that it represents.

Recovery for failure of BR system components may be achieved through utilization of BRM monitoring of one or more RS(s), BRM group monitoring and restart processing which evaluates activity log records. In one implementation, a RS is associated with a BRM during Define RS routine processing, as described in "Recovery Segments for Computer Business Applications," (POU920070108US1), Bobak et al., which is hereby incorporated herein by reference in its entirety. In the example implementation, the associated BRM utilizes event subscription and notification services which provide the associated BRM notification should the RS fail. Restart of a failed RS is requested by the associated BRM. Restart processing for the RS utilizes activity log data to reestablish RS functionality. BRM group monitoring is established when a BRM is made active within the customer IT environment. Establishing a BRM group monitoring is achieved through customer specification of candidate hosting environments for a BRM and customer specification of a collection of BRM instances, each of which may use event subscription and notification services, in one implementation. The BRM instances of a monitoring group are notified when a monitored instance of a BRM fails. One of the monitoring BRM instances assumes responsibility for restarting the failed BRM using serialization of updates to a defined database record for coordinating BRM failure. The BRM assuming responsibility initiates restart processing for the failed BRM. Restart processing for the BRM utilizes activity log data to reestablish BRM functionality.

Activity log data for both BRM and RS instances includes records reflecting the beginning and the end of processes which entail multiple transactions or processes which are executed outside a transaction scope. Restart processing for BRM and RS instances read sequentially through activity log records noting where there are records for the start of an operation sequence with no matching end for the operation sequence. Restart logic includes steps for each such process which either rollback intermediate results or forward complete. For example, forward completion of CR processing is performed during RS restart processing. Rollback is performed for partially completed define RS processing for a new RS. The determination of forward completion or rollback is based on whether or not changes to the BR system environment may have been made by the partially completed process which alter ongoing operation of the BR system. If partial results made visible could have altered ongoing BR system operation, forward completion is undertaken. Otherwise, rollback is performed.

Setup of Peer BRM Monitoring

In accordance with an aspect of the present invention, there is a peer monitoring across the runtime management components, where each runtime management component (in one implementation, a BRM) has a set of other runtime management components (e.g., BRMs) that monitor its state. Any time a failure is detected, one of the peer monitoring BRMs claim processing to recover the failed BRM. The set up for peer BRM monitoring can be performed using various implementations, and in one implementation, is performed at time of BRM deployment. During BRM deployment, the following is input by the customer in one implementation, or can be read from an input file in another implementation, or alternatively, templates representing best practices for deployment of BRM components predicated on the one or more RS(s) managed and their constituent resources may be applied to the topology to recommend a BRM configuration:

Choice of hosting environment and OS where the BRM should preferably reside.

Choice of target on which to instantiate/start the BRM.

Choice of set of BRMs responsible for monitoring the state of the BRM being deployed (as alternates).

Choice of which BRMs this BRM will monitor. In this implementation, made to be the same as which other BRMs monitor this BRM.

Choice of DB2® or other database facility to back the BRM and its related components.

Choice of candidate hosting environments for this BRM to be hosted in; in one implementation, IBM® Webspere hosting environments.

Choice of candidate OS for this BRM to be hosted in.

Failure of Management Component for Business Application

A given management component for a business application, in one implementation, a RS, has associated with it a single runtime management component, in one implementation, a BRM, that monitors the RS state. The monitoring BRM subscribes for state changes. On detection of a transition to "Failed", the RS failure logic is invoked and run on the monitoring BRM. The RS failure logic restarts the failed RS on an operating system and a hosting environment specified as a candidate for the RS when the RS was created. In one implementation, the hosting container can be an IBM® Websphere (WAS) environment. The RS is restarted in the same WAS container as the BRM with which it is associated. For cases in which an OS or WAS (hosting environment) container has failed causing both the BRM and all associated RS(s) to fail, coordination of RS failure logic and BRM failure logic insures the BRM failure logic invokes restart of the BRM prior to the RS failure logic invoking restart of the RS.

Figure 9:
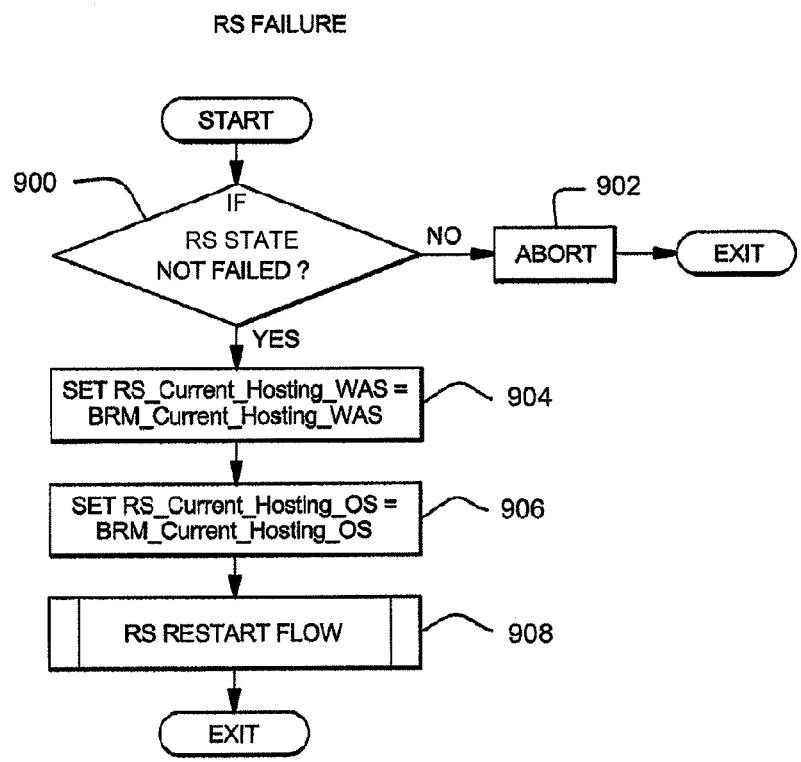
FIG. 9 depicts one embodiment of the logic to address failures of a RS, in accordance with an aspect of the present invention.

One embodiment of the logic to address failure of a RS is described with reference to FIG. 9. Initially, the RS state is tested, INQUIRY 900, and if it is not in a 'failed' state, then the failure processing is aborted, STEP 902, and processing exits. This is because the RS is to be in a failed state to continue with failure and restart processing. If however, RS state is in a failed state, then the RS_Current_Hosting_WAS is set to the BRM_Current_Hosting_WAS, STEP 904. In the example implementation, WAS is the hosting environment, and the RS' hosting environment is matched to the BRM hosting environment in order to link together sets of management components that have strong associations. Next, the RS_Current_Hosting_OS is set to the BRM_Current_Hosting_OS, STEP 906, and the RS restart logic is invoked, STEP 908, which is described in further detail below. For example, any mechanism may be used for communicating to the system service performing the start of the RS restart logic where that logic should execute.

Restart of Management Component for Business Application

As an example, the RS restart logic is invoked by the RS failure logic to cleanup, complete and reestablish the RS environment following an RS failure. RS restart will, for example:

Cleanup partial RS definition and deployment artifacts.
If there is monitoring or ongoing work to precondition an environment, these are resumed, if needed.
If an undo workflow was started, the monitoring for the undo workflow is resumed, if needed.
If policy activation was partially done, it is completed, if needed.
Initiate the PSE interval timer to monitor for crossing of time boundaries between PSE(s) associated with the RS.
Initiate periodic poll observation to gather current resource state and property/value pairs as event notification may have been lost during RS failure.

Current resource information is gathered. Over the duration of RS failure, subscriptions to changes in resource state or properties are maintained, but events may be discarded. In one implementation, to resynchronize with current resource state, RS restart processing polls resources to quickly gather current resource state information. In one implementation, the polling is performed as described in "Managing the Computer Collection of Information in an Information Technology Environment," (POU020070121US1), Bobak et al., which is hereby incorporated herein by reference in its entirety, using a shortened interval to minimize disruption, while gathering current information quickly. The shortened interval is set to the time acceptable to customers for initiating gathering of resource status in error conditions. The gathering of resource data is further described below.

In one example, a mechanism is provided to gather resource data within a given time constraint when invoked, for example, during RS restart processing.

Periodic poll requests for resource data are spread out over the periodic poll interval by the BRAD distributor balancing the requirement to complete a poll cycle within the interval and spreading the requests over the entire interval to even the processing load. Batches of requests are made by dividing the total number of requests up into sets presented evenly over the poll interval.

The specified periodic poll interval is used as a staring point in determining the timing of batches. The number of requests per batch and the number of resources represented in the RS determines the number of batches. Based on the number of batches and the periodic poll interval, a microinterval for each batch is calculated.

Responses from BRAD processing include information from resources and an indication if a response from the resource was received before the microinterval timeout. At the completion of gathering resource state through periodic poll processing for restart of a RS, an evaluation of the resource state is performed. In the example implementation described herein, the management system itself is an availability management system, so any recoveries that were potentially missed during the RS failure are addressed. If resource(s) have failed during the time RS failure processing was occurring, error processing is initiated based on the resource information returned by periodic poll.

One embodiment of the logic to restart a RS component is described with reference to FIGS. 10A-10D. The logic is performed by the BRM monitoring the failed RS, and gets control when invoked by the RS failure logic. Initially, in STEP 1000 (FIG. 10A), a connection is established to the persistent database used to store the activity logs and other records. In one implementation, the database used can be one that has highly reliable characteristics, such as an IBM® DB2® for z/OS®. There are known technologies for ensuring availability of the database component itself, and these technologies are used to allow the system described herein to connect to a persistent store. Within the database, the RS Activity log, the RSTT transaction table record, and the PSE table are located, STEP 1002. The RS Activity log is updated to indicate that the RS Restart is initiated, STEP 1004, and processing of the log starts from the end record back up to the beginning, STEP 1006. In one implementation, these tables are located via using type 4 JDBC connectors the customer has configured for the database connectors, then having those connectors linked to the RS restart logic, all of which is done at time of installation for the BR system, in one example.

The basic process is to search the RS Activity log for patterns where a start of a process is logged, but the ending of that process is not logged in order to determine what processing the RS was involved in at time of termination. This information is used to initiate appropriate action. As an example, one condition that is tested is when a RS TT and RS Activity log exist, but the hosting environment fails, which can happen when there is no active record of completion of RS definition. In this case, the RS Activity log and the RS TT are cleaned up. For example, if there is a RS Deployment Activity log entry, but no RS Definition Activity log entry, INQUIRY 1008 (FIG. 10B), then the RS TT row is deleted from the database, STEP 1010, the RS Activity log is deleted, STEP 1012, and a record indicating RS Restart Define New RS activity cleanup started is inserted into the RS Activity log, STEP 1014.

Thereafter, or if there is a definition log entry for the deployment log entry, another condition tested is to determine if there was any prepare or pre-conditioning of resources ongoing at time of RS failure. In one implementation, the preconditioning of resources is performed as described in "Dynamic Selection of Actions in an Information Technology Environment," (POU920070117US1), Bobak et al., which is hereby incorporated herein by reference in its entirety, using prepare workflows. Specifically, if a RS Activity log entry for a "PrepWFSubmitted" is found with no matching "PrepWF-Completed" log record, INQUIRY 1016, this indicates that a prepare workflow was in progress, so "Monitor of Prep Workflow in Progress" should be initiated. The RS Activity log entries are read to obtain, for instance, the RS, the policy, workflow, timestamp, RS Summary State, prepare workflow submitted, workflow id (wfid), and an indication of whether the prepare was for a topology change request (topo_chg_flg), STEP 1018. Then, monitoring of the preconditioning work that was in progress is initiated, STEP 1020. In one implementation, this can be achieved via invoking monitoring of the prepare workflow in progress, as described in "Dynamic Selection of Actions in an Information Technology Environment," (POU920070117US1), Bobak et al., which is hereby incorporated herein by reference in its entirety.

In one example, during the monitoring of the prepare workflow, the following steps are taken:
  Record completion of preparatory workflow execution.
  Notify admin of success or failure.
  Unsubscribe or unregister for changes of state for resources found in the preparatory workflow, if the preparatory workflow is to be undone.
  Build undo preparatory workflow, if required.
  Initiate undo preparatory workflow on preparatory workflow failure and store id of undo workflow returned from BPEL runtime.
  Initiate monitor of undo preparatory workflow, if required.
  End serialization of preparatory flows on successful completion; otherwise, undo workflow in process.

Next, a record indicating the RS Restart monitor of prep cleanup started is inserted into the RS Activity log, STEP 1022.

Thereafter, or if no from INQUIRY 1016, another condition tested is whether there was any kind of an error situation detected in running the preconditioning actions for which an 'undo' set of actions was in progress. In one implementation, undo of preconditioning actions is described in "Dynamic Selection of Actions in an Information Technology Environment," (POU920070117US1), Bobak et al., which is hereby incorporated herein by reference in its entirety. If there is a "PrepUndoWFSubmitted" with no "PrepUndoWFCompleted" matching log record, INQUIRY 1024 (FIG. 10C), then the RS Activity log entries are read to obtain, for instance, the RS, the policy, workflow, undo workflow generated, timestamp, RS Summary State, undo workflow submitted, workflow id (wfid), and an indication of whether the prepare was for a topology change request (topo_chg_flg), STEP 1026. Then, monitoring for the undo actions is initiated, STEP 1028. In one implementation, this monitoring is performed as described in "Dynamic Selection of Actions in an Information Technology Environment," (POU920070117US1), Bobak et al., which is hereby incorporated herein by reference in its entirety, to Monitor Undo Prep Workflow. For example, recording of success or failure of the undo workflow is logged. On successful completion of the undo workflow, the policy is indicated as validated and requiring execution of the preparatory workflow. In one implementation, upon failure of the undo workflow, serialization of preparatory operations and of other BR admin operations on the RS are purposefully left blocked to prevent any other work from rendering the environment inconsistent. In this case, admin intervention to correct the environment is desired.

Next, a record indicating the RS Restart monitor of undo prep cleanup started is inserted into the RS Activity log, STEP 1030.

Subsequently, or if INQUIRY 1024 evaluates as false, a further condition is tested that determines whether an activate of policy was ongoing at time of RS failure. If there is an RS Activity log entry for "Activate of Policy Started" with no matching "Activate of Policy Completed", INQUIRY 1032, then the RS Activity log entries are read to obtain, for instance, the RS, the policy to activate, the phase 1 activate list, timestamp, and RS Summary State, STEP 1034. Next, the logic to activate the policy is invoked, STEP 1036. In one implementation, this is as described in "Real-Time Information Technology Environments," (POU920070120US1), Bobak et al., which is hereby incorporated herein by reference in its entirety. For example, requests to subscribe to resources are processed, for instance, in an order determined by the one or more DAG(s) reflecting relationships among resources in the RS. Processing of resource subscriptions proceeds, in one example, from the root of the DAG to the leaf nodes. In one implementation of "Activate of Policy", the set of actions that precondition an environment but should be done close to activate time are termed phase 1 activate operations, are idempotent, short in execution and invoked synchronously. So, re-executing any of these phase 1 type operations, even if they were successfully run prior to RS failure preserves correct operation of the system. Next, a record indicating the RS Restart activate of policy started is inserted into the RS Activity log, STEP 1038.

Figure 10A:
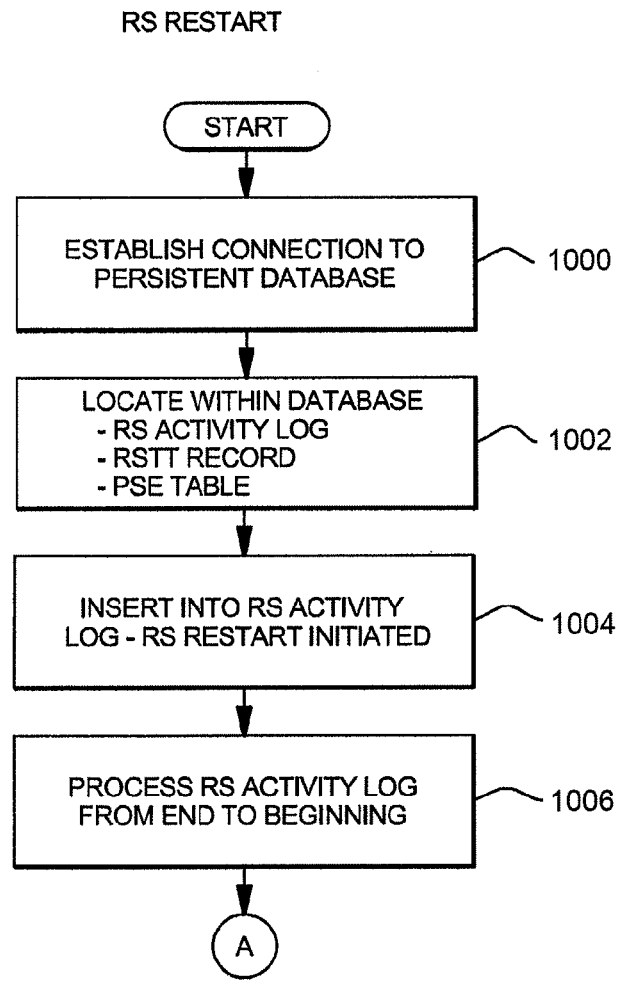
FIGS. 10A-10D depict one embodiment of the logic to restart a RS, in accordance with an aspect of the present invention.
Figure 10B:
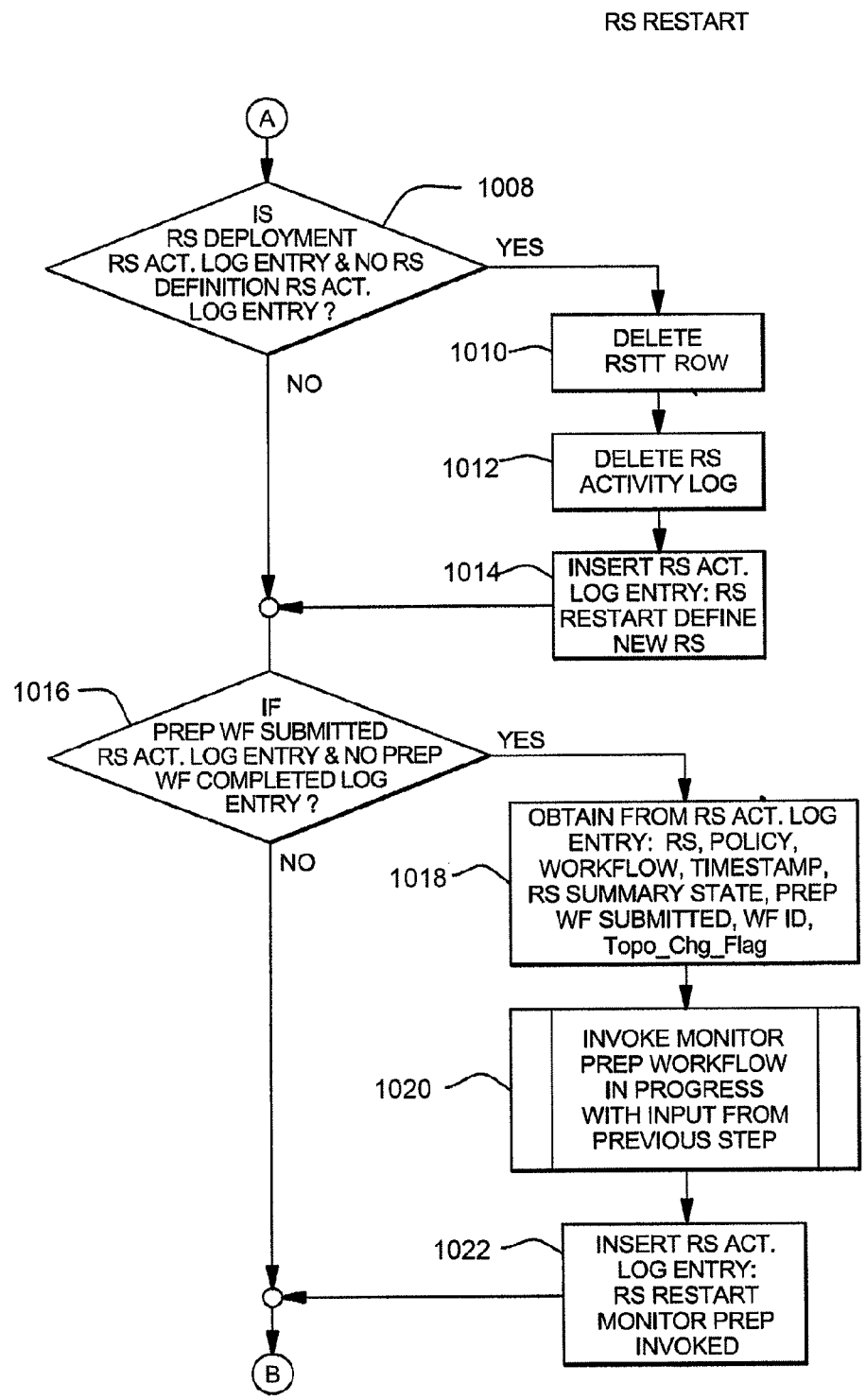
Figure 10C:
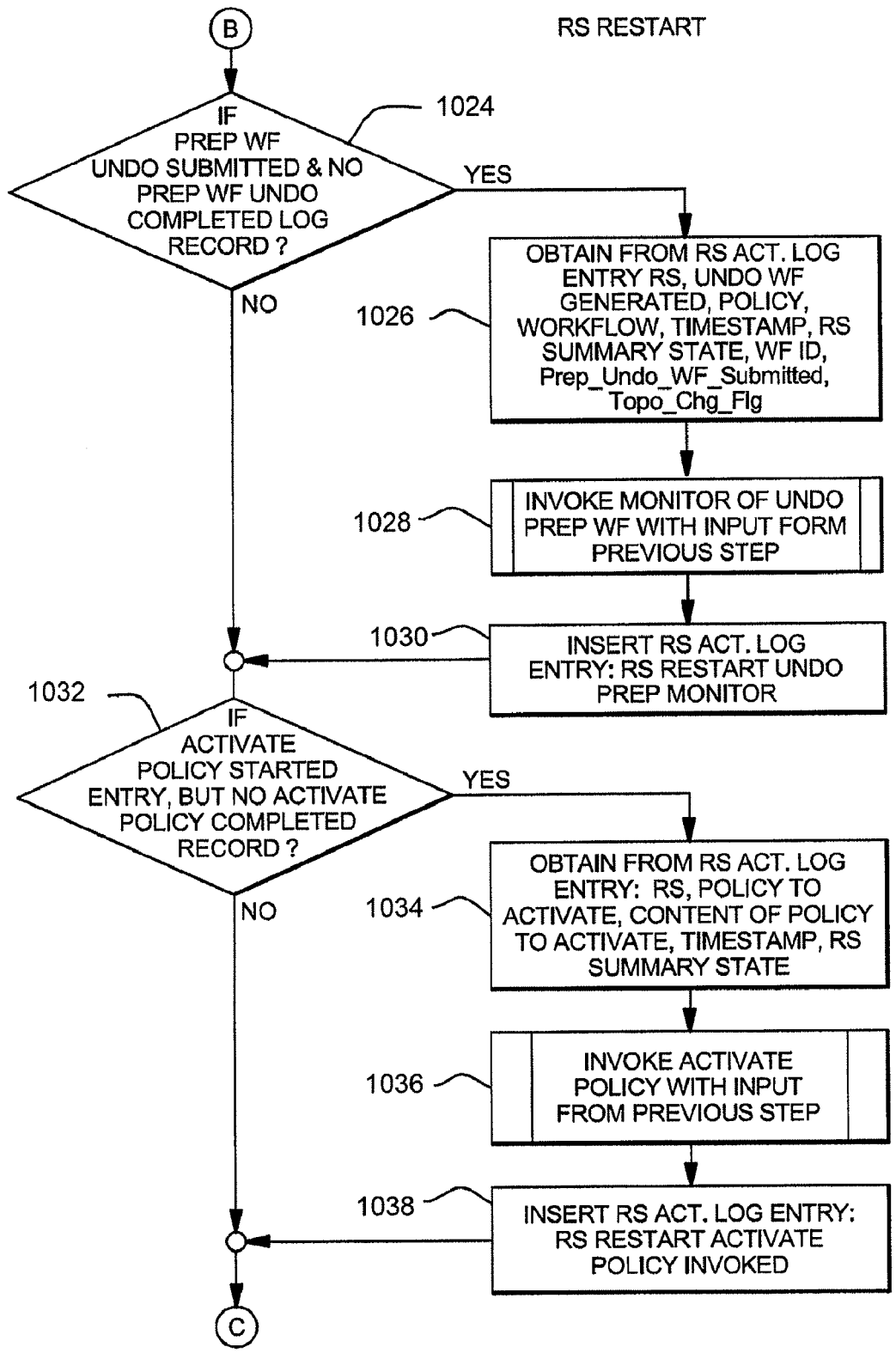
Figure 10D:
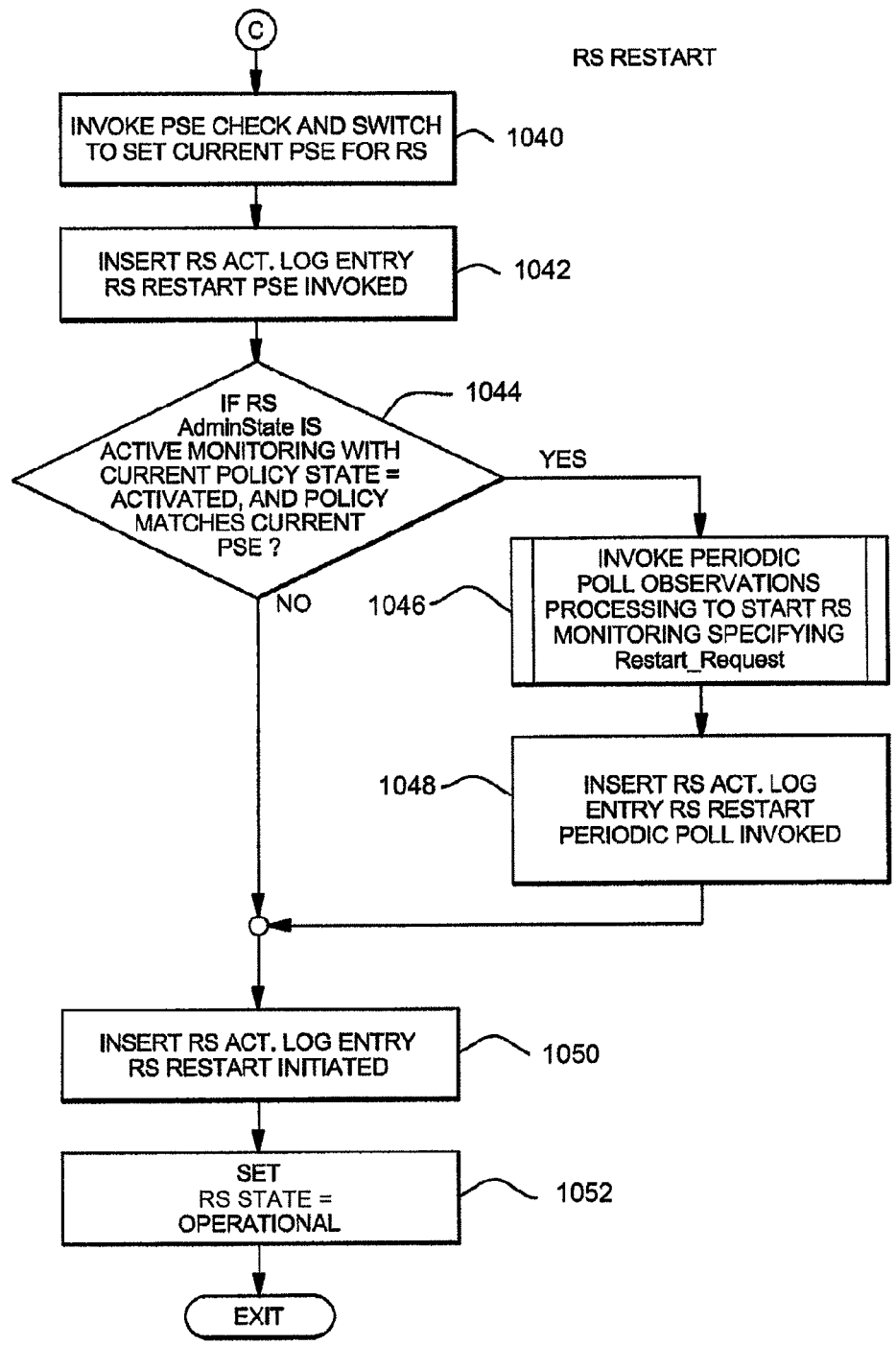

In one implementation, subsequent to checking the various conditions (including those described above, as well as others or different conditions in other embodiments), a routine is invoked to set the current PSE for the RS, if needed, STEP 1040 (FIG. 10D). Further, an RS activity log record indicating RS restart of PSE is recorded, STEP 1042. One example of PSE implementation can be found in "Computer Pattern System Environment Supporting Business Resiliency," (POU920070107US1), Bobak et al., which is hereby incorporated herein by reference in its entirety.

Then, if the "RS Admin State=ActiveMonitoring" with current policy state=Activated and where the current policy is associated with the current PSE, the restarting RS is an active monitor for BR management. If RS Admin state is ActiveMonitoring with the current policy state being Activated and policy matching the current PSE, INQUIRY 1044, then the set of resources that are being monitored by the RS are polled to determine current status, STEP 1046. In one implementation, this polling can be done as described in "Managing the Computer Collection of Information in an Information Technology Environment," (POU920070121US1), Bobak et al., which is hereby incorporated herein by reference in its entirety. Next, a record indicating the RS Restart periodic poll initiated is inserted into the RS Activity log, STEP 1048.

Thereafter, or if the evaluation from INQUIRY 1044 is no, the RS Activity log is again updated to indicate that RS Restart processing is completed, STEP 1050. Moreover, the RS state is set to 'operational', STEP 1052, and processing exits.

Failure of Runtime Management Component

On deployment, runtime management components, BRMs, are specified as monitoring other BRMs, as described above. In one implementation, information on which BRMs monitor which other BRMs is stored as part of the database record about each BRM. In the example implementation described herein, the set of BRMs which monitor are symmetric. Specifically, for each subject BRM monitored by a set of BRM(s), the set of monitoring BRM(s) are also a monitor for the subject BRM. This process enables a monitoring BRM to continue any recovery processing in progress by a failed BRM which is being monitored. There may be further extensions to this implementation where the BRM monitoring is not symmetric.

When a BRM is deployed, a two phase process is executed. In the first phase, the BR administrator selects the primary and candidate hosting environment (such as IBM® Websphere or WAS) and OS environments. A list of monitoring BRM(s) for the new BRM is also selected. Through interaction with the UI, the set of BRM(s) which monitor each other is made complete. The first phase concludes with the customer specified database environment being updated to include the BR persistence; BR_Activity_log; Observation_log; a Containment Region Table, CRTAB; a Resource Group Table, RGTAB; BRMD; and BRRD. The BRM persistence record includes information on the preferred and candidate Hosting and OS environments, as well as the monitoring and monitored BRM list.

In the second phase of deployment, each BRM which is to monitor the newly deployed BRM is synchronously notified. Within the transaction scope of the second phase, the monitoring BRM(s) record the new BRM(s) database information and subscribe for notification of failure of the new BRM. Recovery for BRM processing detects if the first phase was executed and the second phase processing was not completed. Recovery processing forward completes new BRM instantiation by insuring the monitoring BRMs are active.

Upon Failure of a BRM:
 The monitoring BRMs for the failing BRM get notification.
 The monitoring BRMs Start transaction.
 The monitoring BRMs attempt to update the failed BRMs database record indicating an active BRM recovery is in progress and which BRM from the monitoring set is to perform recovery.
 An update to the candidate recovering BRM database record is performed in the same transaction scope in order to record the work which would need to be recovered if the recovering BRM fails before completing.
 On committing the transaction, one BRM of the set attempting to become the current BRM performing recovery commits successfully. The others fail.

Any given RS is managed and monitored at any point in time by one BRM. The association of a RS to a BRM is established when the RS is created and deployed. The creation and deployment operation for a RS engages the BR administrator to define the collection of WAS environments in which the BRM and associated RS(s) can be contained at runtime.

Associated with a BRM there exists a set of database tables. The following tables are created when a BRM is deployed: BRM table for persistence; BRMD; BRRD, CRTAB, RGTAB, BRM_Activity_log; Observation_Log. Data enabling access to these tables is stored within the BRM persistence database table and is associated with the owning BRM. Each BRM which monitors another BRM also stores data enabling access to the monitored BRMs persistence database table.

The following steps are performed, in one example, during BRM recovery:
 Recovering BRM inspects candidate list of hosting containers for the FailedBRM, where the list includes the hosting environments where the BRM logic is already installed.
 Choose target for restarting the FailedBRM.
 Instantiate the BRM on the target (start BRM).
 Update current hosting environment in the BRM record.
 Place an entry in the BRM activity log of the recovering BRM.
 Update the FailedBRM's database record indicating there is no longer a recovering BRM active.

BRM recovery processing further insures that processing is completed for a failed BRM that was itself recovering one or more BRMs.

One embodiment of the logic for failure handling for a BRM is described with reference to FIGS. 11A-11C. This logic is running on one or more of the peer monitoring BRMs. The BRM(s) running the logic is referred to as ThisBRM, and the failed one is referred to as FailedBRM.

Figure 11A:
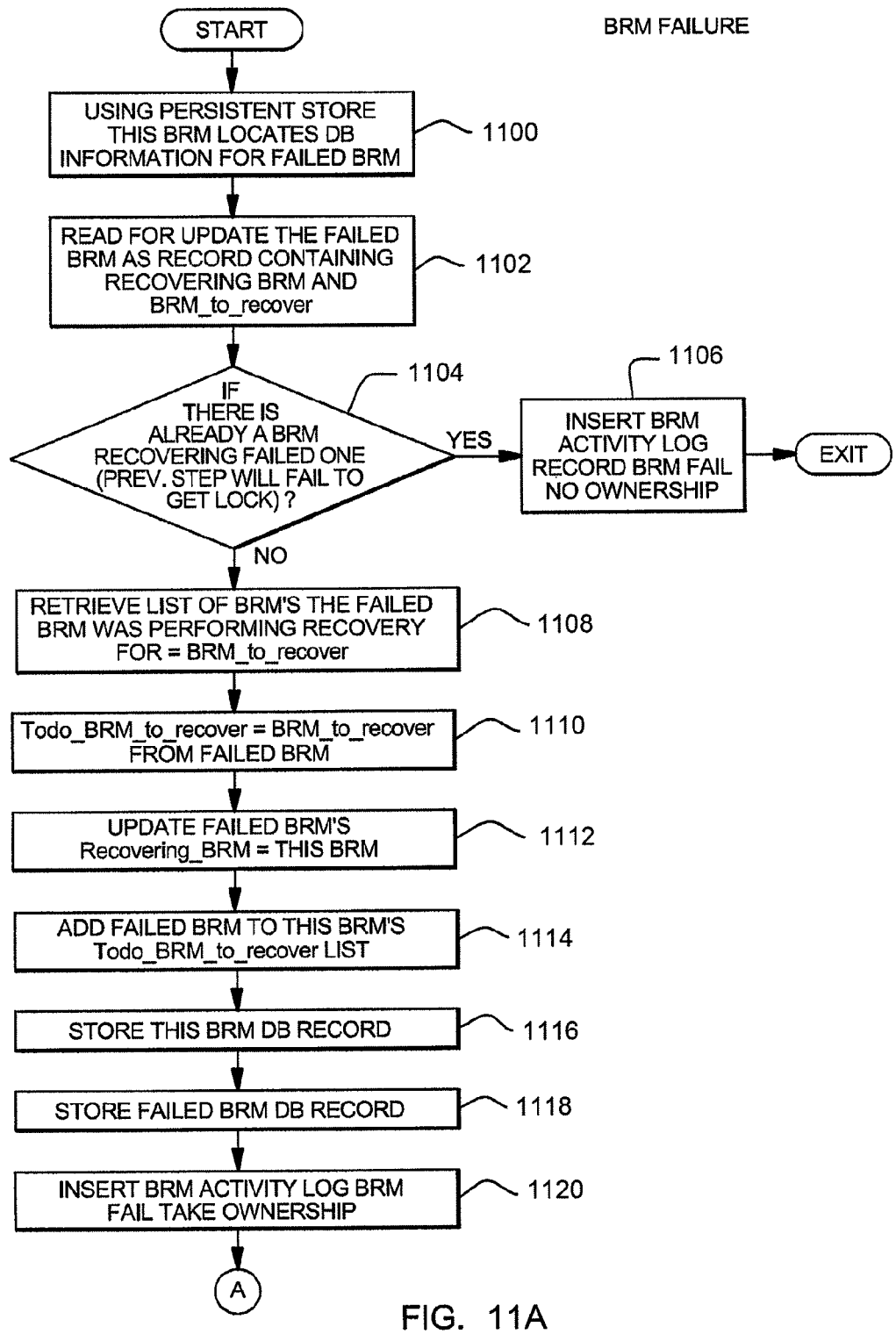
FIGS. 11A-11C depict one embodiment of the logic to handle a BRM failure, in accordance with an aspect of the present invention.
Figure 11B:
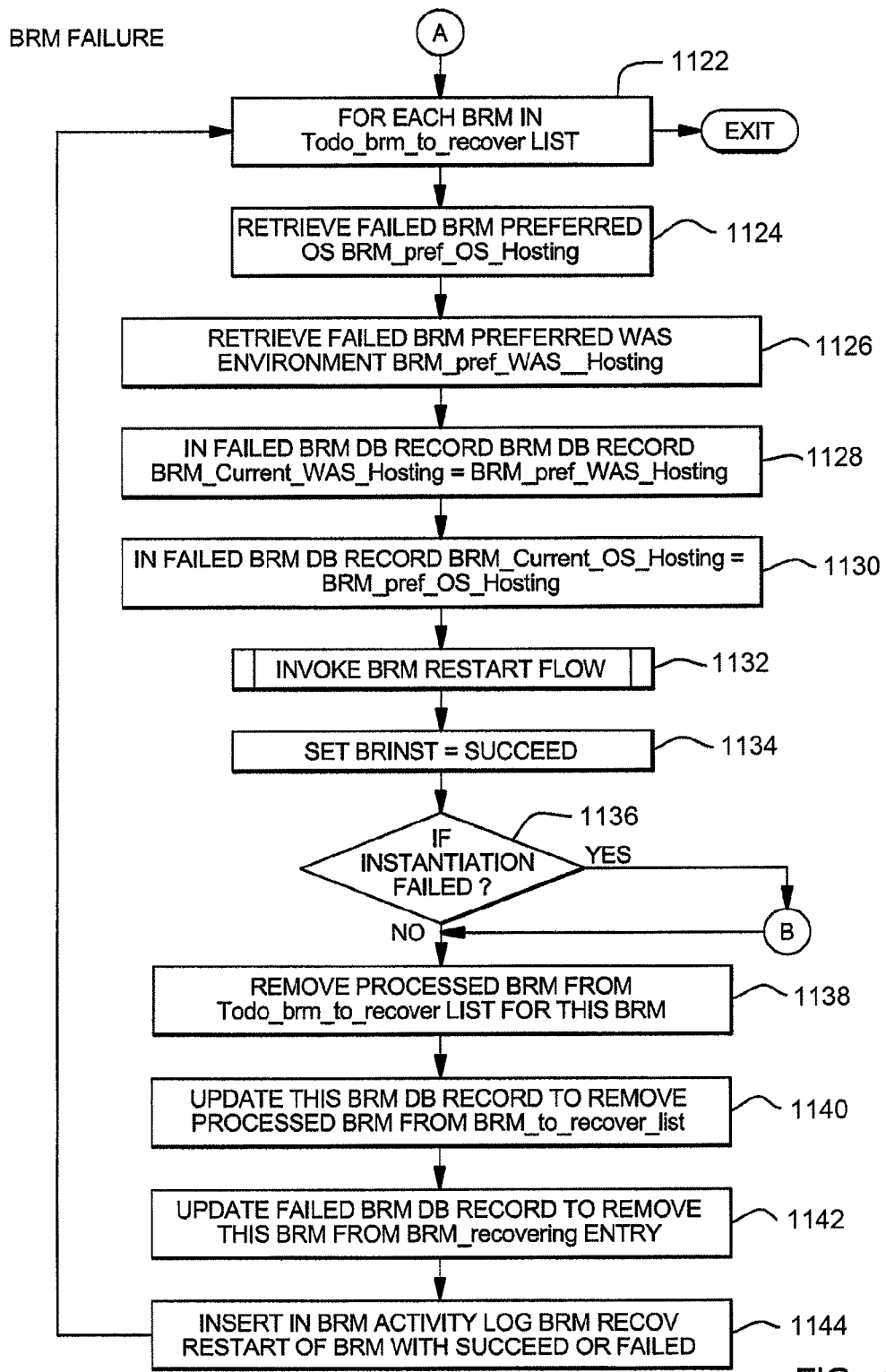

Referring to FIG. 11A, initially, ThisBRM locates the persistent datastore for the FailedBRM, STEP 1100. Database persistence techniques in existing technologies are used to gain access to the database. Next, the FailedBRM database record is read for update, STEP 1102, causing an attempt at serialization of that record. The Recovering_BRM and the BRM_to_recover are both read from the database record. If there is already a BRM recovering the FailedBRM, INQUIRY 1104, then the read of STEP 1102 would fail, and the processing continues to insert an entry into the BRM Activity log for BRM Fail no ownership obtained, STEP 1106, and exits.

If the logic obtained the lock, then the processing BRM is the one to recover the FailedBRM, and the logic continues to STEP 1108 to retrieve the list of BRMs that the FailedBRM was performing recovery for, BRM_to_recover. Next the BRM_to_recover is saved into todo_brm_to_recover, STEP 1110, and the recovering_BRM field of the FailedBRM database record is updated to ThisBRM, STEP 1112. The FailedBRM itself is added to the todo_brm_to_recover, STEP 1114, as another item for ThisBRM to process, and the database record for ThisBRM is stored, STEP 1116. Then, the database record for the FailedBRM is stored, STEP 1118, and a record is inserted into the BRM Activity log indicating BRM Fail ownership taken, STEP 1120.

Thereafter, each BRM for which to perform recovery (each one in todo_brom_to_recover list) is processed starting at STEP 1122. The FailedBRM's preferred OS is retrieved from field BRM_pref_OS_Hosting in the FailedBRM database record, STEP 1124, and the FailedBRM's preferred hosting environment is retrieved from field BRM_pref_WAS_Hosting in the FailedBRM database record, STEP 1126. Then, the FailedBRM database record is updated, so that the BRM_current_WAS_Hosting is set to the BRM_pref_WAS_Hosting, STEP 1128, and the BRM_current_OS_Hosting is set to the BRM_pref_OS_Hosting, STEP 1130. Next, the BRM restart logic is invoked, STEP 1132, as further described with reference to FIGS. 12A-12D, using the BRM_Current_OS_Hosting as the OS in which to start the BRM and the BRM_Current_WAS_Hosting as the hosting environment in which to start the BRM. In the example implementation, the hosting environment is IBM®'s Websphere (WAS).

Moreover, a brinst field is set equal to succeed, STEP 1134, and a determination is made as to whether the instantiation of BRM failed, INQUIRY 1136. If the starting or instantiation of the BRM failed, then the set of STEPs from 1146 to 1162 (FIG. 11C) are performed. Otherwise, if the start of the FailedBRM succeeded, then the logic continues to STEP 1138 (FIG. 11B), where the processed BRM is removed from the todo_brm_to_recover list for ThisBRM, and the database record for ThisBRM is updated to remove the processed BRM from the BRM_to_recover list, STEP 1140. The FailedBRM database record is updated to remove ThisBRM from the BRM_recovering entry, STEP 1142, and a record is inserted into the BRM Activity log to indicate BRM Recovery processing restart of FailedBRM, with success or failure indicator, STEP 1144. Processing then continues at STEP 1122.

Figure 11C:
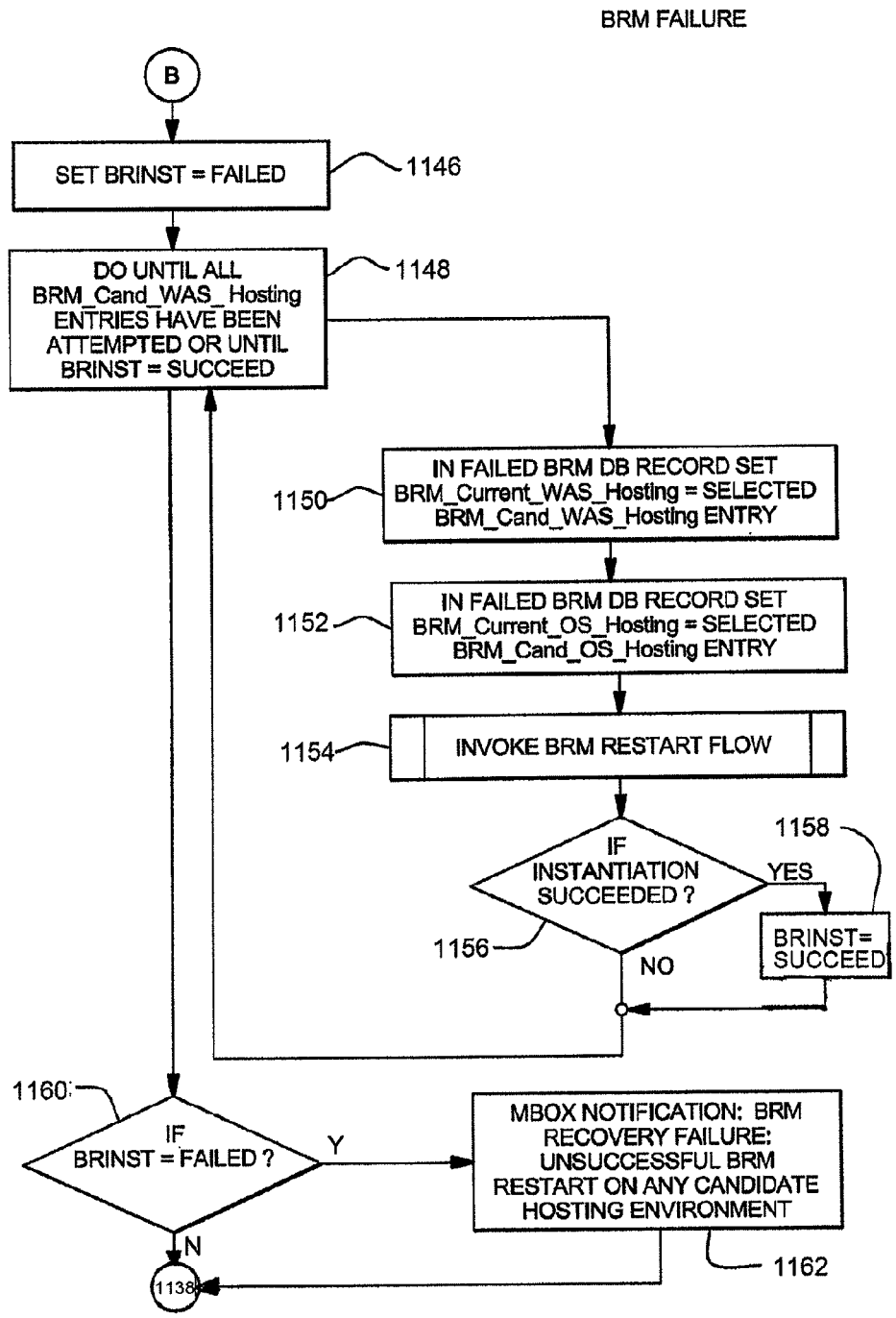

If the determination at INQUIRY 1136 is that the starting of the FailedBRM failed, then processing continues to STEP 1146 (FIG. 11C). The brinst field is set to 'failed', and then there is a loop to cycle through the potential candidate hosting environments for the FailedBRm until all have been tried or until brinst equals 'succeed', STEP 1148. Each candidate hosting environment (listed in BRM_Cand_WAS_Hosting)

is processed. In the FailedBRM database record, the BRM_Current_WAS_Hosting is set to the BRM_Cand_WAS_Hosting entry being processed, STEP 1150, and the BRM_Current_OS_Hosting is set to the BRM_Cand_OS_Hosting entry, STEP 1152. Next, the BRM Restart logic described below is invoked, STEP 1154, using the BRM_Current_OS_Hosting and the BRM_Current_WAS_Hosting. If the starting of the FailedBRM succeeded, STEP 1156, then brinst is set to 'succeed', STEP 1158. Thereafter, or if instantiation failed, processing cycles back to STEP 1148. At STEP 1148, the next BRM_Cand_WAS_Hosting entry is selected, if brinst is still equal to failed and there are more entries.

If after processing all the candidate hosting environments, brinst is still 'failed', INQUIRY 1160, then the administrator is notified through, for instance, a mailbox notification that the BRM recovery has failed and that there has been an unsuccessful BRM restart on any candidate hosting environment, STEP 1162. Thereafter, or if brinst=succeeded, the logic continues to STEP 1138 (FIG. 11B).

Restart of Runtime Management Component

BRM recovery processing is executed on ThisBRM, the BRM that is recovering the FailedBRM. BRM recovery processing determines which RS(s) were associated with the BRM. For those RS(s) which have failed, potentially due to being in the same hosting environment or OS as the FailedBRM, BRM recovery invokes RS failure processing. Within RS failure processing the current hosting environment and OS for the RS are set to match the associated BRM.

The example implementation described herein is a management system which itself performs recovery. During restart processing for a FailedBRM, any processing that the FailedBRM had active which was performing recoveries for resources in the IT environment is reinstated and continued. In one implementation, the management system uses logic described in "Management of Computer Events in a Computer Environment," (POU920070118US1), Bobak et al. and "Management Based on Computer Dynamically Adjusted Discrete Phases of Event Correlation," (POU920070119US1), Bobak et al., each of which is hereby incorporated herein by reference in its entirety, to track progress of an ongoing recovery of IT resources and to form Containment Regions constituting the set of resources that have failed and their interrelationships. The CR database table associated with the BRM is used to locate the "CRProcess=Active" Containment Regions. Reinstatement and continuation of CR processing depends on the stage of CR progress. One implementation for keeping track of the stage of CR progress is described in "Management Based on Computer Dynamically Adjusted Discrete Phases of Event Correlation," (POU920070119US1), Bobak et al., which is hereby incorporated herein by reference in its entirety, and a dynamic time window for handling the error is also described therein. In one implementation of reinstating work the FailedBRM was doing at time of failure, the example logic for restarting a BRM, as described herein, can use the logic from "Management Based on Computer Dynamically Adjusted Discrete Phases of Event Correlation," (POU920070119US1), Bobak et al., which is hereby incorporated herein by reference in its entirety.

In one example, BR processing of errors is based on incoming state change notification for one or more resources. Each operational state change is evaluated for whether a new Containment Region (CR) or situation is to be created, or whether the error is for a resource that already has an association or pairing with some other impacted resource. BR maintains a balance between the one extreme of reacting too quickly to a failure notification and creating a separate CR for every failing resource, and the other extreme of waiting so long as to jeopardize the RTO of the various Recovery Segments involved and/or impacted by the failure. BR accomplishes this with the concept of an event correlation or timing framework.

Within the event correlation framework, BR aggregates/correlates related event (e.g., error) conditions. The window of wait time is dynamic, and built on the general time for communication with the resource during normal communication. Once the errors are accumulated into a given CR, additionally impacted resources are identified. The entire set is assessed for state, asynchronously, to ensure that BR makes decisions with the most current state available from a resource. Once the state is assessed, failed and degraded impacts are inspected to form a recovery process.

The timing framework includes discrete steps or phases (e.g., five), each of which may vary in duration.

From the time a first event (e.g., error) is reported to when BR begins gathering current state from impacted resources is termed interval T1→T2, with the point in time when BR begins gathering current state termed T2. The point in time from first reported event to when BR stops accumulating potentially related information (e.g., errors) for analysis is termed T3.

The first event of a failure resulting from the state change on the Recovery Segment ensures the creation of a new CR. For each subsequent event, while the Recovery Segment is in a state that is not Available, the events flow immediately (in one example) to the BRM, which decides whether to create a new CR for the resource associated with that event, or whether to merge the resource into an existing CR.

Once a time interval for gathering current resource status expires for any CR, the timing window for that CR is closed to incoming errors, and the resources for any other errors go into the formation of a new CR.

As part of the processing to accumulate related events for root cause analysis, when a new CR is created, intervals are established for initiating gathering of resource state information (the point in time, T2) and closing the CR to inclusion of newly reported events (the point in time, T3) in order to meet specified goals, such as RTO goals. When CR(s) and a newly reported event are merged, those intervals are re-established based on the updated view of resources related to the outage event being evaluated.

When an intermediary interval is reached (interval T1→T2), BR begins gathering state (e.g., Asynchronous Query Build processing) from the impacted set of resources to ensure their value for state is more recent than the last event received. The state information is to be verified explicitly since the eventing mechanisms may have an unbounded delay. These state queries are accomplished with the BR Asynchronous Distributor (BRAD), in one example. The output of the asynchronous build process is an array of resource states.

Resource state is gathered over an interval (interval T2→T3) that correlates with the time BR calculated as acceptable for delay in gathering resource state information while still achieving RTO goals. For resources failing to respond within the allowable time interval, BR utilizes the last state retrieved through periodic monitoring or event processing. BR marks the potentially stale state for consideration in building recovery actions.

When the time interval set by BR as the maximum delay for including new resources in the CR is reached (T1→T3), the timing window for that CR is closed to incoming errors, and the resources for any other errors go into the formation of a new CR. If resource state gathering has not been initiated at the time of closing the timing window, BR begins the asynchronous resource state collection process. The BR Close Sliding Window routine transitions the CR phase of processing to T4 and initiates building of the recovery process.

Figure 12A:
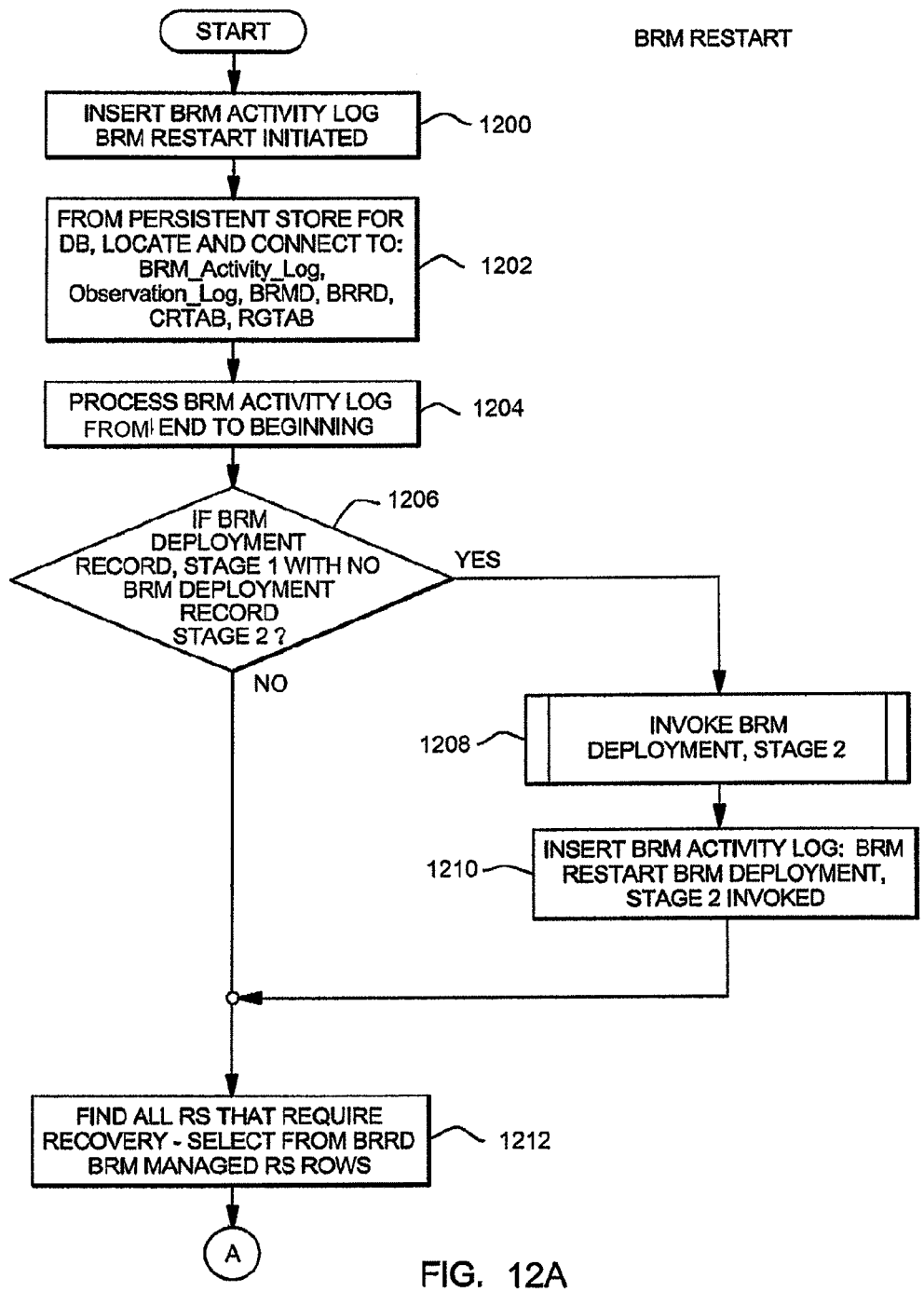
FIGS. 12A-12D depict one embodiment of the logic to restart a BRM, in accordance with an aspect of the present invention.

One embodiment of BRM restart processing is described with reference to FIGS. 12A-12B. Initially, an entry is added to the BRM Activity log to indicate BRM restart processing has started, STEP 1200 (FIG. 12A), and then from the persistent database, the following are retrieved, as examples: BRM Activity Log, Obsevation_Log, BRMD, BRRD, CRTAB, and RGTAB, STEP 1202. The BRM Activity log is processed from end to beginning, STEP 1204, and various conditions the BRM may have been in at time of failure are detected and handled.

If there is a BRM deployment stage1 record, but no matching BRM deployment stage2 record, INQUIRY 1206, then the BRM deployment stage logic is invoked, 1208. In one implementation, the BRM deployment itself is composed of two stages, as described in "Recovery Segments for Computer Business Applications," (POU920070108US1), Bobak et al., which is hereby incorporated herein by reference in its entirety. A record is added to the BRM Activity log to indicate BRM restart processing, BRM deployment stage2 invoked, STEP 1210.

To further explain, in one implementation, the BRM deployment itself is composed of two stages. In stage 1, the BRM is started, with the following set of information saved, as an example: its current hosting environment, current OS, its lists of preferred and candidate hosting environments and OS, the list of BRMs that should monitor this BRM, as well as which other BRMs this BRM will monitor. At the end of stage 1, the new BRM is started, and it is monitoring other BRMs. However, other BRMs are not monitoring the newly created BRM. In stage 2 BRM deployment processing, other BRMs are notified synchronously to begin monitoring the newly created BRM. If there is a BRM deployment stage 1 record, but no matching BRM deployment stage2 record, INQUIRY 1206, then the BRM deployment stage logic is invoked, STEP 1208. A record is added to the BRM Activity log to indicate BRM restart processing, BRM deployment stage2 invoked, STEP 1210.

Figure 12B:
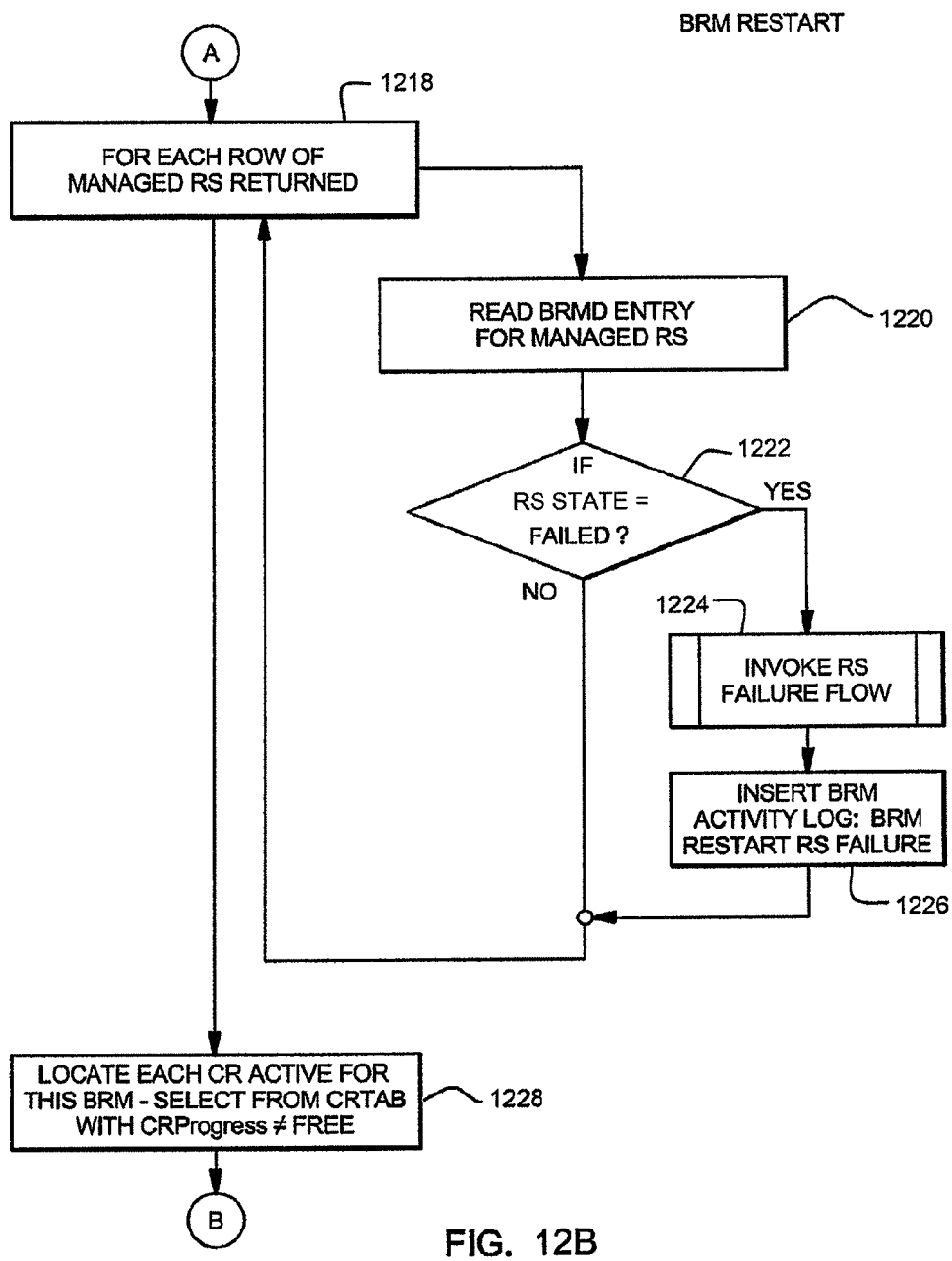
Figure 12C:
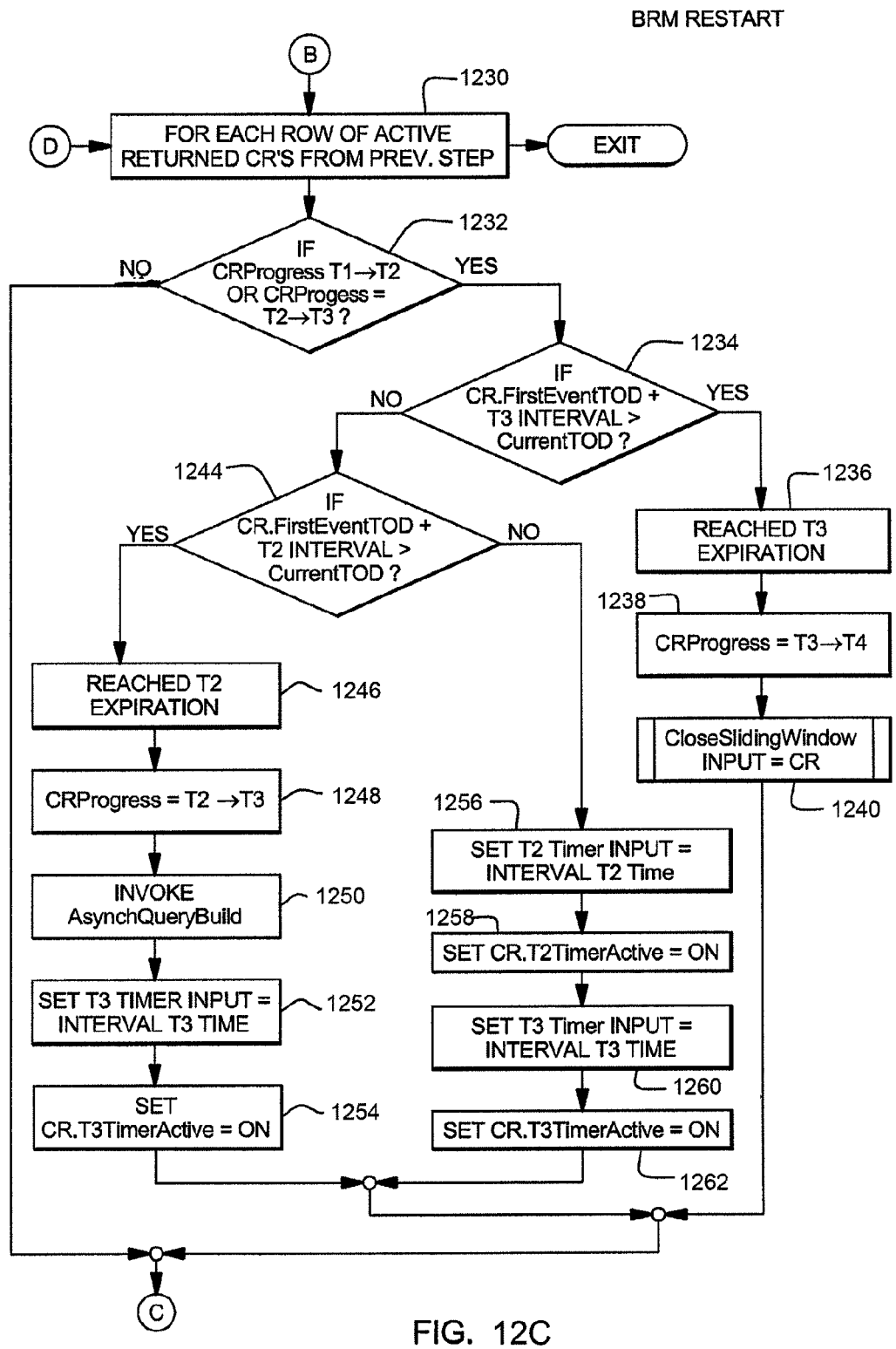

Thereafter, or if INQUIRY 1206 evaluates false, the RSs that require recovery based on association with the FailedBRM are found via selection from the BRRD, STEP 1212, and then each RS is processed starting at STEP 1218 (FIG. 12B). The BRMD entry for the RS is read, STEP 1220, and if the RS state indicates 'failed' for this RS, INQUIRY 1222, then the RS Failure logic described herein is invoked in STEP 1224. A record is added to the BRM Activity log indicating that BRM restart processing has invoked the RS failure logic for the RS being processed. Thereafter, or if RS state is not equal to failed, the next RS in the row is selected, and processing cycles back to STEP 1218 until all RS associated with the FailedBRM are handled.

Next, processing is started to identify the ongoing work the FailedBRM was performing at time of failure. In the example management system described herein, the BRM itself can perform recoveries for resources in the IT environment. Each record indicating ongoing work is selected. There can be a number of implementations to track ongoing work for a management system. In one implementation, this is achieved using the logic described in "Management of Computer Events in a Computer Environment," (POU20070118US1), Bobak et al., which is hereby incorporated herein by reference in its entirety. Each CR active for FailedBRM is selected via the CRTAB table of the persistent database, STEP 1228, where active CRs are indicated by ones that are marked 'not free'.

For each row of active CRs returned, STEP 1230 (FIG. 12C), the stage of processing of the CR is determined before deciding on appropriate actions to continue the work. The stage of progress of ongoing work is performed in one implementation through using logic described in "Management Based on Computer Dynamically Adjusted Discrete Phases of Event Correlation," (POU920070119US1), Bobak et al., which is hereby incorporated herein in its entirety. If CRProgress indicates it is in a stage between T1→T2 or T2→T3, INQUIRY 1232, and if the CR.FirstEventTOD plus the T3interval is greater than the CurrentTOD, INQUIRY 1234, then the T3 expiration has been reached, STEP 1236, and CRProgress is set to T3→T4 (point at which construction of recovery processing begins), STEP 1238. Further, and in one implementation, the logic to CloseSlidingWindow is invoked, using the input CR, STEP 1240. In another implementation, any logic to progress the outstanding work to the next stage can be invoked. Processing then continues to INQUIRY 1242 (FIG. 12D), as described below.

Returning to INQUIRY 1234 (FIG. 12C), if the CR.FirstEventTOD plus the T3interval is not greater than the CurrentTOD, then there is a test of CR.FirstEventTOD plus the T2interval, to see if that sum is greater than the CurrentTOD, INQUIRY 1244. If so, the T2 expiration has been reached, STEP 1246, and CR Progress is set to T2→T3, STEP 1248. In one implementation, the next processing at expired T2 interval is to collect current resource information for IT resources found in the failed CR. This is performed via logic in AsyncQueryBuild flow described in "Management of Computer Events in a Computer Environment," (POU920070118US1), Bobak et al., which is hereby incorporated herein by reference in its entirety, and is invoked in STEP 1250.

Figure 12D:
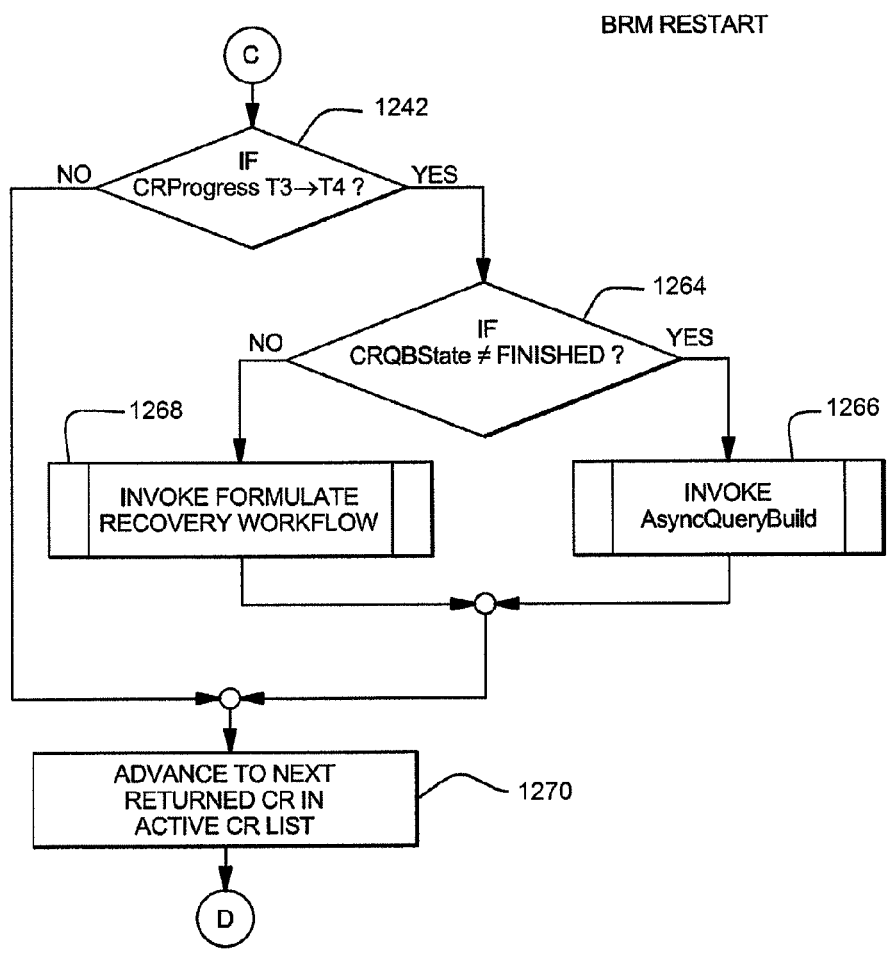

Next the T3 timer is set using the intervalT3 time, STEP 1252, and the indicator in the CR that the T3 timer is active is set to 'on' in STEP 1254. Processing then continues to STEP 1242 (FIG. 12D).

Returning to INQUIRY 1244 (FIG. 12C), if the CR.FirstEventTOD plus the T2interval is also not greater than CurrentTOD, then processing continues to STEP 1256, in which the T2 timer is set to intervalT2 time. Further, the indicator in CR that indicates the T2 timer is active is set to 'on', STEP 1258. In addition, the T3 timer is set, STEP 1260, and the indicator in the CR that the T3 timer is active is set to 'on', STEP 1262. Processing then continues to STEP 1242 (FIG. 12D).

Starting at INQUIRY 1242, a determination is made based on the stages processed and potentially progressed in previous steps (i.e., whether the CRProgress is T3→T4). If so, and if CRQBState of building the CR is not finished, INQUIRY 1264, then processing to complete CR processing is invoked, STEP 1266. In one implementation, the processing to complete the handling of CR is as described in "Management of Computer Events in a Computer Environment," (POU920070118US1), Bobak et al., which is hereby incorporated herein by reference in its entirety. In one example, AsyncQueryBuild is invoked in STEP 1266 to gather current resource information asynchronously.

If the CRQBState does indicate 'finished', then the final processing for the CR has not yet been invoked. In one implementation, the final processing includes formulating a recovery workflow for the IT resources found in the CR, STEP 1268. This is described below and in "Defining a Computer Recovery Process that Matches the Scope of Outage,"

(POU920070124US1), Bobak et al., which is hereby incorporated herein by reference in its entirety.

In one example, Containment Region data may be used to form a set of actions to alter the IT environment. For example, if outage events are used as the basis for CR formation, a recovery process may be constructed to alter the IT environment to restore a business application's service. If performance degradation related events were used as the basis for CR formation, a set of operations to alter the performance of the IT environment may be created.

As an example, recovery process formation may take one of many forms. A customer could take the data formulated in the CR and evaluate the implications of changes in resource state and property/values to manually construct a plan of action to restore IT services. Alternatively, the contents of the CR can be made available to each of the resources contributing to delivery of a business application for evaluation and independent recovery processing. A further alternative may be use of the CR content to programmatically form a recovery process by the BR system, as described in the following.

The process of creating a recovery process is based on a sequential and aggregative series of steps. For example:
1. A CR may be populated with the failing resource and any impacted resources based on the state assessment rules, as described herein. Recovery processing operates on the basis of the input list of resources for evaluation. If the techniques of CR processing are utilized, further advantages are gained in achieving recovery time goals and in correlating related failures.
2. Processing which delays for accumulation of errors may be followed by evaluation of the environment to determine if additional resources should be included in the evaluation of the outage.
3. Just prior to invoking recovery processing, current resource state may be retrieved.

At this point in time, the BRM has the following information available to it to generate a recovery process:
1. A list of resources which may be failed or degraded. In one implementation, this list may be included in a Containment Region, and in particular, be represented by the CR. States array.
2. Resource relationships reflecting the impact a failure or degradation of one resource can have on other resource(s). In one implementation, this may be provided by impact pairings in the BRRD.
3. Operation ordering information indicating between two operations on the same or different resources if one operation is required to come before or after the other. In one implementation, this may be provided by operation ordering pairings in the BRRD.
4. Operation effect information indicating what execution of an operation on a resource may be to the state of the same or another resource. In one implementation, the information may be provided by operation effect pairings in the BRRD.
5. Order for operation escalation when a recovery operation fails. In one implementation, the information may be provided by Order and Vorder fields within the operation table.

The steps used to create a recovery process include, for instance:
1. For nonresponsive resources, determine if there is an operation to be invoked to place the resource in a determinate state. Iteratively process the one or more DAG(s) representing resources in the CR under evaluation for recovery processing from the root to the leaf nodes. Perform at most one operation to achieve a determinate state for each distinct branch of the DAG.
2. When all determinate actions on non-responsive resources have been undertaken, evaluate the DAG from root to leaf nodes. For each distinct branch of each DAG, perform one recovery operation for a failed or degraded resource.
3. For each iteration of the recovery process, invoke a routine to determine the set of dependent operations to be included in the set of recovery operations invoked.
4. For each iteration of the recovery process, invoke a routine to assess constraints on operations impacting resources supporting two or more business applications.
5. Invoke a routine to submit the recovery operations for each iteration of the recovery process. Activities to monitor the execution of the recovery operations are provided.
6. Monitoring of activities in the recovery process determine if additional iterations of recovery processing are required or desired or when recovery processing has succeeded in making the IT environment available.

Subsequent to invoking formulation of the recovery workflow, STEP 1268, or invoking AsyncQuery Build, STEP 1266, the next CR to be processed is selected, STEP 1270, and processing cycles back to STEP 1230 (FIG. 12C) to process the next CR.

Failure of Asynchronous Distributor

There are a number of related components of the management system that may also fail, in addition to the main runtime management components, or the management component for the business application. One example is that of failure of one of the monitoring components of the system. In one implementation, a monitoring component can be an asynchronous distributor mechanism used to gather resource information across a large set of resources in a constrained amount of time, as described in "Managing the Computer Collection of Information in an Information Technology Environment," (POU920070121US1), Bobak et al., which is hereby incorporated herein by reference in its entirety. The failure of a BR asynchronous distributor (BRAD) is detected when, for instance, it is invoked from AsynchQueryBuild processing or from Periodic Poll Observation, which may respectively be invoked as part of BRM restart or RS restart logic.

To recover the BRAD or other supporting component, it is restarted in the target OS and hosting environment.

Described in detail herein is a capability for recovering a management component of a BR system or other system supporting an IT environment.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 13:
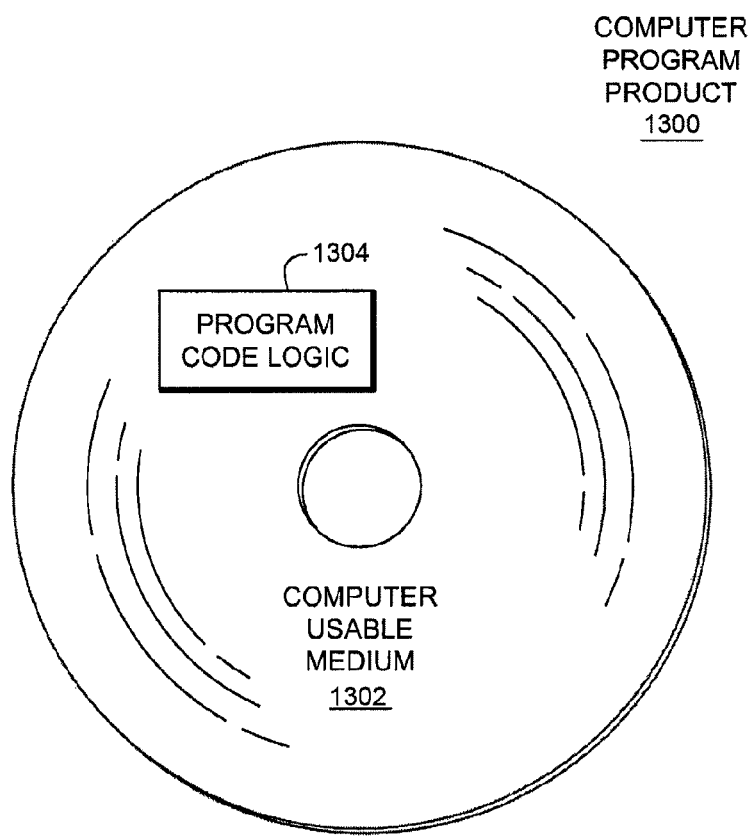
FIG. 13 depicts one embodiment of a computer program product incorporating one or more aspects of the present invention.

One example of an article of manufacture or a computer program product incorporating one or more aspects of the present invention is described with reference to FIG. 13. A computer program product 1300 includes, for instance, one or more computer usable media 1302 to store computer readable program code means or logic 1304 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided that enables recovery of management components of an IT environment. The recovery not only recovers the component, but also continues the work that was being performed by the component prior to the recovery. The recovery is performed non-disruptively in that management functions that were being performed by the components being recovered are not lost, but instead, are performed without requiring customer intervention.

Although various embodiments are described above, these are only examples. For example, the processing environments described herein are only examples of environments that may incorporate and use one or more aspects of the present invention. Environments may include other types of processing units or servers or the components in each processing environment may be different than described herein. Each processing environment may include additional, less and/or different components than described herein. Further, the types of central processing units and/or operating systems or other types of components may be different than described herein. Again, these are only provided as examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to obtain instructions from memory and to optionally, provide local buffering for the obtained instruction; an instruction decode unit to receive the instruction fetched and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Further, although the environments described herein are related to the management of availability of a customer's environment, one or more aspects of the present invention may be used to manage aspects other than or in addition to availability. Further, one or more aspects of the present invention can be used in environments other than a business resiliency environment.

Yet further, many examples are provided herein, and these examples may be revised without departing from the spirit of the present invention. For example, in one embodiment, the description is described in terms of availability and recovery; however, other goals and/or objectives may be specified in lieu of or in addition thereto. Additionally, the resources may be other than IT resources. Further, there may be references to particular products offered by International Business Machines Corporation or other companies. These again are only offered as examples, and other products may also be used. Additionally, although tables and databases are described herein, any suitable data structure may be used. There are many other variations that can be included in the description described herein and all of these variations are considered a part of the claimed invention.

Further, for completeness in describing one example of an environment in which one or more aspects of the present invention may be utilized, certain components and/or information is described that is not needed for one or more aspects of the present invention. These are not meant to limit the aspects of the present invention in any way.

One or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure, comprising integrating computer readable code into a computer system may be provided. The computer system comprises a computer usable medium, in which the computer usable medium comprises one or more aspects of the present invention. The code in combination with the computer system is capable of performing one or more aspects of the present invention.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of facilitating recovery within an Information Technology (IT) environment, said method comprising:
    determining that a management component executing on a processor and performing recovery within the IT environment, including performing one or more recovery tasks for one or more resources within the IT environment, is to be recovered itself; and
    recovering the management component that was performing the one or more recovery tasks, wherein the recovering comprises continuing to perform at least one recovery task that was being performed by the management component prior to the management component being recovered, and wherein performing recovery within the IT environment adheres to one or more customer-defined quantified recovery goals associated with one or more resources impacted by a failure associated with recovery and considers an effect that recovery of one business process within the IT environment has on another business process of the IT environment.

2. The computer-implemented method of claim 1, wherein the at least one recovery task is performed non-disruptively absent user intervention.

3. The computer-implemented method of claim 1, wherein the at least one recovery task is related to availability management of the IT environment.

4. The computer-implemented method of claim 1, wherein the recovering is performed by another instance of the management component, and wherein the method further comprises dynamically determining in real-time the another instance to perform the recovery.

5. The computer-implemented method of claim 4, wherein the dynamically determining comprises programmatically selecting the another instance from a plurality of instances of the management component based on an assessment of the current IT environment.

6. The computer-implemented method of claim 1, further comprising continuing to monitor one or more resources of the IT environment despite the recovering, wherein the monitoring is to manage the one or more resources.

7. The computer-implemented method of claim 1, wherein the at least one recovery task is part of a management process comprising one or more tasks, and wherein the recovering comprises:
    assessing the management process to determine the at least one recovery task to be performed; and
    performing the at least one recovery task.

8. The computer-implemented method of claim 7, wherein the performing of a recovery task of the at least one recovery task comprises:
    rolling back the recovery task to a known state; and
    performing the recovery task from the known state.

9. The computer-implemented method of claim 7, wherein the performing the at least one recovery task comprises forward completing the recovery task.

10. The computer-implemented method of claim 1, wherein the management component is a part of a business resilience system executing on a processor and used to manage recovery operations, the business resilience system comprising a business resilience runtime component of which the management component is a part that provides management functionality across one or more distinct recovery segments, wherein a recovery segment is a customer-defined grouping of one or more IT resources.

11. The computer-implemented method of claim 1, wherein the management component comprises at least one of: a component to manage one or more business applications of the IT environment, a runtime management component to manage the IT environment, and a supporting component used by one or more other components in managing the IT environment.

12. The computer-implemented method of claim 1, wherein the performing recovery adheres to one or more customer-defined quantified recovery goals by taking into consideration partial recovery performed prior to the management component being recovered.

13. A computer system of facilitating recovery within an Information Technology (IT) environment, said computer system comprising:
    a memory; and
    a processor in communications with the memory, wherein the computer system is configured to perform a method, said method comprising:
        determining that a management component executing on a processor and performing recovery within the IT environment, including performing one or more recovery tasks for one or more resources within the IT environment, is to be recovered itself; and
        recovering the management component that was performing the one or more recovery tasks, wherein the recovering comprises continuing to perform at least one recovery task that was being performed by the management component prior to the management component being recovered, and wherein performing recovery within the IT environment adheres to one or more customer-defined quantified recovery goals associated with one or more resources impacted by a failure associated with recovery and considers an effect that recovery on one business process within the IT environment has on another business process of the IT environment.

14. The computer system of claim 13, wherein the at least one recovery task is performed non-disruptively absent user intervention.

15. The computer system of claim 13, wherein the at least one recovery task is related to availability management of the IT environment.

16. A computer program product for facilitating recovery within an Information Technology (IT) environment, the computer program product comprising:
    a non-transitory computer storage medium readable by a processor and storing instructions thereon for execution by the processor for performing a method comprising:

determining that a management component executing on a processor and performing recovery within the IT environment, including performing one or more recovery tasks for one or more resources within the IT environment, is to be recovered itself; and recovering the management component that was performing the one or more recovery tasks, wherein the recovering comprises continuing to perform at least one recovery task that was being performed by the management component prior to the management component being recovered, and wherein performing recovery within the IT environment adheres to one or more customer-defined quantified recovery goals associated with one or more resources impacted by a failure associated with recovery and considers an effect that recovery of one business process within the IT environment has on another business process of the IT environment.

17. The computer program product of claim 16, wherein the at least one recovery task is performed non-disruptively absent user intervention.

18. The computer program product of claim 16, wherein the recovering is performed by another instance of the management component, and wherein the method further comprises dynamically determining in real-time the another instance to perform the recovery.

19. The computer program product claim 16, further comprising continuing to monitor one or more resources of the IT environment despite the recovering, wherein the monitoring is to manage the one or more resources.

20. The computer program product of claim 16, wherein the management component is a part of a business resilience system executing on a processor and used to manage recovery operations, the business resilience system comprising a business resilience runtime component of which the management component is a part that provides management functionality across one or more distinct recovery segments, wherein a recovery segment is a customer-defined grouping of one or more IT resources.

* * * * *